(12) United States Patent
Kurokawa et al.

(10) Patent No.: US 11,545,203 B2
(45) Date of Patent: Jan. 3, 2023

(54) SEMICONDUCTOR DEVICE, ELECTRONIC COMPONENT, AND ELECTRONIC DEVICE

(71) Applicant: Semiconductor Energy Laboratory Co., Ltd., Atsugi (JP)

(72) Inventors: Yoshiyuki Kurokawa, Sagamihara (JP); Shunpei Yamazaki, Setagaya (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 17/382,692

(22) Filed: Jul. 22, 2021

(65) Prior Publication Data

US 2021/0358530 A1  Nov. 18, 2021

Related U.S. Application Data

(63) Continuation of application No. 16/617,919, filed as application No. PCT/IB2018/054072 on Jun. 7, 2018, now Pat. No. 11,074,953.

(30) Foreign Application Priority Data

Jun. 16, 2017  (JP) .............................. JP2017-118247

(51) Int. Cl.
  *G11C 11/16*  (2006.01)
  *G06F 9/4401*  (2018.01)
  (Continued)

(52) U.S. Cl.
  CPC ........ *G11C 11/1673* (2013.01); *G06F 9/4401* (2013.01); *G06F 21/575* (2013.01);
  (Continued)

(58) Field of Classification Search
  CPC . G06F 9/4401; G06F 21/575; G11C 11/1673; G11C 11/4023; G11C 11/404; G11C 5/148; G11C 2211/4016
  (Continued)

(56) References Cited

U.S. PATENT DOCUMENTS 6,760,256 B2  7/2004 Imamiya
6,883,092 B2  4/2005 Sasaki et al.
(Continued)

FOREIGN PATENT DOCUMENTS

CN  101853343 A  10/2010
CN  102804360 A  11/2012
(Continued)

OTHER PUBLICATIONS

International Search Report (Application No. PCT/IB2018/054072) dated Aug. 21, 2018.
(Continued)

*Primary Examiner* — Son L Mai
(74) *Attorney, Agent, or Firm* — Robinson Intellectual Property Law Office; Eric J. Robinson

(57) ABSTRACT

The operation speed of a semiconductor device is improved. The semiconductor device includes a first memory region and a second memory region; in the semiconductor device, a first memory cell in the first memory region is superior to a second memory cell in the second memory region in data retention characteristics such as a large storage capacitance or a large channel length-channel width ratio (L/W) of a transistor. When the semiconductor device is used as a cache memory or a main memory device of a processor, the first memory region mainly stores a start-up routine and is not used as a work region for arithmetic operation, and the second memory region is used as a work region for arithmetic operation. The first memory region becomes an accessible region when the processor is booted, and the first memory region becomes an inaccessible region when the processor is in normal operation.

17 Claims, 30 Drawing Sheets

(51) Int. Cl.
*G06F 21/57* (2013.01)
*G11C 5/14* (2006.01)
*G11C 11/402* (2006.01)
*G11C 11/404* (2006.01)
*H01L 27/108* (2006.01)

(52) U.S. Cl.
CPC ............ *G11C 5/148* (2013.01); *G11C 11/404* (2013.01); *G11C 11/4023* (2013.01); *H01L 27/10805* (2013.01); *G11C 2211/4016* (2013.01)

(58) Field of Classification Search
USPC ........................................................ 365/149
See application file for complete search history.

(56) References Cited

U.S. PATENT DOCUMENTS

| | | | |
|---|---|---|---|
| 6,903,971 B2 | 6/2005 | Imamiya | |
| 7,307,883 B2 | 12/2007 | Imamiya | |
| 7,372,735 B2 | 5/2008 | Imamiya | |
| 8,429,427 B2 | 4/2013 | Ejiri | |
| 8,455,868 B2 | 6/2013 | Yamazaki et al. | |
| 9,349,735 B2 | 5/2016 | Yamazaki et al. | |
| 9,479,175 B2 | 10/2016 | Kurokawa | |
| 9,496,022 B2 | 11/2016 | Ohmaru | |
| 9,990,207 B2 * | 6/2018 | Kurokawa | G06F 9/4401 |
| 9,991,265 B2 | 6/2018 | Yamazaki et al. | |
| 2003/0095437 A1 | 5/2003 | Imamiya | |
| 2010/0250970 A1 | 9/2010 | Ejiri | |
| 2011/0156027 A1 | 6/2011 | Yamazaki et al. | |
| 2017/0041004 A1 | 2/2017 | Kurokawa | |
| 2018/0286864 A1 | 10/2018 | Yamazaki et al. | |

FOREIGN PATENT DOCUMENTS

| | | |
|---|---|---|
| EP | 1324198 A | 7/2003 |
| JP | 11-237983 A | 8/1999 |
| JP | 2003-162453 A | 6/2003 |
| JP | 2003-196097 A | 7/2003 |
| JP | 2010-237974 A | 10/2010 |
| JP | 2011-151383 A | 8/2011 |
| JP | 2015-165654 A | 9/2015 |
| JP | 2015-181223 A | 10/2015 |
| JP | 2016-006710 A | 1/2016 |
| KR | 2012-0094146 A | 8/2012 |
| TW | 201140808 | 11/2011 |
| WO | WO-2011/077967 | 6/2011 |
| WO | WO-2015/118436 | 8/2015 |

OTHER PUBLICATIONS

Written Opinion (Application No. PCT/IB2018/054072) dated Aug. 21, 2018.

* cited by examiner

FIG. 2A
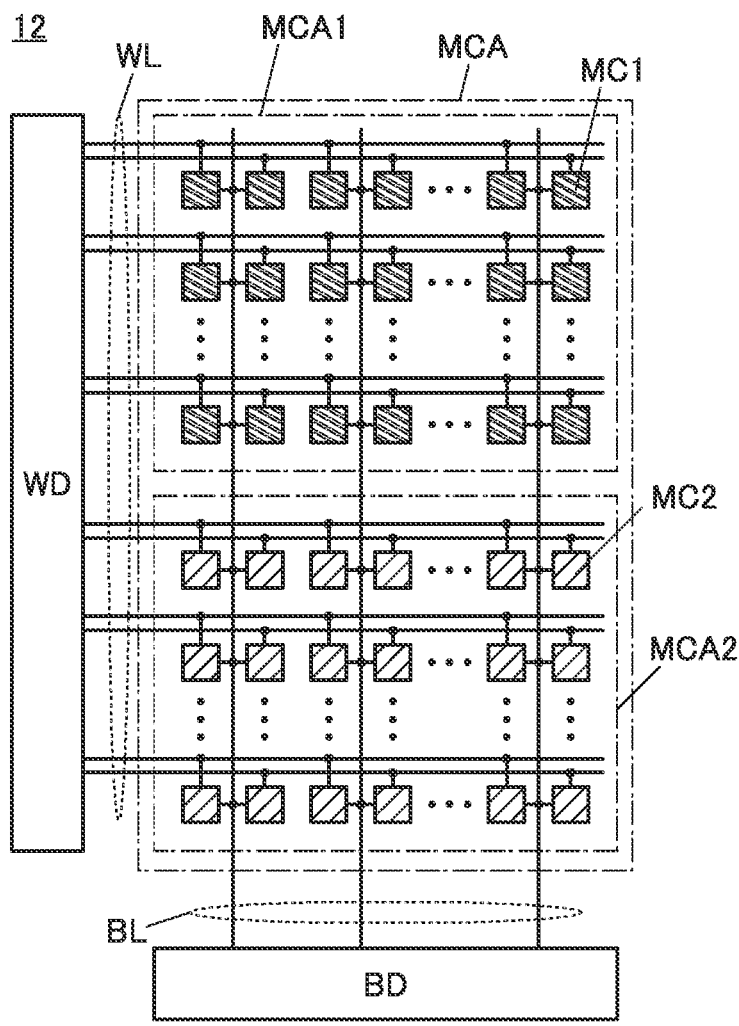
FIG. 2B1
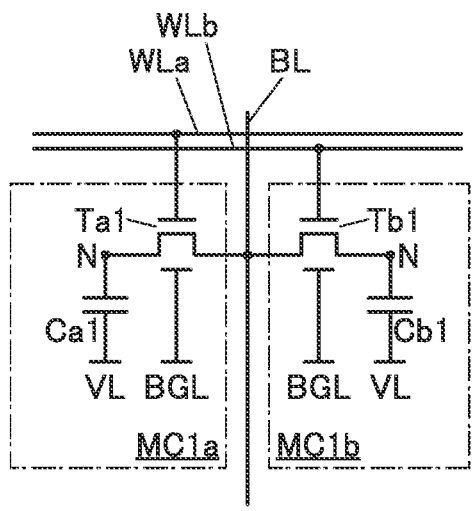
FIG. 2B2
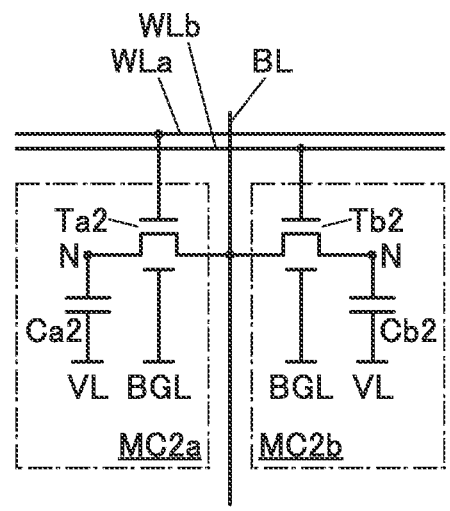

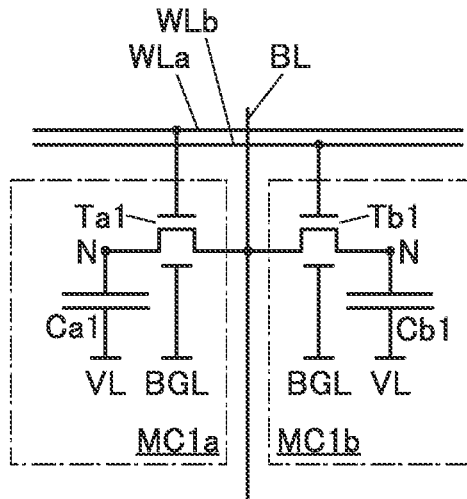
FIG. 3A1
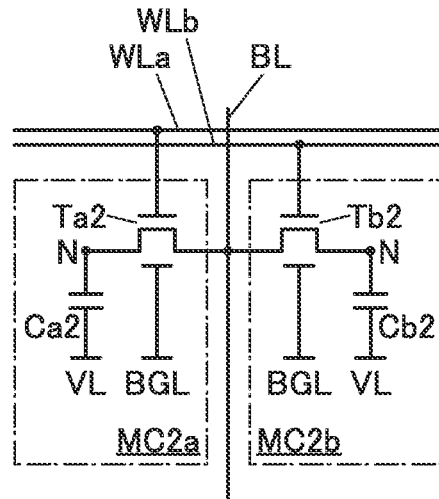
FIG. 3A2
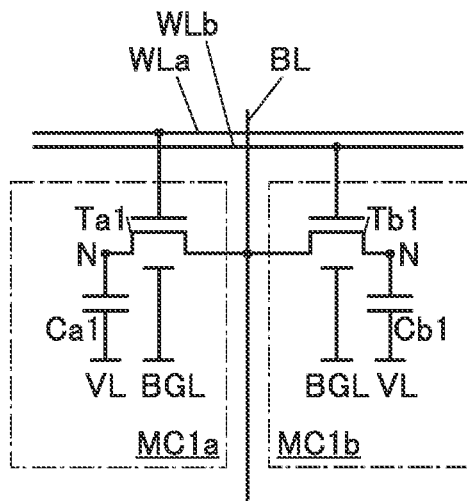
FIG. 3B1
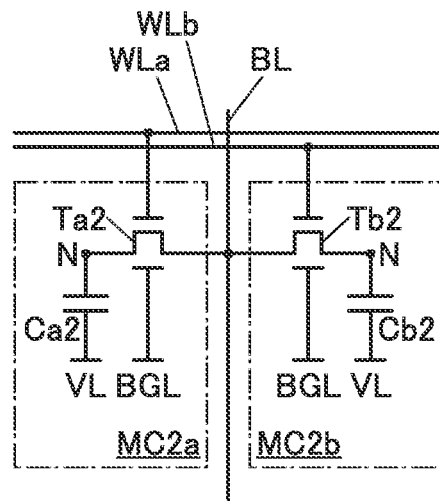
FIG. 3B2

SEMICONDUCTOR DEVICE, ELECTRONIC COMPONENT, AND ELECTRONIC DEVICE

TECHNICAL FIELD

One embodiment of the present invention relates to a semiconductor device including a memory circuit.

BACKGROUND ART

A processor executes a program called a start-up routine when it is booted. Although it depends on the environment in which a program is executed, the processing content of the start-up routine includes processing necessary before the main routine is executed, such as setting a variety of registers, copying minimally necessary programs from a memory device outside the processor into a cache memory, and setting the cache memory to a usable state. A specific example of the setting of a variety of registers is a setting for a peripheral device connected to the outside of the processor, such as a latency setting for a DRAM (Dynamic RAM) that is a main memory device.

In many cases, the start-up routine is stored in a nonvolatile memory device (hereinafter also referred to as a nonvolatile memory) outside the processor. A mask ROM, a PROM, an EPROM, a flash memory, or the like is normally used as a nonvolatile memory device for storing the start-up routine. Patent Document 1 below discloses a processor which includes a power-on determination means for determining whether power has been turned on for a system or for periodic operation and therefore does not require an operation to read table data of initial values from a boot ROM when power has been turned on for the periodic operation.

REFERENCES

Patent Document

[Patent Document 1] Japanese Published Patent Application No. 2003-196097

SUMMARY OF THE INVENTION

Problems to be Solved by the Invention

The boot time of the processor depends on the speed of reading data from a memory where the start-up routine is stored. Nonvolatile memories have a lower reading speed than an SRAM (Static RAM) or the like. Therefore, it takes a very long time to boot the processor in the case where power consumption is reduced by power gating. Accordingly, an effect of reducing power consumption becomes extremely small.

In view of the foregoing technical background, an object of one embodiment of the present invention is to provide a semiconductor device in which a processor can be booted in a short time when a start-up routine program is executed. Another object of one embodiment of the present invention is to provide a semiconductor device in which a processor can be rebooted in a short time at the time of frequent power gating. Another object of one embodiment of the present invention is to provide a semiconductor device which can reduce power consumption.

Means for Solving the Problems

One embodiment of the present invention is a semiconductor device including a first memory region and a second memory region; in the semiconductor device, a first memory cell included in the first memory region includes a first transistor and a first capacitor, a second memory cell included in the second memory region includes a second transistor and a second capacitor, the first memory cell has a function of turning off the first transistor and retaining a charge corresponding to first data in the first capacitor, the second memory cell has a function of turning off the second transistor and retaining a charge corresponding to second data in the second capacitor, the first transistor and the second transistor each include an oxide semiconductor in a channel formation region, and the first capacitor has a larger storage capacitance than the second capacitor.

One embodiment of the present invention is a semiconductor device including a first memory region and a second memory region; in the semiconductor device, a first memory cell included in the first memory region includes a first transistor and a first capacitor, a second memory cell included in the second memory region includes a second transistor and a second capacitor, the first memory cell has a function of turning off the first transistor and retaining a charge corresponding to first data in the first capacitor, the second memory cell has a function of turning off the second transistor and retaining a charge corresponding to second data in the second capacitor, the first transistor and the second transistor each include an oxide semiconductor in a channel formation region, and L (L is a channel length)/W (W is a channel width) of the first transistor is larger than L/W of the second transistor.

One embodiment of the present invention is preferably the semiconductor device in which the first data is program data for executing a start-up routine.

One embodiment of the present invention is preferably the semiconductor device in which the first memory region has a function of being an accessible region when a processor that executes the start-up routine is booted and being an inaccessible region when the processor is in normal operation.

One embodiment of the present invention is the semiconductor device in which the first memory region has a function of being an accessible region when a processor that executes a start-up routine is booted and being an accessible region when the processor is in normal operation, a function of operating as a main memory device or a cache memory after the start-up routine is executed, and a function of loading the start-up routine from the outside into the first memory region before the power of the semiconductor device is shut off.

Note that other embodiments of the present invention will be shown in the embodiments described below and the drawings.

Effect of the Invention

According to one embodiment of the present invention, a semiconductor device in which a processor can be booted in a short time when a start-up routine program is executed. One embodiment of the present invention can provide a semiconductor device in which a processor can be rebooted in a short time at the time of frequent power gating. One embodiment of the present invention can provide a semiconductor device which can reduce power consumption.

Note that one embodiment of the present invention can provide a novel semiconductor device or the like. Note that the descriptions of the effects do not disturb the existence of other effects. Note that one embodiment of the present invention does not necessarily achieve all of these effects.

Effects other than these will be apparent from the descriptions of the specification, the drawings, the claims, and the like, and can be derived from the descriptions of the specification, the drawings, the claims, and the like.

BRIEF DESCRIPTION OF THE DRAWINGS

FIGS. 2A-2B2 Diagrams illustrating a configuration of a memory circuit.

FIGS. 3A1-3B2 Diagrams each illustrating a configuration of a memory circuit.

MODE FOR CARRYING OUT THE INVENTION

Figure 1:
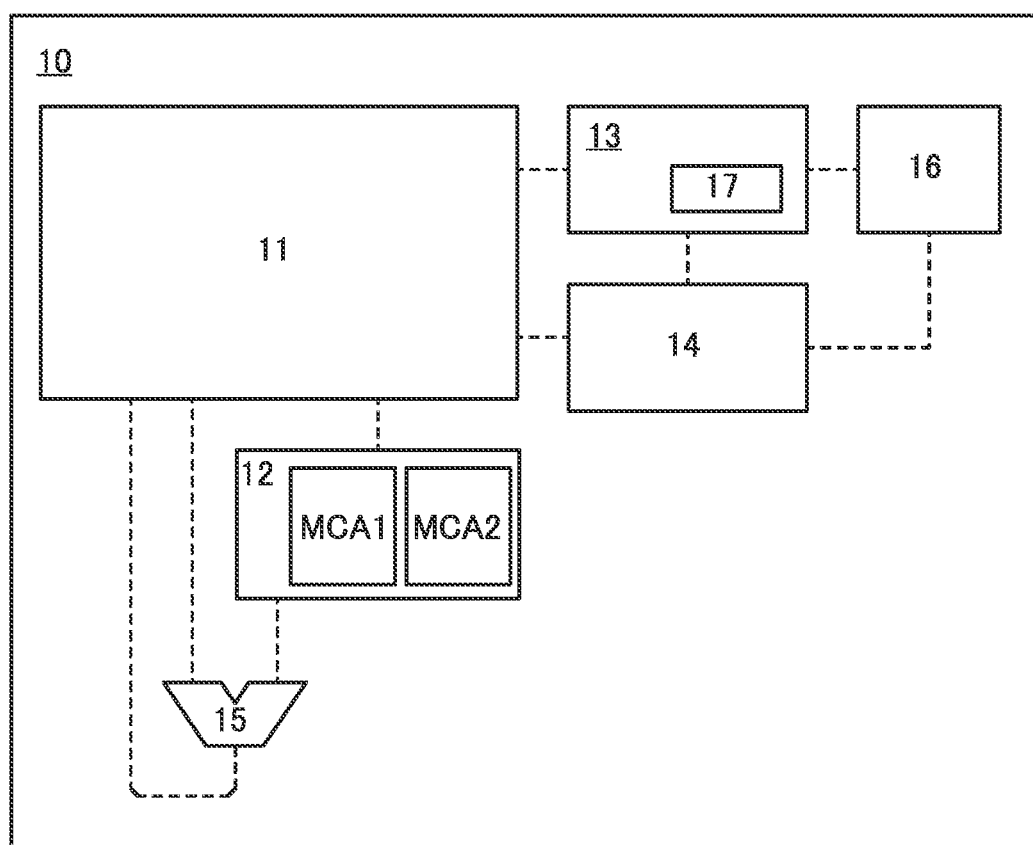
FIG. 1 A diagram illustrating a configuration of a semiconductor device.

Hereinafter, embodiments will be described with reference to drawings. Note that the embodiments can be implemented with many different modes, and it will be readily appreciated by those skilled in the art that modes and details can be changed in various ways without departing from the spirit and scope thereof. Thus, the present invention should not be interpreted as being limited to the following description of the embodiments.

Note that ordinal numbers such as "first," "second," and "third" in this specification and the like are used in order to avoid confusion among components. Thus, the ordinal numbers do not limit the number of components. Furthermore, the ordinal numbers do not limit the order of components.

Note that the same components or components having similar functions, components formed using the same material, components formed at the same time, or the like in the drawings are denoted by the same reference numerals in some cases, and the repeated description thereof is omitted in some cases.

Embodiment 1

<Configuration Example of Semiconductor Device>

First, a configuration example of a semiconductor device of one embodiment of the present invention will be described. FIG. 1 illustrates a configuration of a semiconductor device 10 of one embodiment of the present invention.

The semiconductor device 10 illustrated in FIG. 1 includes a processor 11, a memory circuit 12, a power management unit (PMU) 13, a register 14, a comparator 15, and a power supply 16.

The processor 11 has a function of executing a variety of programs by controlling the overall operations of the memory circuit 12, the PMU 13, the register 14, and the like. The memory circuit 12 has a function of storing a variety of data. The memory circuit 12 can retain data stored therein even in a period during which the supply of power to the memory circuit 12 is stopped. A specific structure of the memory circuit 12 and the operation thereof will be described later. In one embodiment of the present invention, the memory circuit 12 includes memory regions MCA1 and MCA2. The memory region MCA1 is a memory region that stores a start-up routine to be executed when the processor 11 is booted as data. The memory region MCA2 is a memory region that is used as a work region in the normal operation of the processor 11.

In one embodiment of the present invention, the memory circuit 12 functions as a nonvolatile memory that stores program data for executing the start-up routine of the processor 11 when the processor 11 is booted and functions as part of a main memory device (main memory) or a buffer memory device (cache memory) of the processor 11 after the processor 11 is booted. The memory circuit 12 includes a plurality of regions consisting of memory cells with different charge retention characteristics; in the plurality of regions, a region functioning as a nonvolatile memory and a region functioning as part of a main memory device (main memory) or a buffer memory device (cache memory) can be provided separately.

Note that the processor 11 may have another function, or may lack part of the function, for example. Therefore, the processor 11 may be referred to simply as a circuit, or may be referred to as a first circuit, a second circuit, or the like.

Note that the memory circuit 12 may have another function, or may lack part of the function, for example. Therefore, the memory circuit 12 may be referred to simply as a circuit, or may be referred to as a first circuit, a second circuit, or the like.

The comparator 15 has a function of determining whether data requested by the processor 11 is stored in the memory circuit 12 or not in the case where the memory circuit 12 functions as a cache memory. If it is determined that the data is not stored, a memory circuit separately provided outside the processor 11 is accessed.

Note that the comparator 15 may have another function, or may lack part of the function, for example. Therefore, the comparator 15 may be referred to simply as a circuit, or may be referred to as a first circuit, a second circuit, or the like.

The PMU 13 has a function of operating to start the supply of power to the processor 11 and the memory circuit 12 when the supply of power to the semiconductor device 10 from the outside is started. Furthermore, the PMU 13 may have a function of operating to start the supply of a variety of drive signals, such as a clock signal, necessary for the operation of the processor 11 or the memory circuit 12 to the processor 11 or the memory circuit 12 when the supply of power to the semiconductor device 10 is started.

The PMU 13 includes a counter 17. The counter 17 has a function of measuring a period in which the supply of power to the semiconductor device 10 from the outside is stopped. The register 14 has a function of storing data on the measured period. Note that although FIG. 1 illustrates a configuration example of the semiconductor device 10 in which the counter 17 is one of the components of the PMU 13, the counter 17 may be provided independent of the PMU 13 in the semiconductor device 10. Although FIG. 1 illustrates an example in which the register 14 is provided independent of the PMU 13 in the semiconductor device 10, the register 14 may be one of the components of the PMU 13.

Note that the PMU 13 may have another function, or may lack part of the function, for example. Therefore, the PMU 13 may be referred to simply as a circuit, or may be referred to as a first circuit, a second circuit, or the like.

Note that the counter 17 may have another function, or may lack part of the function, for example. Therefore, the counter 17 may be referred to simply as a circuit, or may be referred to as a first circuit, a second circuit, or the like.

In addition to the data on the above period, the register 14 may store data for determining whether to load the start-up routine into the memory circuit 12 from the outside of the semiconductor device 10 when the supply of power to the semiconductor device 10 from the outside is resumed.

Note that the register 14 may have another function, or may lack part of the function, for example. Therefore, the register 14 may be referred to simply as a circuit, or may be referred to as a first circuit, a second circuit, or the like.

The power supply 16 has a function of supplying power to the PMU 13 and the register 14 in a period where the supply of power to the semiconductor device 10 from the outside is stopped. In the case where the counter 17 is provided independent of the PMU 13 in the semiconductor device 10, the power supply 16 has a function of supplying power to the counter 17 in addition to the PMU 13 and the register 14 in the period where the supply of power to the semiconductor device 10 from the outside is stopped.

As the power supply 16, specifically, a primary battery, a power storage device such as a capacitor or a secondary battery, or the like can be used. As the secondary battery, a lead storage battery, a nickel-cadmium battery, a nickel-hydride battery, or a lithium-ion battery can be used, for example. As the capacitor, an electric double layer capacitor, or a hybrid capacitor in which one of a pair of electrodes has an electric double layer structure and the other utilizes an oxidation-reduction reaction, can be used, for example. The hybrid capacitor includes, for example, a lithium ion capacitor in which an electric double layer is formed in a positive electrode and in a negative electrode has a lithium ion secondary battery structure. In the case where the power storage device such as the capacitor or the secondary battery is used as the power supply 16, a charge control circuit for preventing overcharge or overdischarge of the power storage device may be provided in the semiconductor device 10.

The power supply 16 may include a circuit such as a DC-DC converter, a step-up circuit, or a step-down circuit. That is, the power supply 16 may have a function of generating a plurality of potentials. Accordingly, the power supply 16 can have a function of a power supply circuit.

The power supply 16 may have a function of being able to receive power wirelessly. That is, a structure may be employed in which the power supply 16 is charged when power is supplied from the outside through the use of a magnetic field, an electric field, an electromagnetic field, or the like. Therefore, the power supply 16 may include a rectifier circuit, a smoothing circuit, or the like. Alternatively, the power supply 16 may include an AC-DC converter or the like.

Note that the power supply 16 is not necessarily provided in the semiconductor device 10. The power supply 16 may be provided outside the semiconductor device 10, or may be used also as a power supply which supplies power to the semiconductor device 10. That is, a power supply which supplies power to the PMU 13 and the register 14 and a power supply which supplies power to the other components may be separately provided. Alternatively, a power supply which supplies power to the PMU 13 and the register 14 and a power supply which supplies power to the other components may be the same power supply, and power supply destination may be individually controlled. For example, the supply of power may be controlled such that power is supplied only to the PMU 13, the register 14, and the like and not to the other components.

Note that the power supply 16 may have another function, or may lack part of the function, for example. Therefore, the power supply 16 may be referred to simply as a circuit, or may be referred to as a first circuit, a second circuit, or the like.

<Configuration Example of Memory Circuit>

A configuration example of the memory circuit 12 included in the semiconductor device 10 of one embodiment of the present invention will be described below.

FIG. 2(A) illustrates the configuration of the memory circuit 12 (memory). The memory circuit 12 includes a memory cell array MCA, a driver circuit WD, and a driver circuit BD. The memory cell array MCA is also referred to as a memory region. The memory cell array MCA includes the memory cell array MCA1 and the memory cell array MCA2.

The memory cell array MCA1 is constituted by a plurality of memory cells MC1 arranged in a matrix. The memory cell array MCA2 is constituted by a plurality of memory cells MC2 arranged in a matrix.

The memory cells MC1 and MC2 have a function of storing data. The memory cells MC may have a function of storing two-level (high level and low level) data or may have a function of storing multilevel data of four or more levels. The memory cells MC may have a function of storing analog data.

The memory cells MC1 and MC2 are connected to wirings WL (also referred to as word lines) and wirings BL (also referred to as bit lines). Note that FIG. 2(A) illustrates a configuration example in which one wiring BL is shared by two adjacent memory cells MC1 or MC2 that are in the same row.

The driver circuit WD has a function of selecting a memory cell MC1 or MC2. Specifically, the driver circuit WD has a function of supplying a signal for selecting a memory cell MC1 or MC2 which is subjected to data writing or reading (hereinafter also referred to as a selection signal) to the wiring WL. The driver circuit WD can be formed using a decoder or the like.

The driver circuit WD has a structure which enables the memory cell array MCA1 and the memory cell array MCA2 to be selected independently. In other words, in the case where the memory circuit 12 is used as a cache memory or a main memory device of the processor 11, the memory cell array MCA1 becomes an accessible region and the memory cell array MCA2 becomes an inaccessible region when the processor 11 is booted. Meanwhile, the memory cell array MCA1 becomes an inaccessible region and the memory cell array MCA2 becomes an accessible region when the processor is in normal operation.

Specifically, a flag signal indicating the booting or normal operation of the processor 11 is input, and in response to the flag signal, a signal for selecting a memory cell MC1 in the memory cell array MCA1 is generated and a signal for selecting a memory cell MC2 in the memory cell array MCA2 is not generated when the processor 11 is booted. When the processor 11 is in normal operation, the signal for selecting a memory cell MC1 in the memory cell array MCA1 is not generated and the signal for selecting a memory cell MC2 in the memory cell array MCA2 is generated.

The driver circuit BD has a function of writing data to the memory cells MC1 and MC2 and reading data stored in the memory cells MC1 and MC2. Specifically, the driver circuit BD has a function of supplying, to a wiring BL connected to the memory cell MC1 or MC2 to which data is written, a potential corresponding to data to be stored in the memory cell MC (hereinafter also referred to as a writing potential). Furthermore, the driver circuit BD has a function of reading a potential corresponding to data stored in the memory cell MC (hereinafter also referred to as a reading potential) and outputting the potential to the outside. The driver circuit BD can include a column decoder, a precharge circuit, a sense amplifier, a latch, a shift register, or the like as a circuit for reading data, and a column decoder, a buffer, a shift register, or the like as a circuit for writing data.

The driver circuit WD and the driver circuit BD, as well as the memory cell array MCA, can be formed using single-polarity circuits including OS transistors. Consequently, transistors included in the memory cell array MCA, the driver circuit WD, and the driver circuit BD can have the same polarity, and the memory circuit 12 can be formed using a single-polarity circuit including OS transistors. In that case, the transistors included in the memory cell array MCA, the driver circuit WD, and the driver circuit BD can be fabricated concurrently in the same process.

Note that the single-polarity circuit including OS transistors can be stacked over a semiconductor substrate. Thus, the memory circuit 12 formed using a single-polarity circuit can be stacked over a circuit formed over the semiconductor substrate, leading to a reduction in the area of the semiconductor device.

The memory cells MC1 and MC2, the driver circuit WD, and the driver circuit BD can be formed using transistors including an oxide semiconductor in channel formation regions (OS transistors). An oxide semiconductor has a bandgap of 3.0 eV or larger; thus, an OS transistor has a low leakage current due to thermal excitation and also has an extremely low off-state current. Note that off-state current refers to current that flows between a source and a drain when a transistor is in an off state. An oxide semiconductor used in a channel formation region of a transistor is preferably an oxide semiconductor containing at least one of indium (In) and zinc (Zn). Typical examples of such an oxide semiconductor include an In-M-Zn oxide (an element M is Al, Ga, Y, or Sn, for example). Reducing both impurities serving as electron donors, such as moisture or hydrogen, and oxygen vacancies can make an oxide semiconductor i-type (intrinsic) or substantially i-type. Such an oxide semiconductor can be referred to as a highly purified oxide semiconductor. Note that an OS transistor will be described in details in Embodiment 2.

An OS transistor has an extremely low off-state current and thus is suitably used especially as a transistor included in the memory cell MC. An off-state current per micrometer of channel width of an OS transistor can be, for example, lower than or equal to 100 zA/μm, lower than or equal to 10 zA/μm, lower than or equal to 1 zA/μm, or lower than or equal to 10 yA/μm. The use of an OS transistor in the memory cell MC enables data stored in the memory cell MC can be retained for a very long time.

FIG. 2(B-1) illustrates a circuit configuration of the memory cell MC1. FIG. 2(B-1) illustrates two adjacent memory cells and shows one of the memory cells as a memory cell MC1a and the other of the memory cells as a memory cell MC1b. The memory cell MC1a and the memory cell MC1b share one wiring BL.

FIG. 2(B-2) illustrates a circuit configuration of the memory cell MC2. FIG. 2(B-2) illustrates two adjacent memory cells and shows one of the memory cells as a memory cell MC2a and the other of the memory cells as a memory cell MC2b. The memory cell MC2a and the memory cell MC2b share one wiring BL.

The memory cells MC1 and MC2 each include a transistor T and a capacitor C. The transistor T and the capacitor C included in the memory cell MC1a are also referred to as a transistor Ta1 and a capacitor Ca1, respectively, and the transistor T and the capacitor C included in the memory cell MC1b are also referred to as a transistor Tb1 and a capacitor Cb1, respectively. The transistor T and the capacitor C included in the memory cell MC2a are also referred to as a transistor Ta2 and a capacitor Ca2, respectively, and the transistor T and the capacitor C included in the memory cell MC2b are also referred to as a transistor Tb2 and a capacitor Cb2, respectively. Furthermore, the wirings WL connected to the memory cells MC1a, MC1b, MC2a, and MC2b are also referred to as wirings WLa and WLb. Note that each transistor T is an n-channel OS transistor.

A gate of the transistor T is connected to the wiring WL, one of a source and a drain is connected to one electrode of the capacitor C, and the other of the source and the drain is connected to the wiring BL. The other electrode of the capacitor C is connected to a wiring VL through which a fixed potential (e.g., a ground potential or the like) is supplied. Note that a node that is connected to one of the source and the drain of the transistor T and one electrode of the capacitor C is referred to as a node N.

The transistor T may have a pair of gates. In the case where the transistor has a pair of gates, one gate may be referred to as a first gate, a front gate, or simply a gate, and the other gate may be referred to as a second gate or a back gate.

FIGS. 2(B-1) and 2(B-2) illustrate configuration examples in which each transistor T includes a back gate. The back gates of the transistors Ta1, Ta2, Tb1, and Tb2 are each connected to a wiring BGL. A predetermined potential is supplied to the back gates of the transistors Ta1, Ta2, Tb1, and Tb2 through the wiring BGL, whereby the threshold voltages of the transistors Ta1, Ta2, Tb1, and Tb2 can be controlled. For example, the threshold voltages of the transistors Ta1, Ta2, Tb1, and Tb2 can be higher than 0 V. Consequently, off-state current can be lowered. Note that the back gates of the transistors Ta1, Ta2, Tb1, and Tb2 can be formed using the same conductive layer.

When data is written to the memory cell MC, a writing potential is supplied to the wiring BL. Then, a selection signal (high-level potential) is supplied to the wiring WL so that the transistor T is brought into an on state. As a result, the writing potential is supplied to the node N. After that, a low-level potential is supplied to the wiring WL so that the transistor T is brought into an off state. As a result, the node N is brought into a floating state and the writing potential is retained.

When data stored in the memory cell MC is read, the potential of the wiring BL is a reading potential. A selection signal (high-level potential) is supplied to the wiring WL so that the transistor T is brought into an on state. As a result, the potential of the wiring BL is determined in accordance with the potential of the node N, so that data stored in the memory cell MC is read.

Since an OS transistor is used as the transistor T, the potential of the node N is retained for a very long time in a period during which the transistor T is in an off state. Accordingly, the frequency of data refresh can be markedly reduced and thus power consumption can be reduced.

The memory cell MC performs rewriting of data by charging and discharging of the capacitor C; thus, there is theoretically no limitation on the number of rewrite cycles of the memory cell MC, and data can be written to and read with low energy. In addition, the memory cell MC has a simple circuit configuration, and thus the capacity of the memory circuit 12 can be easily increased.

In the configuration of this embodiment, the memory cell MC1 is a memory cell superior to the memory cell MC2 in data retention characteristics and is used as a nonvolatile memory.

For example, the storage capacitance of the capacitors Ca1 and Cb1 is made larger than the storage capacitance of the capacitors Ca2 and Cb2. Specifically, the capacitors Ca1 and Cb1 are designed to have larger storage capacitance than the capacitors Ca2 and Cb2, as schematically illustrated in FIGS. 3(A-1) and 3(A-2).

Alternatively, the channel length-channel width ratio (L1/W1) of the transistors Ta1 and Tb1 is made larger than the channel length-channel width ratio (L2/W2) of the transistors Ta2 and Tb2. Specifically, the transistors Ta1 and Tb1 are designed to have a larger channel length and/or a smaller channel width than the transistors Ta2 and Tb2, as schematically illustrated in FIGS. 3(B-1) and 3(B-2).

With such a structure, the memory cell array MCA1 including the memory cell MC1 can be used as a memory cell array superior to the memory cell array MCA2 including the memory cell MC2 in data retention characteristics. The memory cell array MCA1 can be used as a nonvolatile memory that stores a start-up routine program. Note that even in the case where a structure in which the memory cell MC1 and the memory cell MC2 have different data retention characteristics is employed, a configuration in which the pitch of BL is the same is preferably employed. Specifically, a configuration is employed in which the pitch of the wiring BL is the same and the pitch of the wiring WL is different between the memory cell array MCA1 and the memory cell array MCA2. With such a configuration, a wiring BD can be shared and the integration degree can be easily increased.

The start-up routine program here includes setting a variety of registers in the processor, setting a cache memory to a usable state, and the like. Examples of the setting of a variety of registers include a setting for a peripheral device connected to the outside of the processor, such as a latency setting for a DRAM (Dynamic RAM) that is a main memory device. The start-up routine program is executed when the processor is booted or returns from power gating. In the case where the memory circuit 12 is used as a main memory device, the start-up routine program is executed after being copied in a cache memory.

In a general configuration, the start-up routine program is stored in a flash memory or an HDD (hard disk drive), which is an auxiliary memory device. Hence, it takes time to access data and to execute the program. The use of part of the memory circuit 12 as a cache memory or a main memory device as in the semiconductor device 10 of this embodiment enables high-speed execution of the program.

Note that in the case where the processor includes nonvolatile registers and returns from power gating, the settings of the variety of registers are unnecessary. Thus, it is effective to provide a flag register that determines booting or returning from power gating. In other words, in the case of returning from power gating, part corresponding to the settings of the variety of registers can be skipped in the program.

In the case where the memory circuit 12 is used as a cache memory or part of a main memory device, since the settings of corresponding part of the cache memory or main memory device are completed, a configuration in which only the settings of the other part of the cache memory or main memory device are executed can be employed. In other words, part corresponding to the settings of the cache memory or the part of the main memory device corresponding to the memory circuit 12 can be skipped in the program.

In the case where data retention characteristics of the memory cell MC1 are sufficient, the memory cell MC1 and the memory cell MC2 can have the same configuration. With such a configuration, the layout of the memory cells is easily optimized and the integration degree is easily increased.

Figure 4B:
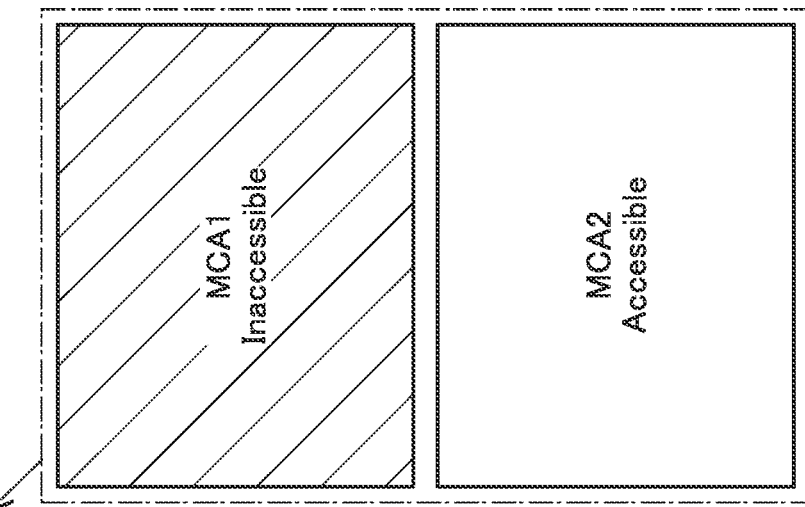
FIGS. 4A-4B Diagrams each illustrating a configuration of a memory circuit.
Figure 4A:
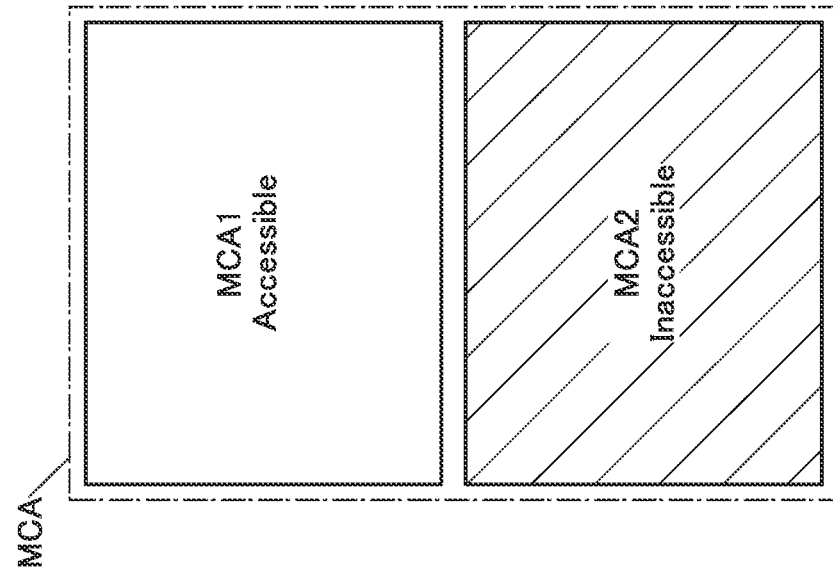

FIGS. 4(A) and 4(B) illustrate an accessible region (Accessible) and an inaccessible region (Inaccessible) in the case where the memory circuit 12 is used as a cache memory or a main memory device. FIG. 4(A) corresponds to a state where the processor is booted; the memory cell array MCA1 is an accessible region and the memory cell array MCA2 is an inaccessible region. FIG. 4(B) corresponds to a state where the processor is in normal operation; the memory cell array MCA1 is an inaccessible region and the memory cell array MCA2 is an accessible region.

When the memory circuit 12 of the semiconductor device 10 has the above configuration and is used as a cache memory or a main memory device of the processor 11, the processor 11 can be booted in a short time from power gating; thus, frequent power gating is easily achieved and a semiconductor device which can reduce power consumption can be provided.

Figure 5A:
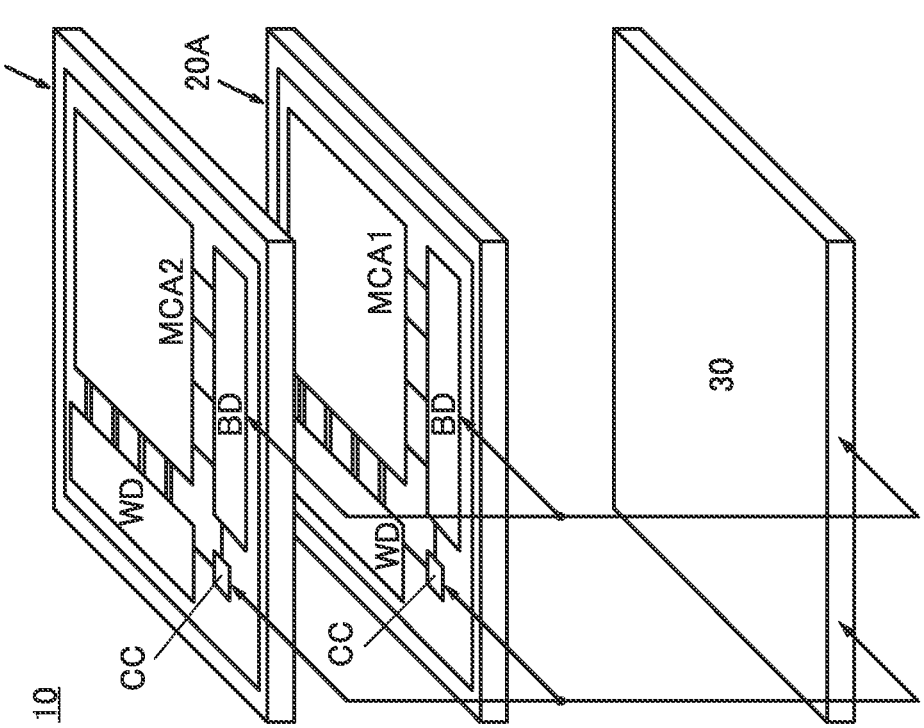
FIGS. 5A-5B Diagrams each illustrating a configuration of a memory circuit.

FIG. 5(A) illustrates a configuration example of the semiconductor device 10. The semiconductor device 10 includes a layer 20 provided with a single-polarity circuit including OS transistors. The memory circuit 12 illustrated in FIG. 2(A) can be provided in the layer 20.

Data to be written to the memory cell array MCA1 or MCA2 is input to the driver circuit BD from the outside. Data read from the memory cell array MCA1 or MCA2 is output to the outside from the driver circuit BD.

Each of the memory cell arrays MCA1 and MCA2, the driver circuit WD, and the driver circuit BD included in the memory circuit 12 is formed using a single-polarity circuit including OS transistors. Hence, the memory circuit 12 can be formed in the same layer 20.

In the case where the memory circuit 12 is formed using an n-channel OS transistor formed in the layer 20 and a transistor formed in another layer (e.g., a transistor formed in a semiconductor substrate), for example, a number of connection portions (contact holes and wirings) for connecting these transistors are necessary. An increase in the number of connection portions becomes significant particularly when a plurality of memory cells MC1 and MC2 are formed using OS transistors and transistors formed in another layer because connection between the two layers are required in each of the memory cells MC1 and MC2. The increase in the number of connection portions causes a decrease in flexibility in circuit layout design.

Moreover, entry of impurities (e.g., hydrogen) into an oxide semiconductor contained in an OS transistor causes degradation of the OS transistor. The connection portion serves as a path of impurities, and impurities may enter the layer 20 through the connection portion. Thus, more impurities enter the oxide semiconductor when the number of connection portions between the two layers is increased, leading to degradation of the OS transistor formed in the layer 20.

In one embodiment of the present invention, the memory circuit 12 is formed using single-polarity circuits including OS transistors. Accordingly, a connection between different layers in the memory circuit 12 is unnecessary. This can reduce the number of connection portions, leading to an improvement in flexibility in circuit layout design and an improvement in the reliability of the OS transistors.

In particular, since a large number of memory cells MC1 and MC2 are provided, the use of single-polarity circuits for the memory cells MC1 and MC2 can largely reduce the number of connection portions. In addition, when the driver circuit WD and the driver circuit BD are formed in the same layer as the memory cell arrays MCA1 and MCA2, it is possible to prevent providing a number of wirings WL connecting the driver circuit WD and the memory cell arrays MCA and MCA2 and a number of wirings BL connecting the driver circuit BD and the memory cell arrays MCA between the layers, leading to a further reduction in the number of connection portions.

The memory circuit 12 can be used as, for example, a cache memory, a main memory device, an auxiliary memory device, or the like in a computer.

The layer 20 may include a control circuit CC. The control circuit CC has a function of controlling the operations of the driver circuit WD and the driver circuit BD. Specifically, the control circuit CC has a function of generating a variety of signals for controlling the operations of the driver circuit WD and the driver circuit BD in response to a control signal (address signal, clock signal, chip enable signal, or the like) input from the outside.

The driver circuit WD generates a selection signal in response to a signal (address signal, control signal, or the like) supplied from the control circuit CC, and supplies the selection signal to the memory cell array MCA1 or MCA2. The driver circuit BD generates a writing potential corresponding to data input from the outside in response to a signal (address signal, control signal, or the like) supplied from the control circuit CC, and outputs the writing potential to the memory cell array MCA1 or MCA2. The driver circuit BD outputs data read from the memory cell array MCA1 or MCA2 to the outside in response to a signal (address signal, control signal, or the like) supplied from the control circuit CC.

The control circuit CC is formed using a single-polarity circuit including OS transistors. For this reason, the control circuit CC can be provided in the layer 20; thus, the operation of the memory circuit 12 can be controlled by the control circuit CC provided in the same layer. Hence, connection portions between the control circuit CC and the driver circuit WD and the driver circuit BD can be omitted.

Another circuit can be provided in the layer 20. For example, the layer 20 may include the processor and peripheral circuits. In that case, the processor 11 and the peripheral circuits are formed using single-polarity circuits including OS transistors. Examples of the peripheral circuits include the power management unit (PMU) 13, the register 14, the comparator 15, and the power supply 16.

The control circuit CC may be connected to the processor and the peripheral circuits via a bus. Thus, data or a signal can be sent or received between the control circuit CC, the processor, and the peripheral circuits via the bus. For example, processing in which data output to the control circuit CC from the memory cell array MCA1 or MCA2 is used in processing by the processor or the peripheral circuits can be performed.

Figure 5B:
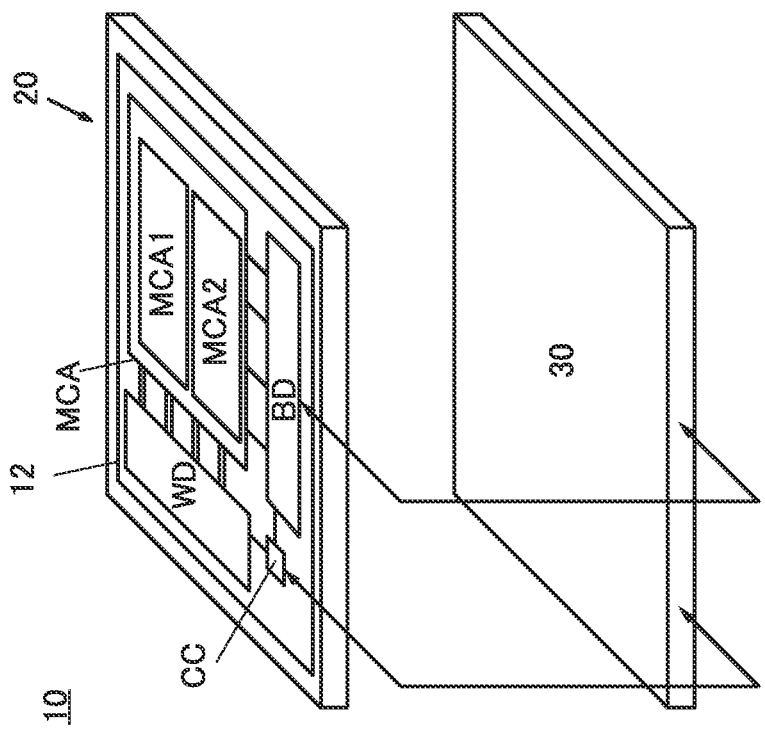

Note that the layer 20 can be stacked over a semiconductor substrate and a signal input to the layer 20 can be supplied from a circuit formed on the semiconductor substrate. FIG. 5(B) illustrates a configuration example in which layers 20A and 20B are stacked over a layer 30. The layer 20A is a layer in which the memory cell array MCA1 is provided, and the layer 20B is a layer in which a memory cell array MCAB is provided. The layer 30 includes a circuit formed using a transistor formed on the semiconductor substrate. The circuit may have a function of outputting a control signal to the control circuit CC or a function of outputting data to the driver circuit BD. Data output from the driver circuit BD may be input to the circuit included in the layer 30.

In the case where data or a signal is sent or received between the layers 20A and 20B and the layer 30, the layers 20A and 20B and the layer 30 are connected to each other through a wiring provided between the layers.

In one embodiment of the present invention, the memory circuit 12 is formed using single-polarity circuits including OS transistors as described above; thus, the number of connection portions between the layer 20 and the layer 30 can be reduced.

Although a configuration in which the control circuit CC is provide in the layer 20 is described above, the control circuit CC may be provided in the layer 30 illustrated in FIGS. 5(A) and 5(B). In that case, the control circuit CC is formed using a transistor formed on the semiconductor substrate. Moreover, the control circuit CC is connected to the driver circuit WD and the driver circuit BD through connection portions formed between the layer 20 and the layer 30.

<Operation Example of Semiconductor Device>

Next, an operation example of the semiconductor device 10 illustrated in FIG. 1 will be described using a flowchart shown in FIG. 6.

Figure 6:
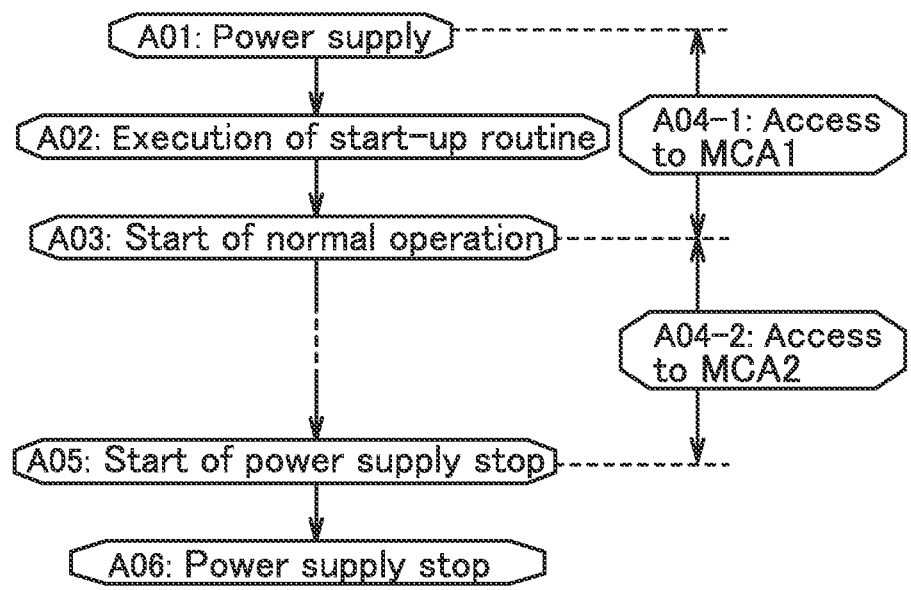
FIG. 6 A diagram illustrating an operation of a semiconductor device.

First, as shown in FIG. 6, the supply of power to the semiconductor device 10 is started (A01: Power supply). When the supply of power to the semiconductor device 10 is started, the PMU 13 operates to start the supply of power to the processor 11 and the memory circuit 12. The PMU 13 may operate to start the supply of a drive signal to the processor 11 and the memory circuit 12.

In the memory cell array MCA1 included in the memory circuit 12, a start-up routine is stored in the memory circuit 12 while the supply of power to the semiconductor device 10 is stopped. Thus, the PMU 13 operates such that the processor 11 executes the start-up routine stored in the memory circuit 12 (A02: Execution of start-up routine). By executing the start-up routine, the processor 11 becomes a state of being booted, i.e., a state in which a variety of programs can be executed by the processor 11.

Next, the semiconductor device 10 starts normal operation (A03: Start of normal operation). The memory cell array MCA2 included in the memory circuit 12 functions as a work region of the processor 11 as part of a main memory or a cache memory while power is supplied to the semiconductor device 10. Meanwhile, the memory cell array MCA1 included in the memory circuit 12 functions as a nonvolatile memory and keeps storing the start-up routine program also while power is supplied to the semiconductor device 10.

Note that before the normal operation is started, the memory cell array MCA1 is an accessible region and the memory cell array MCA2 is an inaccessible region as illustrated in FIG. 4(A) (A04-1: Access to MCA1). After the normal operation is started, the memory cell array MCA1 is an inaccessible region and the memory cell array MCA2 is an accessible region as illustrated in FIG. 4(A) (A04-2: Access to MCA2).

Then, when the stop of the supply of power to the semiconductor device 10 is started (A05: Start of power supply stop), the function of the memory circuit 12 is switched to the original function of storing the start-up routine.

Note that during the operation, the memory cell array MCA1 is an inaccessible region and the memory cell array MCA2 is an accessible region as illustrated in FIG. 4(B).

Then, the supply of power to the semiconductor device 10 is stopped (A06: Power supply stop).

Note that in one embodiment of the present invention, the function of the memory cell array MCA1 in the memory circuit 12 can be switched after the semiconductor device 10 starts normal operation. Specifically, after the semiconductor device 10 starts normal operation, the function of the memory cell array MCA1 in the memory circuit 12 can be switched from a function of a nonvolatile memory for storing the start-up routine program to the function of a cache memory of the processor 11. In the case of switching the function of the memory cell array MCA1 in the memory circuit 12 to the function of a cache memory, the start-up routine program is stored in the memory circuit 12 before the supply of power is stopped. In that case, the start-up routine does not need to be loaded into the memory circuit 12 from the outside when the supply of power to the semiconductor device 10 is resumed (A01: Power supply). As a result, the time it takes to boot the processor 11 can be shortened.

Figure 8:
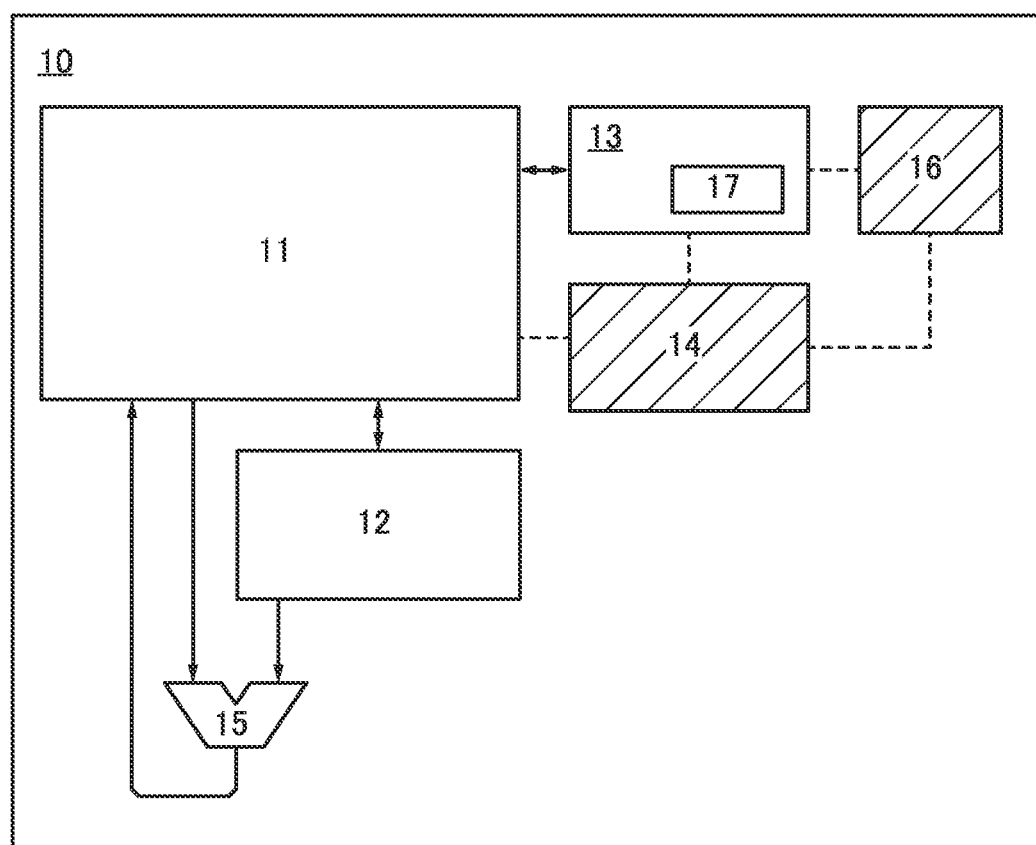
FIG. 8 A diagram illustrating an operation of a semiconductor device.

FIG. 8 schematically illustrates an operation of the semiconductor device 10 in the case where the memory cell array MCA2 in the memory circuit 12 functions as a cache memory of the processor 11. As illustrated in FIG. 8, the processor 11, the memory circuit 12, the comparator 15, and the PMU 13 in the semiconductor device 10 are in an operating state, i.e., in a state of being supplied with power and a drive signal. In the case where the counter 17 is provided independent of the PMU 13 in the semiconductor device 10, the counter 17 is not necessarily in the operating state. In the case where the memory circuit 12 functions as a buffer memory device of the processor 11, power is supplied to the semiconductor device 10 from the outside; therefore, power is not necessarily supplied from the power supply 16 to the PMU 13 and the register 14.

For example, when the processor 11 requests access to data in the memory circuit 12, the low-order bits of an address of the data are transmitted to the memory circuit 12 and the high-order bits are transmitted to the comparator 15. The memory circuit 12 transmits, to the comparator 15, the high-order bits (also referred to as tag data) of an address stored in a line corresponding to the low-order bits of the address to which access is requested. The comparator 15 compares the high-order bits of the address to which access is requested by the processor 11 with the high-order bits of the address transmitted from the memory circuit 12. If the high-order bits of the addresses match with each other as a result of the comparison, it means that the data is stored in the line corresponding to the low-order bits of the address to which access is requested by the processor 11. If the high-order bits of the addresses do not match with each other as a result of the comparison, it means that the data to which access is requested is not stored in the memory circuit 12. In the case where the data is stored in the memory circuit 12, the data is transmitted to the processor 11.

Figure 9:
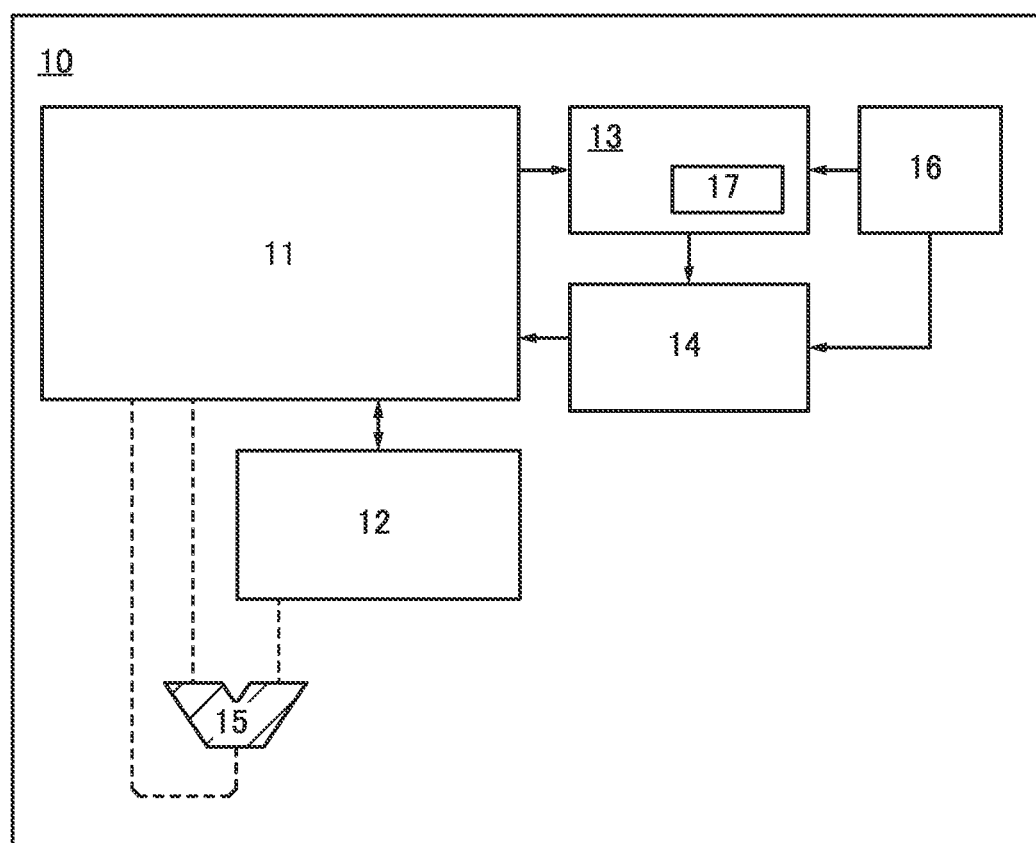
FIG. 9 A diagram illustrating an operation of a semiconductor device.

FIG. 9 schematically illustrates an operation of the semiconductor device 10 in the case where the memory cell array MCA1 in the memory circuit 12 functions as a nonvolatile memory of the processor 11. As illustrated in FIG. 9, the processor 11, the memory circuit 12, the PMU 13, and the register 14 in the semiconductor device 10 are in an operating state. In the case where the counter 17 is provided independent of the PMU 13 in the semiconductor device 10, the counter 17 is also in the operating state. In the case where the memory circuit 12 has a function of storing the start-up routine, power is supplied to the semiconductor device 10 from the outside in some cases and not in others. In the case where power is supplied to the semiconductor device 10, power is not necessarily supplied from the power supply 16 to the PMU 13 and the register 14. In the case where power is not supplied to the semiconductor device 10, power is supplied from the power supply 16 to the PMU 13 and the register 14.

Figure 7:
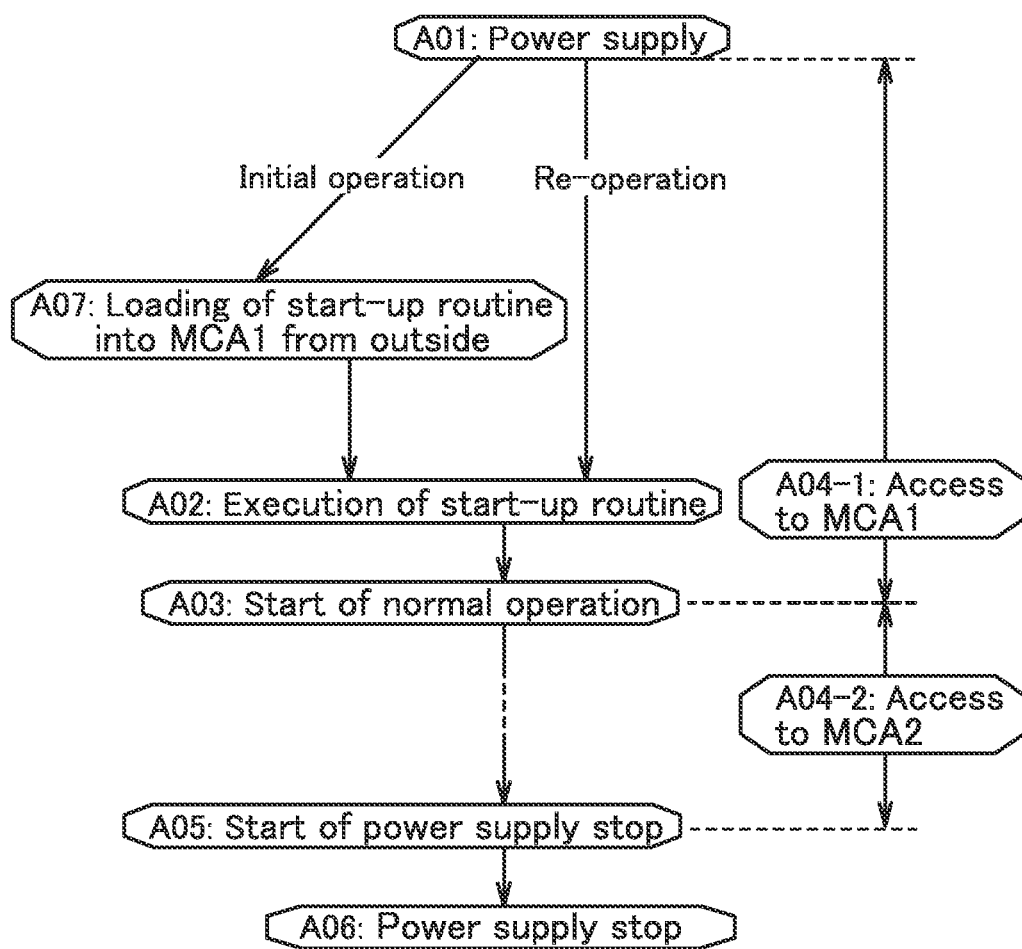
FIG. 7 A diagram illustrating an operation of a semiconductor device.

Note that in the initial operation of the memory circuit 12, in the memory cell array MCA1 included in the memory circuit 12, the start-up routine program is not stored in the memory circuit 12. Thus, a step of loading the start-up routine program from an external memory circuit and storing the program in the memory cell array MCA1 included in the memory circuit 12 (A07: Loading of start-up routine into MCA1 from outside) is required in the initial operation as illustrated in FIG. 7. Note that in the case of re-operation, for example, in the case where the start-up routine program is stored in the memory cell array MCA1, the step of A07 is unnecessary.

<Block Diagram of Memory Circuit>

Next, a specific configuration example of the memory circuit 12 including the memory cell MC will be described.

Figure 10:
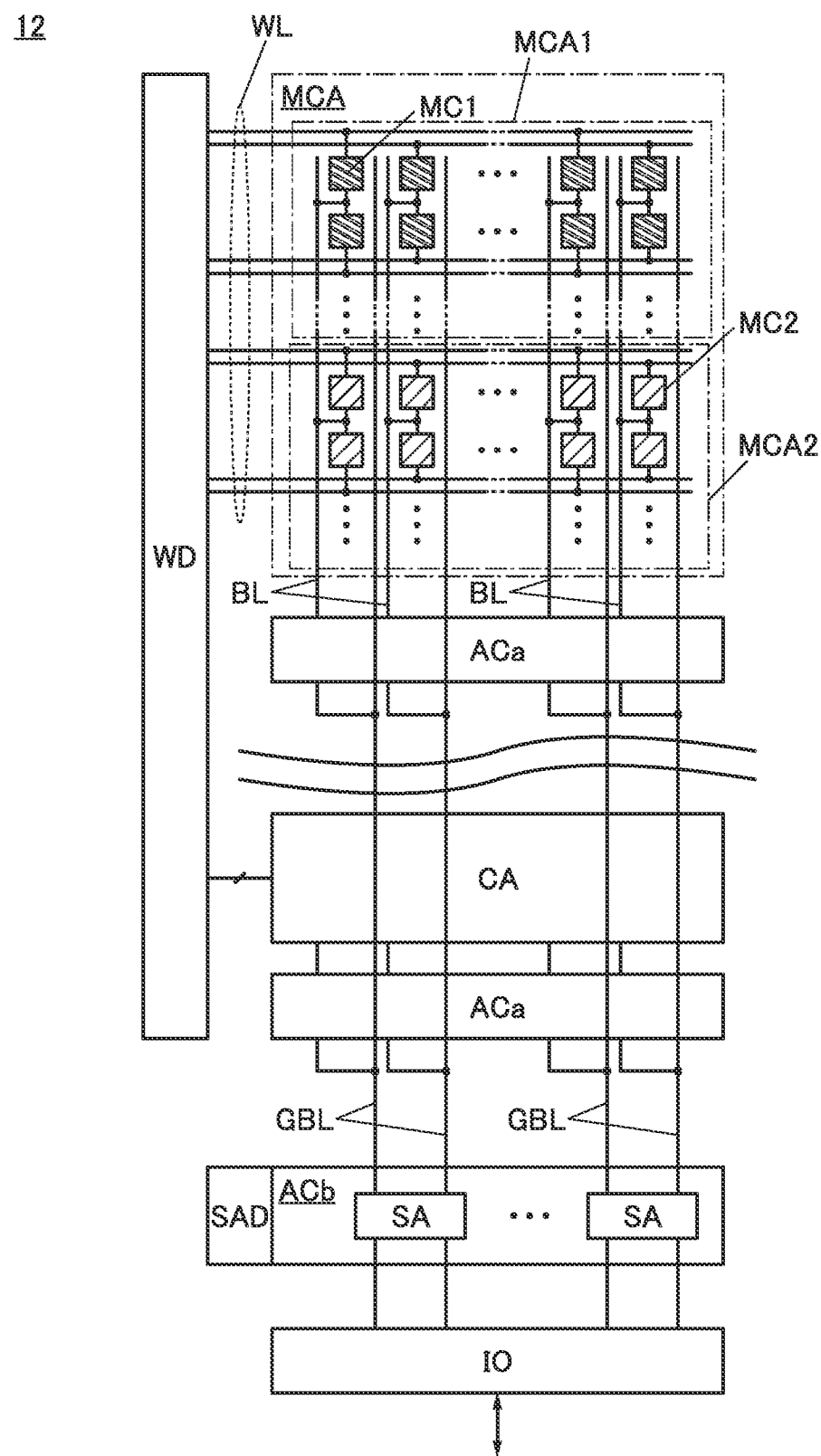
FIG. 10 A diagram illustrating a configuration of a memory circuit.

FIG. 10 illustrates the specific configuration example of the memory circuit 12. The memory circuit 12 illustrated in FIG. 10 includes the memory cell array MCA including the memory cell array MCA1 having a plurality of memory cells MC1 and the memory cell array MCA2 having a plurality of memory cells MC2, and amplifier circuits ACa whose number is the same as that of the memory cell arrays MCA. The memory circuit 12 also includes an amplifier circuit ACb provided with a plurality of sense amplifiers SA, a driver circuit SAD, and an input/output circuit IO. The driver circuit BD in FIG. 2(A) includes the amplifier circuit ACa, the amplifier circuit ACb, the driver circuit SAD, and the input/output circuit IO.

The amplifier circuit ACa has a function of amplifying the potential of the wiring BL. Specifically, a potential (reading potential) supplied from the memory cell array MCA to the wiring BL is amplified by the amplifier circuit ACa and output to a wiring GBL. Note that the amplifier circuit ACa may have a function of selecting whether to output the potential of the wiring BL to the wiring GBL. The potential output to the wiring GBL is then input to the amplifier circuit ACb.

The amplifier circuit ACb has a function of amplifying the potential of the wiring GBL. Specifically, the amplifier circuit ACb has a function of amplifying the reading potential output from the memory cell array MCA through the amplifier circuit ACa and outputting the potential to the input/output circuit IO. The amplifier circuit ACb also has a function of amplifying a writing potential input from the input/output circuit IO and outputting the potential to the wiring GBL. A plurality of sense amplifiers SA are used for the potential amplification by the amplifier circuit ACb.

The sense amplifier SA has a function of amplifying the potential difference between two wirings GBL. Specifically, the sense amplifier SA is connected to two wirings GBL, and has a function of, using the potential of one wiring GBL as a reference potential, amplifying the difference between the reference potential and the potential of the other wiring GBL. The sense amplifier SA also has a function of retaining the potential difference between two wirings GBL.

Note that the operation of the sense amplifier SA can be controlled by the driver circuit SAD. The driver circuit SAD has a function of receiving a control signal, an address signal, or the like used for the operation control of the sense amplifier SA and controlling the sense amplifier SA, for example. The driver circuit SAD selects a sense amplifier SA that outputs a signal to the input/output circuit IO or a sense amplifier SA that receives a signal output from the input/output circuit IO, for example.

The input/output circuit IO has a function of outputting data read from the memory cell array MCA through the sense amplifier SA to the outside. The input/output circuit IO also has a function of outputting data input from the outside to the memory cell array MCA through the sense amplifier SA.

Note that another amplifier circuit may be provided between the amplifier circuit ACb and the input/output circuit IO. The amplifier circuit has a function of amplifying the output of the amplifier circuit ACb and supplying the output to the input/output circuit IO and a function of amplifying the output of the input/output circuit IO and supplying the output to the amplifier circuit ACb.

The amplifier circuit ACa, the amplifier circuit ACb, the driver circuit SAD, and the input/output circuit IO can be formed using single-polarity circuits including OS transistors. Thus, the driver circuit BD can be formed using single-polarity circuits; accordingly, the driver circuit BD can be provided in the layer 20 illustrated in FIGS. 5(A) and 5(B).

Figure 11:
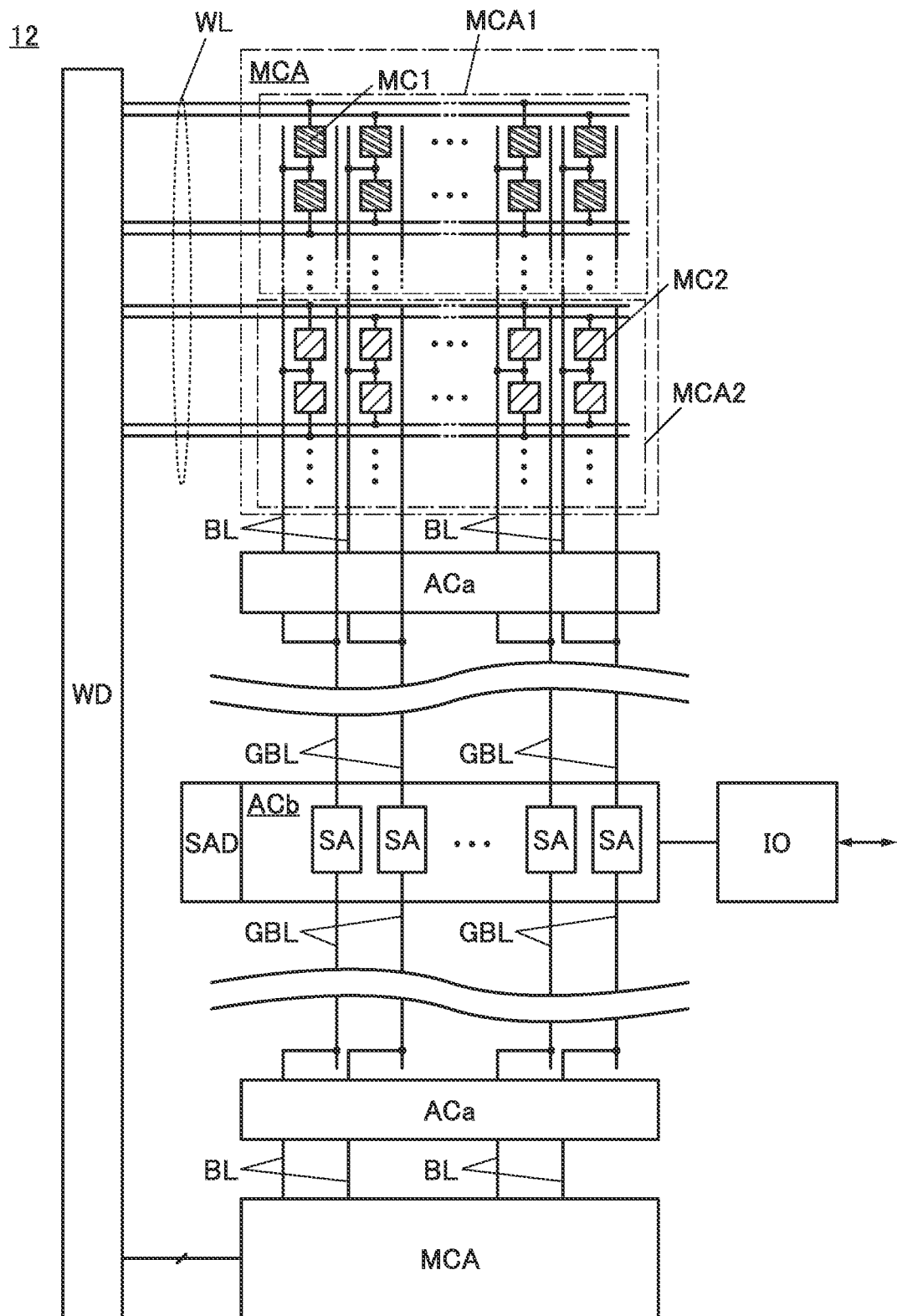
FIG. 11 A diagram illustrating a configuration of a memory circuit.
Figure 12:
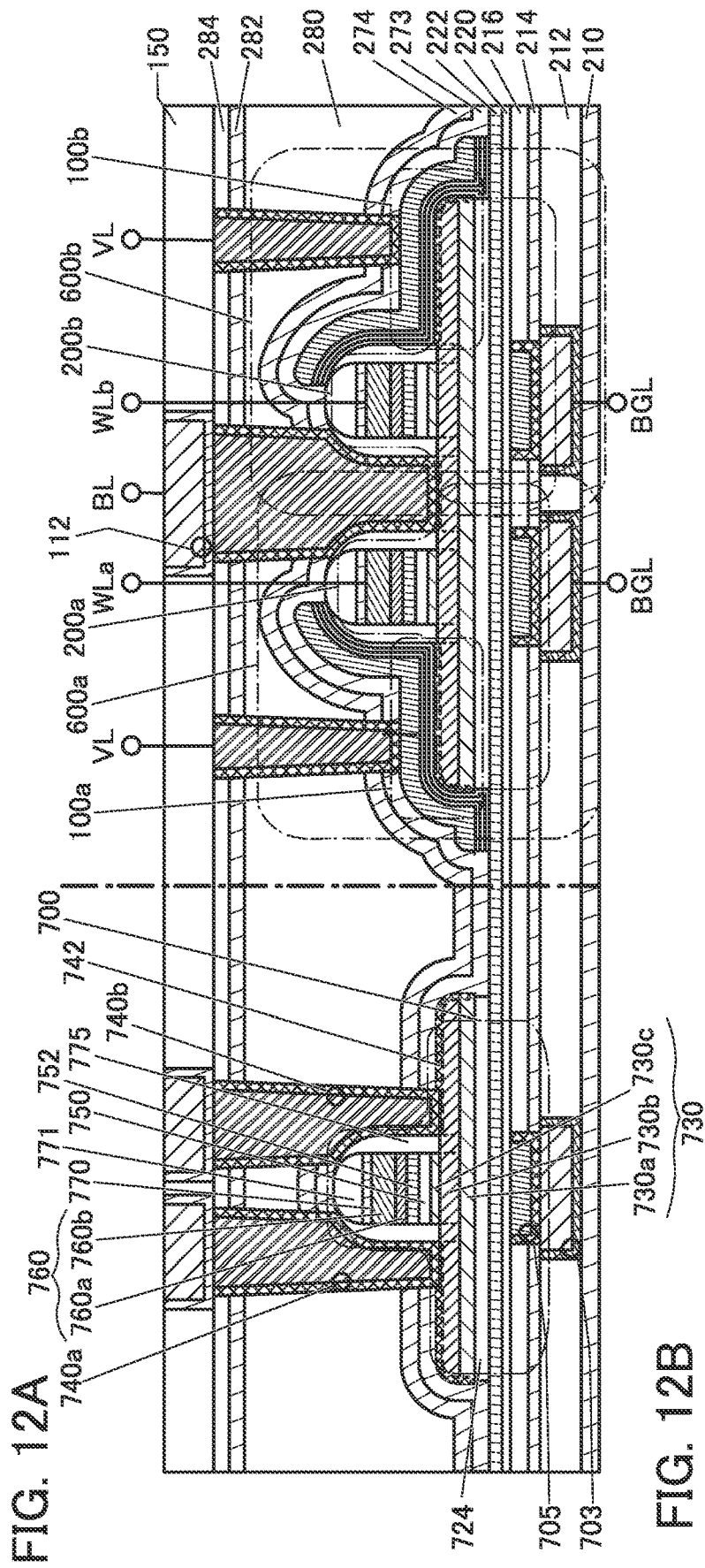
FIGS. 12A-12B A cross-sectional view illustrating a structure example of a semiconductor device.

Note that circuits included in the memory circuit 12 may be arranged as in FIG. 11. In FIG. 11, the amplifier circuits ACa and the memory cell arrays MCA each including the memory cell array MCA1 having a plurality of memory cells MC1 and the memory cell array MCA2 having a plurality of memory cells MC2 are arranged opposite to each other in the vertical direction of the drawing with the amplifier circuit ACb positioned therebetween. The sense amplifier SA is connected to the wiring GBL connected to an upper cell array CA and the wiring GBL connected to a lower cell array CA, and amplifies the potential difference between the wirings GBL.

Note that the layouts of the memory circuit 12 illustrated in FIG. 10 and FIG. 11 can be referred to as a folded-type layout and an open-type layout, respectively.

This embodiment can be combined with the description of the other embodiments as appropriate.

Embodiment 2

In this embodiment, structure examples of an OS transistor that can be used as the transistor of the memory circuit 12 described in the above embodiment will be described with reference to FIG. 12 to FIG. 26.

FIG. 12 to FIG. 17 are a top view and cross-sectional views of semiconductor devices of one embodiment of the present invention each including a transistor 700, a memory cell 600a, and a memory cell 600b. Hereinafter, the memory cell 600a and the memory cell 600b are collectively referred to as a memory cell 600, in some cases.

Figure 13:
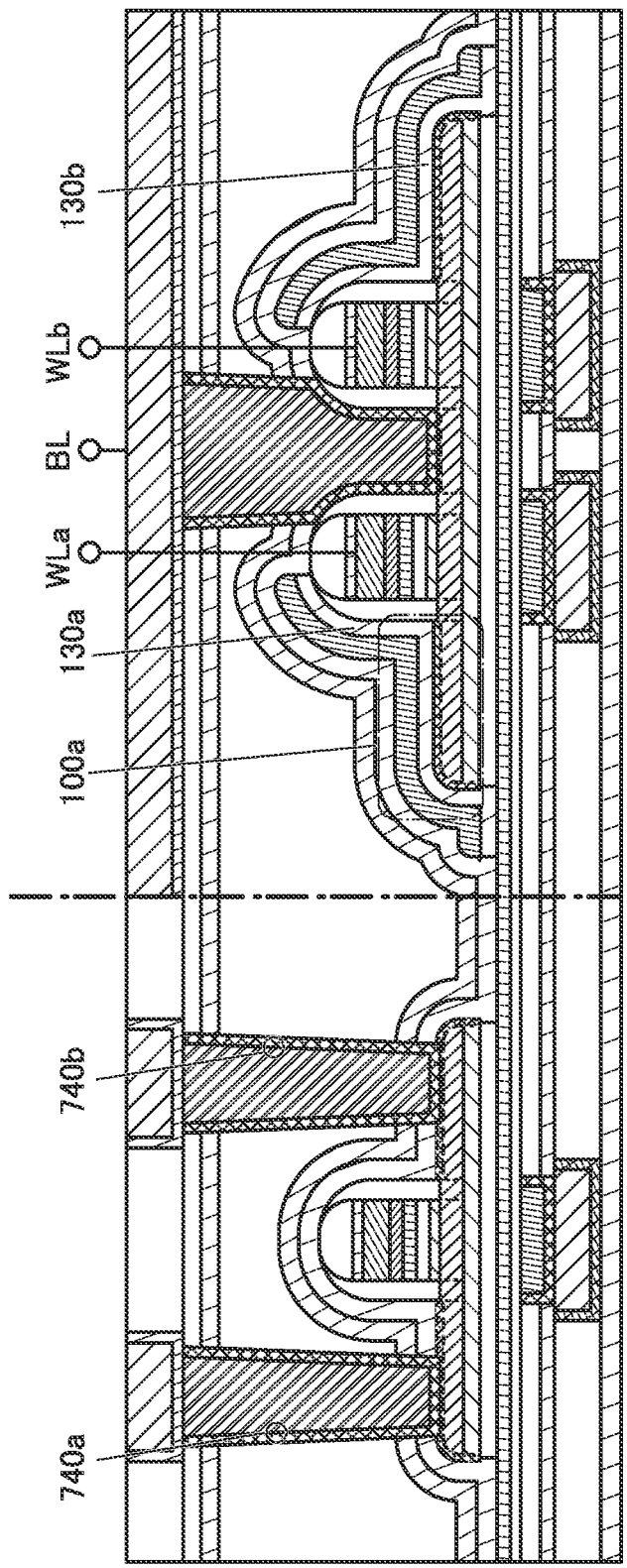
FIG. 13 A cross-sectional view illustrating a structure example of a semiconductor device.
Figure 14:
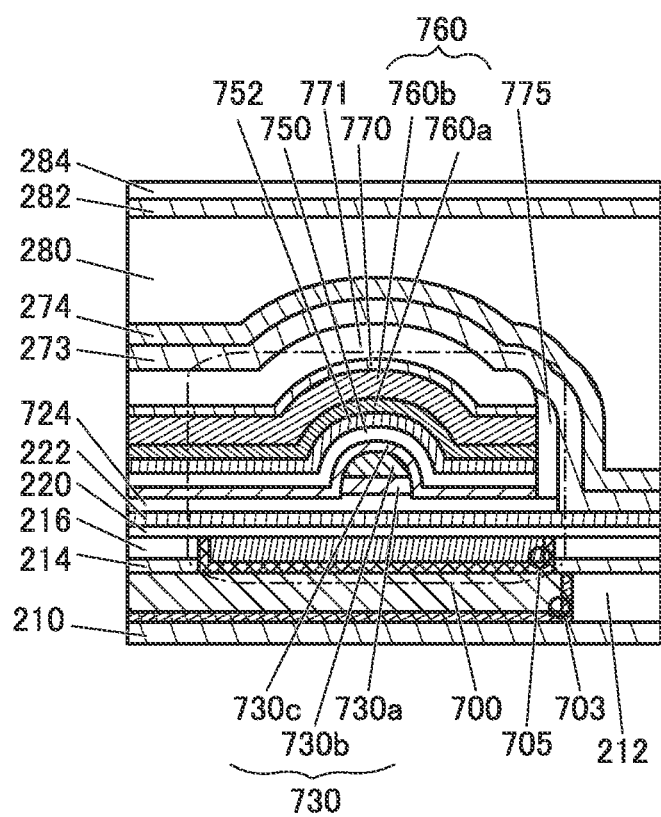
FIG. 14 A cross-sectional view illustrating a structure example of a semiconductor device.
Figure 15A:
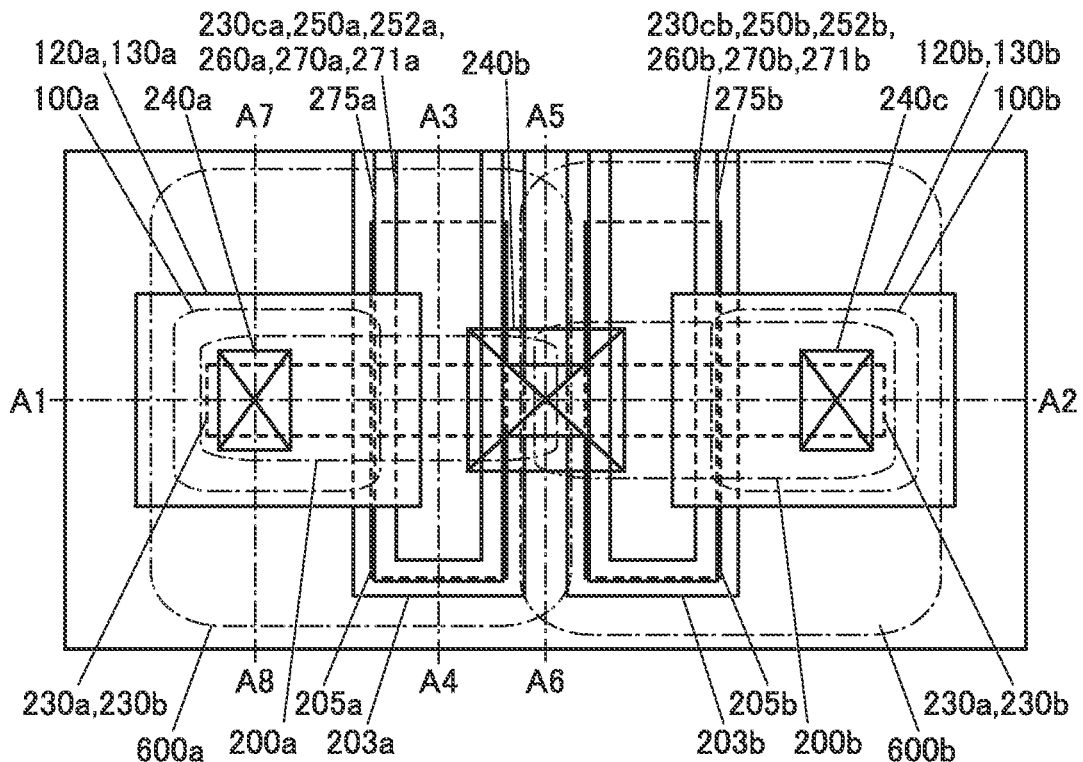
FIGS. 15A-15B A top view and a cross-sectional view illustrating a structure example of a semiconductor device.
Figure 15B:
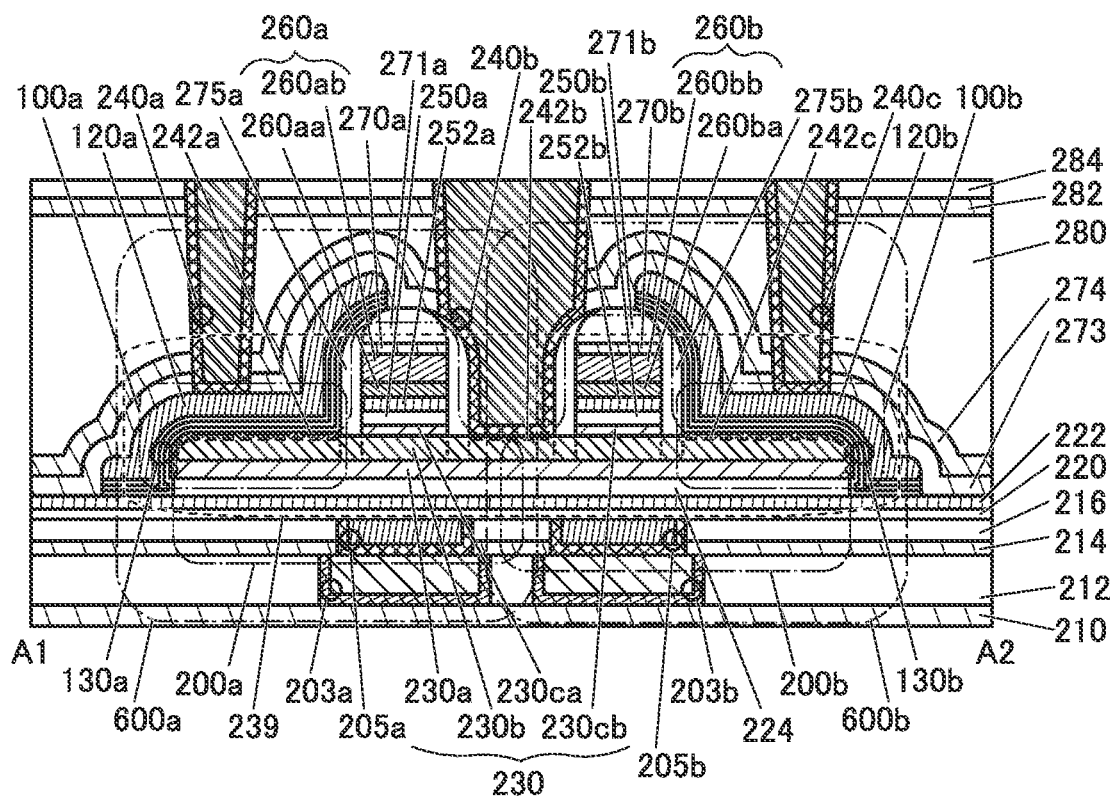
Figure 16A:
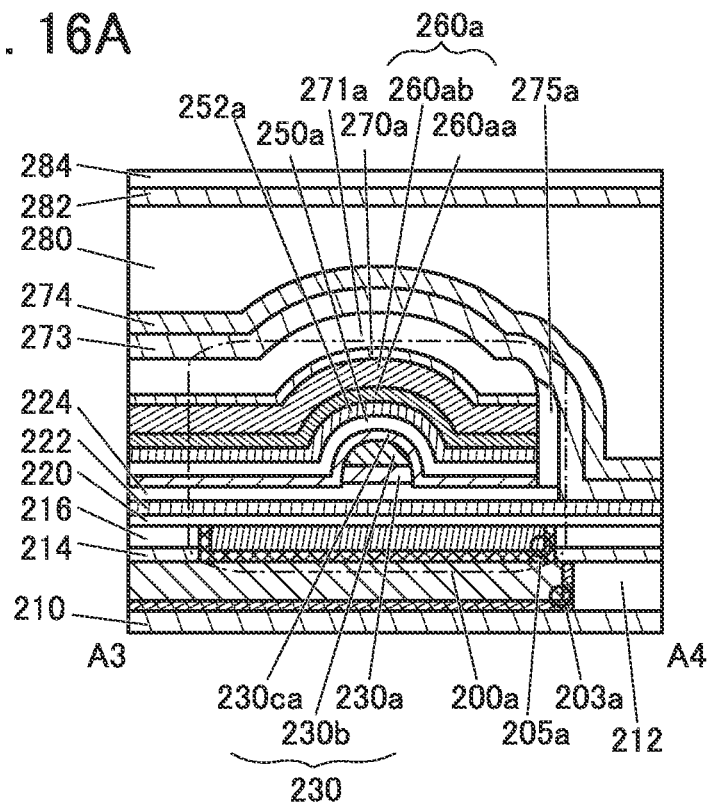
FIGS. 16A-16B Cross-sectional view illustrating a structure example of a semiconductor device.
Figure 16B:
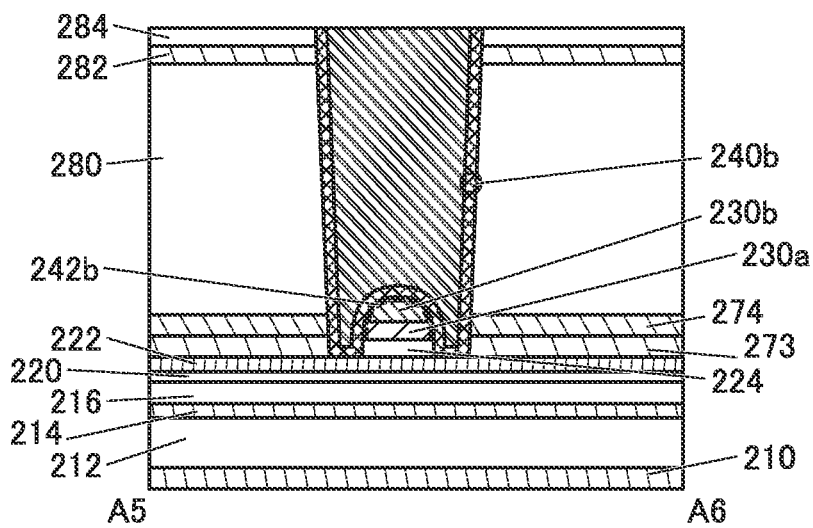
Figure 17:
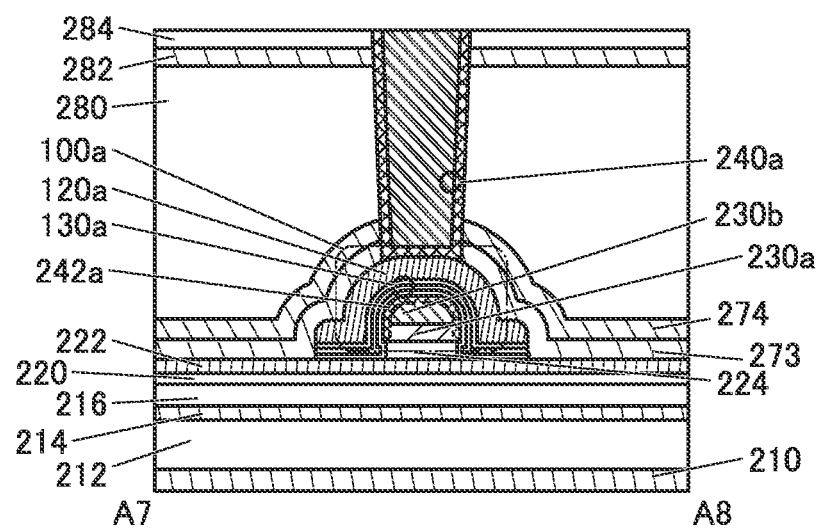
FIG. 17 A cross-sectional view illustrating a structure example of a semiconductor device.

FIG. 12(A) is a cross-sectional view of a semiconductor device of one embodiment of the present invention. FIG. 12(B) is a circuit diagram corresponding to the components of the memory cells illustrated in FIG. 12(A). FIG. 13 is a cross-sectional view of a semiconductor device of one embodiment of the present invention, which is different from that in FIG. 12(A). FIG. 14 is a cross-sectional view in the channel width direction of the transistor 700, which is illustrated in FIG. 12(A) in the channel length direction. FIG. 15(A) is a top view of the memory cell 600a and the memory cell 600b. FIG. 15(B), FIG. 16(A), FIG. 16(B), and FIG. 17 are cross-sectional views of the memory cell 600a and the memory cell 600b. Here, FIG. 15(B) is a cross-sectional view of a portion indicated by a dashed-dotted line A1-A2 in FIG. 15(A) and also is a cross-sectional view of a transistor 200a and a transistor 200b in the channel length direction. FIG. 16(A) is a cross-sectional view of a portion indicated by a dashed-dotted line A3-A4 in FIG. 15(A) and also is a cross-sectional view of the transistor 200a in the channel width direction. Note that a cross-sectional view of the transistor 200b in the channel width direction is similar to the cross-sectional view of the transistor 200a in the channel width direction illustrated in FIG. 16(A). FIG. 16(B) is a cross-sectional view of a portion indicated by a dashed-dotted line A5-A6 in FIG. 15(A). FIG. 17 is a cross-sectional view of a portion indicated by a dashed-dotted line A7-A8 in FIG. 15(A). Note that for clarification of the drawing, some components are not illustrated in the top view in FIG. 15(A).

The transistor 700 corresponds to a transistor provided in the driver circuit WD or the driver circuit BD, that is, a transistor in a driver circuit for driving the memory cell array MCA. The memory cell 600a or 600b corresponds to the memory cell MC1 or MC2 described with reference to FIG. 2, the transistor 200a or 200b corresponds to the transistor Ta1, Ta2, Tb1, or Tb2 described with reference to FIGS. 2(B-1) and 2(B-2), and a capacitor 100a or 100b corresponds to the capacitor Ca1, Ca2, Cb1, or Cb2 described with reference to FIG. 2. Hereinafter, the transistor 200a and the transistor 200b are collectively referred to as a transistor 200, in some cases. Hereinafter, the capacitor 100a and the capacitor 100b are collectively referred to as a capacitor 100, in some cases.

In the layer structure of the semiconductor device described in this embodiment, the transistor 200a, the transistor 200b, the capacitor 100a, the capacitor 100b, the transistor 700, and an insulator 210, an insulator 212, an insulator 273, an insulator 274, an insulator 280, an insulator 282, and an insulator 284 functioning as interlayer films are included, as illustrated in FIG. 12(A). In addition, a conductor 203a that is electrically connected to the transistor 200a and functions as a wiring, a conductor 203b that is electrically connected to the transistor 200b and functions as a wiring, and a conductor 240a, a conductor 240b, and a conductor 240c that function as plugs are included, as illustrated in FIG. 15. Moreover, a conductor 703 that is electrically connected to the transistor 700 and functions as a wiring, and a conductor 740a and a conductor 740b that function as plugs are included. A conductor 112 that is connected to a conductor 240 or a conductor 740 and functions as a wiring layer, and an insulator 150 may be provided over the insulator 284.

Hereinafter, the conductor 203a and the conductor 203b are collectively referred to as a conductor 203, in some cases. Hereinafter, the conductor 240a, the conductor 240b, and the conductor 240c are collectively referred to as the conductor 240, in some cases. Hereinafter, the conductor 740a and the conductor 740b are collectively referred to as the conductor 740, in some cases. Here, the conductor 703 and the conductor 203 are formed in the same layer and have similar structures, and the conductor 740 and the conductor 240 are formed in the same layer and have similar structures. Thus, the descriptions of the conductor 203 and the conductor 240 can be referred to for the conductor 703 and the conductor 740, respectively.

Note that in the conductor 203, a first conductor of the conductor 203 is formed in contact with an inner wall of an opening of the insulator 212 and a second conductor of the conductor 203 is formed on the inner side. Here, the top surface of the conductor 203 and the top surface of the insulator 212 can be substantially level with each other. Although a structure in which the first conductor of the conductor 203 and the second conductor of the conductor 203 are stacked is described in this embodiment, the present invention is not limited thereto. For example, a structure may be employed in which the conductor 203 of a single layer or a stacked-layer structure of three or more layers is provided. In the case where a structure body has a stacked-layer structure, layers may be distinguished by ordinal numbers corresponding to the formation order. Note that the conductor 703 has a structure similar to that of the conductor 203.

The insulator 273 is positioned over the transistor 200a, the transistor 200b, the transistor 700, and the capacitor 100. The insulator 274 is positioned over the insulator 273. The insulator 280 is positioned over the insulator 274. The insulator 282 is positioned over the insulator 280. The insulator 284 is positioned over the insulator 282.

The conductor 240 is formed in contact with an inner wall of an opening of the insulator 273, the insulator 274, the insulator 280, the insulator 282, and the insulator 284. Here, the top surface of the conductor 240 and the top surface of the insulator 284 can be substantially level with each other. Although a structure in which the conductor 240 has a stacked-layer structure is described in this embodiment, the present invention is not limited thereto. For example, the conductor 240 may be a single layer or have a stacked-layer structure of three or more layers. Note that the conductor 740 has a structure similar to that of the conductor 240.

As illustrated in FIG. 15 and FIG. 16(A), the transistor 200a and the transistor 200b include an insulator 214 and an insulator 216 positioned over a substrate (not illustrated); a conductor 205a and a conductor 205b positioned to be embedded in the insulator 214 and the insulator 216; an insulator 220 positioned over the insulator 216, the conductor 205a, and the conductor 205b; an insulator 222 positioned over the insulator 220; an insulator 224 positioned over the insulator 222; an oxide 230a positioned over the insulator 224; an oxide 230b positioned over the oxide 230a; an oxide 230ca and an oxide 230cb positioned over the oxide 230b; an insulator 250a positioned over the oxide 230ca; an insulator 250b positioned over the oxide 230cb; a metal oxide 252a positioned over the insulator 250a; a metal oxide 252b positioned over the insulator 250b; a conductor 260a (a conductor 260aa and a conductor 260ab) positioned over the metal oxide 252a; a conductor 260b (a conductor 260ba and a conductor 260bb) positioned over the metal oxide 252b; an insulator 270a positioned over the conductor 260a; an insulator 270b positioned over the conductor 260b; an insulator 271a positioned over the insulator 270a; an insulator 271b positioned over the insulator 270b; an insulator 275a positioned in contact with at least side surfaces of the oxide 230ca, the insulator 250a, the metal oxide 252a, and the conductor 260a; an insulator 275b positioned in contact with at least side surfaces of the oxide 230cb, the insulator 250b, the metal oxide 252b, and the conductor 260b; and a layer 242 formed over the oxide 230a and the oxide 230b. In the layer 242, a portion positioned between the conductor 260a and the conductor 260b is referred to as a layer 242b, a portion positioned on the opposite side of the conductor 260a from the layer 242b is referred to as a layer 242a, and a portion positioned on the opposite side of the conductor 260b from the layer 242b is referred to as a layer 242c, in some cases. The conductor 240b is positioned in contact with the layer 242b.

In the transistor 200a, the layer 242a functions as one of a source and a drain, the layer 242b functions as the other of the source and the drain, the conductor 260a functions as a front gate, the insulator 250a functions as a gate insulating layer for the front gate, the conductor 205a functions as a back gate, and the insulator 220, the insulator 222, and the insulator 224 function as a gate insulating layer for the back gate. In the transistor 200b, the layer 242b functions as one of a source and a drain, the layer 242c functions as the other of the source and the drain, the conductor 260b functions as a front gate, the insulator 250b functions as a gate insulating layer for the front gate, the conductor 205b functions as a back gate, and the insulator 220, the insulator 222, and the insulator 224 function as a gate insulating layer for the back gate. The conductor 240b is electrically connected to a conductor corresponding to the bit line BL. The conductor 260a functions as the word line WL, or is electrically connected to a conductor corresponding to the wiring WL. The conductor 260b functions as the wiring WL, which is different from a conductor 206a, or is electrically connected to a conductor corresponding to the wiring WL, which is different from the conductor 206a. The conductor 203a and the conductor 203b function as the wirings BGL.

Hereinafter, the oxide 230a, the oxide 230b, the oxide 230ca, and the oxide 230cb are collectively referred to as an oxide 230, in some cases. Hereinafter, the oxide 230ca and the oxide 230cb are collectively referred to as an oxide 230c, in some cases. Hereinafter, the conductor 205a and the conductor 205b are collectively referred to as a conductor 205, in some cases. Hereinafter, the insulator 250a and the insulator 250b are collectively referred to as an insulator 250, in some cases. Hereinafter, the metal oxide 252a and the metal oxide 252b are collectively referred to as a metal oxide 252, in some cases. Hereinafter, the insulator 250a and the insulator 250b are collectively referred to as an insulator 250, in some cases. Hereinafter, the conductor 260a and the conductor 260b are collectively referred to as a conductor 260, in some cases. In some cases, the conductor 260aa and the conductor 260ab are collectively referred to as the conductor 260a. In some cases, the conductor 260ba and the conductor 260bb are collectively referred to as the conductor 260b. Hereinafter, the insulator 270a and the insulator 270b are collectively referred to as an insulator 270, in some cases. Hereinafter, the insulator 271a and the insulator 271b are collectively referred to as an insulator 271, in some cases. Hereinafter, the insulator 275a and the insulator 275b are collectively referred to as an insulator 275, in some cases. The transistor 200b is formed in the same layer as and has a similar structure to the transistor 200a. Thus, unless otherwise specified, the description of the structure of the transistor 200a can be referred to for the structure of the transistor 200b in the following description.

As illustrated in FIG. 12(A) and FIG. 14, the transistor 700 includes the insulator 214 and the insulator 216 positioned over the substrate (not illustrated); a conductor 705 positioned to be embedded in the insulator 214 and the insulator 216; the insulator 220 positioned over the insulator 216 and the conductor 705; the insulator 222 positioned over the insulator 220; an insulator 724 positioned over the insulator 222; an oxide 730 (an oxide 730a, an oxide 730b, and an oxide 730c) positioned over the insulator 724; an insulator 750 positioned over the oxide 730; a metal oxide 752 positioned over the insulator 750; a conductor 760 (a conductor 760a and a conductor 760b) positioned over the metal oxide 752; an insulator 770 positioned over the conductor 760; an insulator 771 positioned over the insulator 770; an insulator 775 positioned in contact with at least side surfaces of the oxide 730c, the insulator 750, the metal oxide 752, and the conductor 760; and layers 742 formed over the oxide 730. The conductor 740a is positioned in contact with one of the layers 742 and the conductor 740b is positioned in contact with the other of the layers 742.

In the transistor 700, one of the layers 742 functions as one of a source and a drain, the other of the layers 742 functions as the other of the source and the drain, the conductor 760 functions as a front gate, and the conductor 705 functions as a back gate.

Here, the transistor 700 is formed in the same layer as and has a similar structure to the transistor 200. Thus, the oxide 730 has a structure similar to that of the oxide 230 and the description of the oxide 230 can be referred to. The conductor 705 has a structure similar to that of the conductor 205, and thus the description of the conductor 205 can be referred to. The insulator 724 has a structure similar to that of the insulator 224, and thus the description of the insulator 224 can be referred to. The insulator 750 has a structure similar to that of the insulator 250, and thus the description of the insulator 250 can be referred to. The metal oxide 752 has a structure similar to that of the metal oxide 252, and thus the description of the metal oxide 252 can be referred to. The conductor 760 has a structure similar to that of the conductor 260, and thus the description of the conductor 260 can be referred to. The insulator 770 has a structure similar to that of the insulator 270, and thus the description of the insulator 270 can be referred to. The insulator 771 has a structure similar to that of the insulator 271, and thus the description of the insulator 271 can be referred to. The insulator 775 has a structure similar to that of the insulator 275, and thus the description of the insulator 275 can be referred to. Unless otherwise specified, as described above, the description of the structure of the transistor 200 can be referred to for the structure of the transistor 700 in the following description.

Although a structure in which the oxide 230a, the oxide 230b, and the oxide 230c in the transistor 200 are stacked is described, the present invention is not limited thereto. For example, a structure may be employed in which a single-layer structure of the oxide 230b, a two-layer structure of the oxide 230b and the oxide 230a, a two-layer structure of the oxide 230b and the oxide 230c, or a stacked-layer structure of four or more layers is provided. The same applies to the oxide 730 of the transistor 700. Furthermore, although a structure in which the conductor 260a and the conductor 260b in the transistor 200 are stacked is described, the present invention is not limited thereto. The same applies to the conductor 760 of the transistor 700.

The capacitor 100a includes the layer 242a (a region in the oxide 230 that functions as one of the source and the drain of the transistor 200a), an insulator 130a over the layer 242a, and a conductor 120a over the insulator 130a. The conductor 120a is preferably positioned such that at least part thereof overlaps with the layer 242a with the insulator 130a therebetween. The conductor 240a is positioned on and in contact with the conductor 120a. The capacitor 100b includes the layer 242c (a region in the oxide 230 that functions as one of the source and the drain of the transistor 200b), an insulator 130b over the layer 242c, and a conductor 120b over the insulator 130b. The conductor 120b is preferably positioned such that at least part thereof overlaps with the layer 242b with the insulator 130b therebetween. The conductor 240c is positioned on and in contact with the conductor 120b. Hereinafter, the insulator 130a and the insulator 130b are collectively referred to as an insulator 130, in some cases. Hereinafter, the conductor 120a and the conductor 120b are collectively referred to as a conductor 120, in some cases.

In the capacitor 100a, the layer 242a functions as one electrode and the conductor 120a functions as the other electrode. The insulator 130a functions as a dielectric of the capacitor 100a. Here, the layer 242a has a function of one of the source and the drain of the transistor 200a and one electrode of the capacitor 100a, and functions as a node FN. Furthermore, the conductor 240a is electrically connected to a conductor that supplies a fixed potential.

In the capacitor 100b, the layer 242c functions as one electrode and the conductor 120b functions as the other electrode. The insulator 130b functions as a dielectric of the capacitor 100b. Here, the layer 242c has a function of one of the source and the drain of the transistor 200b and one electrode of the capacitor 100b, and functions as a node FN. Furthermore, the conductor 240c is electrically connected to a conductor that supplies a fixed potential.

Figure 18:
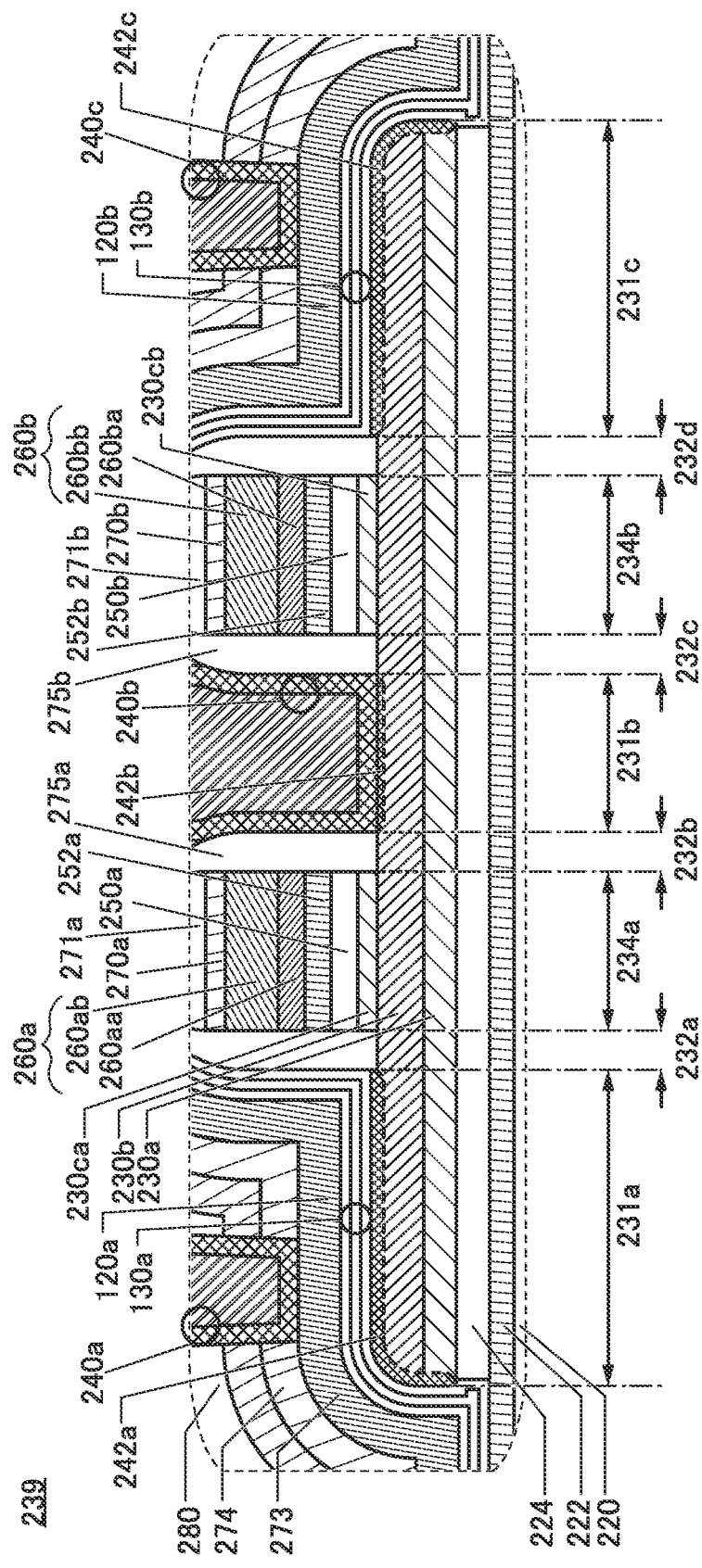
FIG. 18 A cross-sectional view illustrating a structure example of a semiconductor device.

Although FIG. 12(A) and FIG. 18 illustrate the insulators 130a and 130b having a multilayer structure, a single-layer structure can be employed as illustrated in FIG. 13. Although the conductors 740a and 740b are provided close to each other in the structure in FIG. 12(A), a structure can be employed in which they are provided apart from each other as illustrated in FIG. 13. Plugs functioning as the wirings VL, which are embedded in the insulator 280 and the like, can be omitted as illustrated in FIG. 13 when one electrodes of the capacitors 100a and 100b also function as the wirings VL. FIG. 13 illustrates a structure in which the wiring BL is positioned to be orthogonal to the wirings WLa and WLb.

Figure 19A:
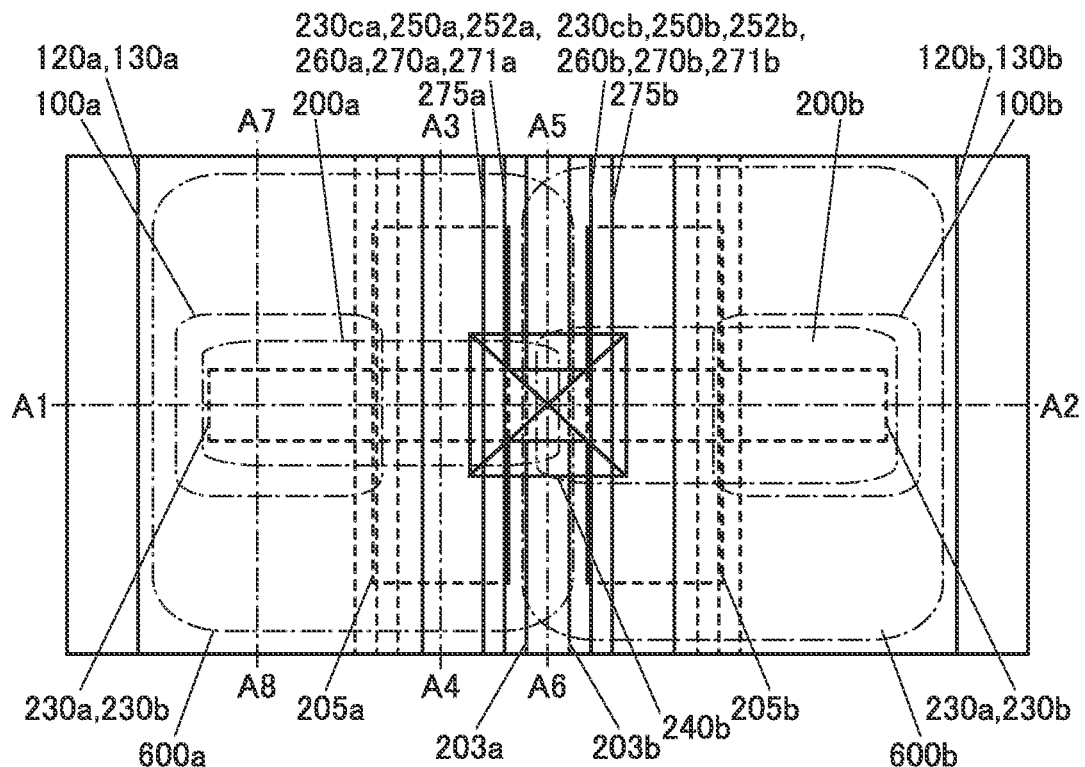
FIGS. 19A-19B A top view and a cross-sectional view illustrating a structure example of a semiconductor device.
Figure 19B:
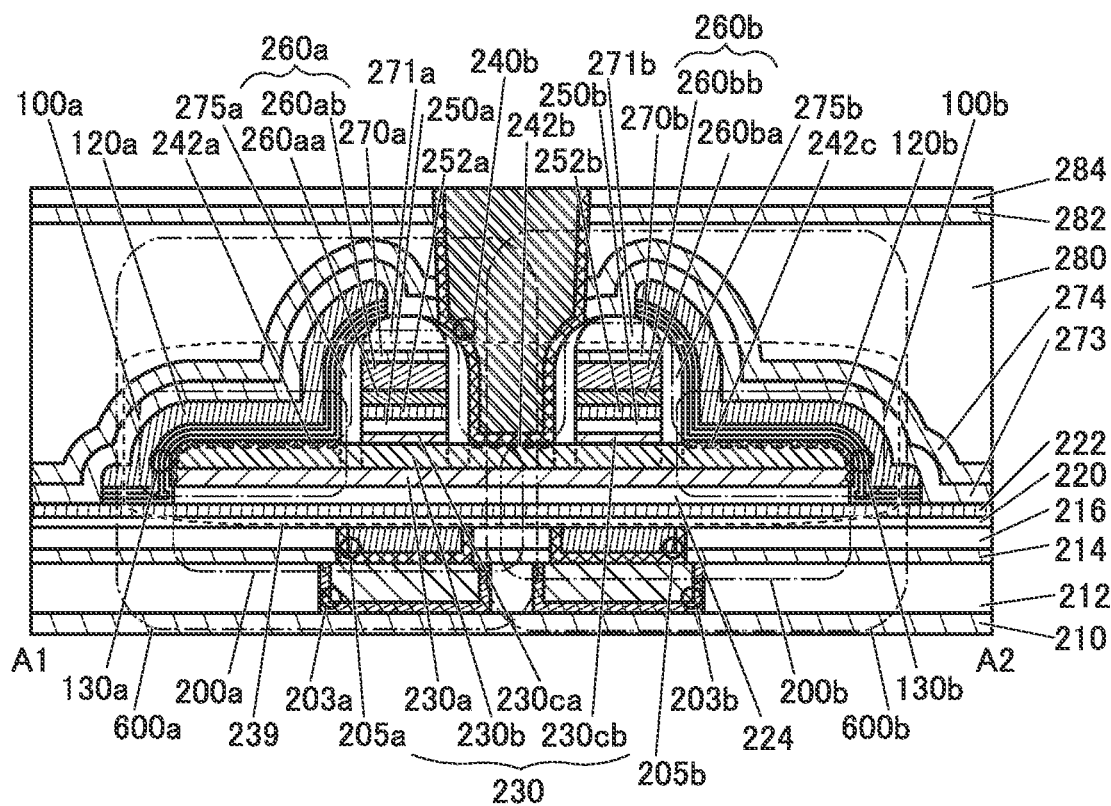

Although the conductor 240a, the conductor 240b, and the conductor 240c are positioned on a straight line in FIG. 16(A) and the like, the semiconductor device described in this embodiment is not limited thereto; the conductors are positioned as appropriate depending on the circuit arrangement of the memory cell arrays or a driving method. The conductor 240a and the conductor 240c are not necessarily provided. For example, the conductor 240a and the conductor 240c are not necessarily provided in the case where the conductor 120b and a conductor 120c are extended so as to also function as wirings as illustrated in FIG. 19. Furthermore, the conductor 260a, the conductor 260b, the conductor 203a, and the conductor 203b can function as wirings like the conductor 120a and the conductor 120b; in that case, they may be provided to extend in the channel width direction of the transistor 200a or the transistor 200b. Note that although the conductor 120a, the conductor 120b, the conductor 203a, and the conductor 203b functioning as wirings extend in the same direction as the conductor 260a and the conductor 260b in FIG. 19, the semiconductor device described in this embodiment is not limited thereto; the conductors are positioned as appropriate depending on the arrangement of the memory cell arrays and the circuits or the driving method.

Figure 20:
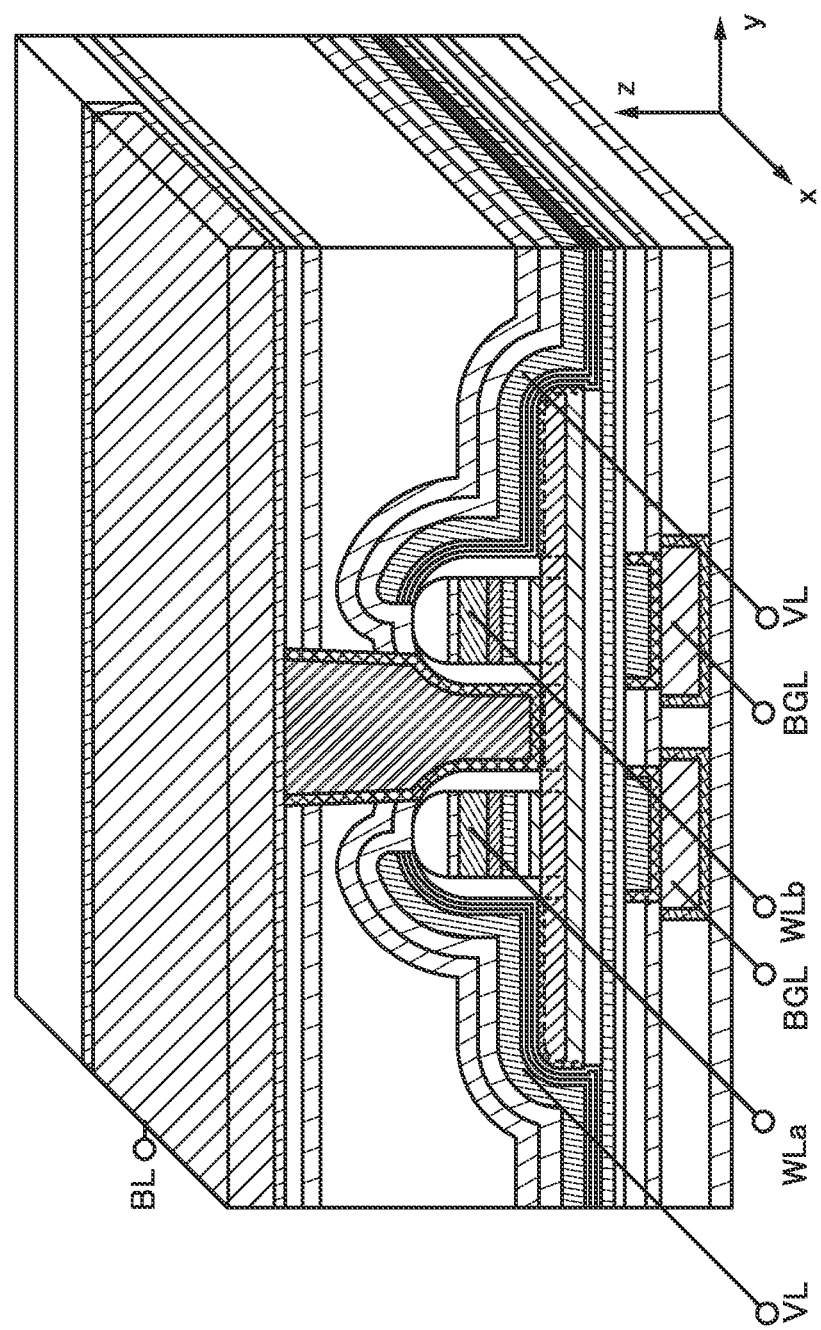
FIG. 20 A cross-sectional view illustrating a structure example of a semiconductor device.

The memory cell 600a and the memory cell 600b illustrated in FIG. 19 can have configurations in which the wirings WLa and WLb and the wiring bit line BL are provided to be orthogonal to each other (x direction and y direction in the drawing) as illustrated in FIG. 20. In addition, a configuration can be employed in which the wiring VL is provided in the direction (x direction in the drawing) in which the wiring WLa and the wiring WLb extend.

Figure 22:
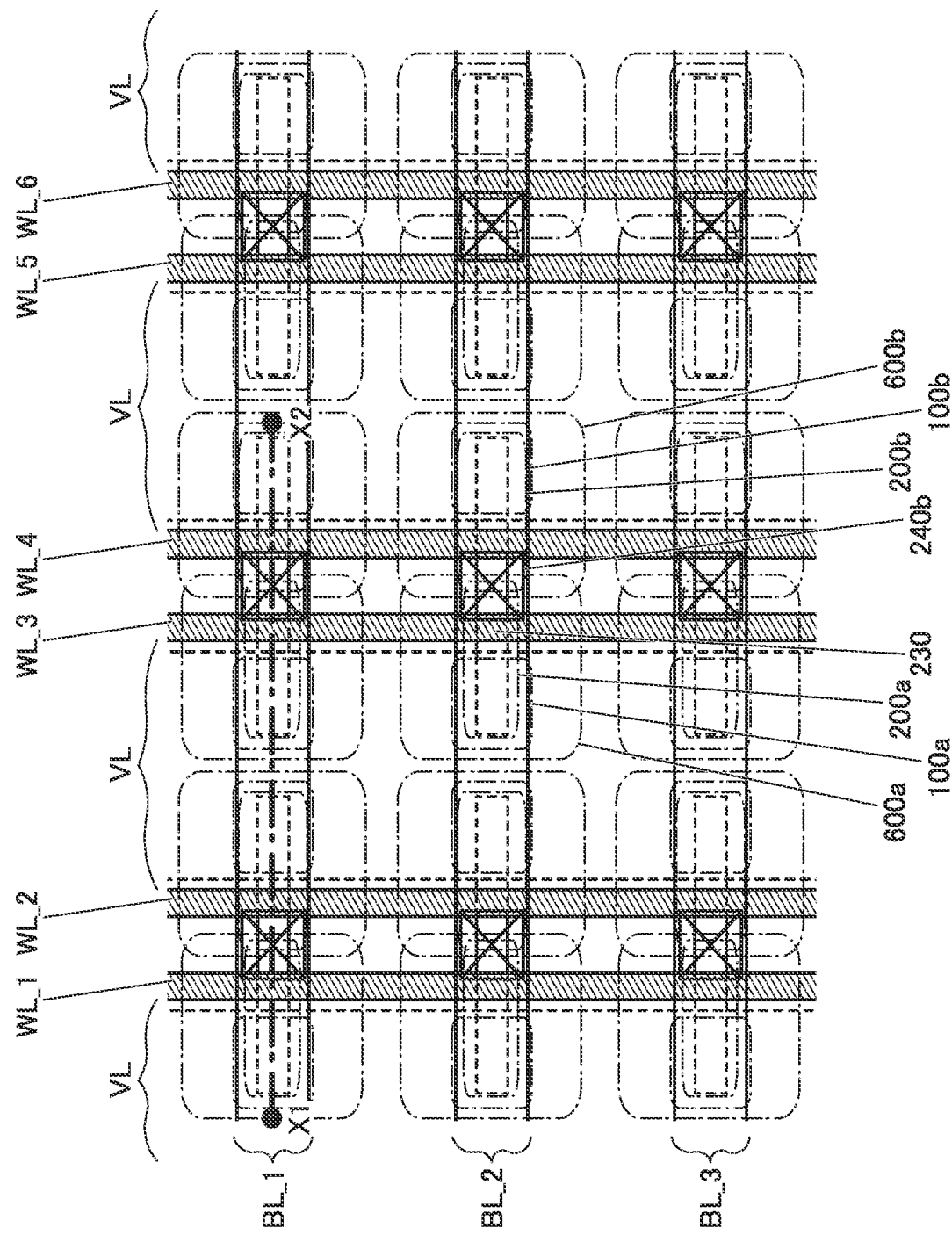
FIG. 22 A top view illustrating a structure example of a semiconductor device.

When the memory cell 600a and the memory cell 600b illustrated in FIG. 19 are arranged in a matrix of three rows and three columns, the arrangement becomes as in a top view illustrated in FIG. 22. The wirings obtained by extending the conductors 260 are a wiring WL_1 to a wiring WL_6, and the wirings obtained by extending the conductors 120 are the wirings VL. A wiring BL_1 to a wiring BL_3 are provided in contact with the top surface of the conductor 240b. The extending direction of the wiring WL_1 to the wiring WL_6 and the extending direction of the wiring BL_1 to the wiring BL_3 are substantially orthogonal to each other. When the memory cell 600a and the memory cell 600b are arranged in a matrix as illustrated in FIG. 22, the cell array illustrated in FIG. 2 and the like can be formed. Although FIG. 22 illustrates an example in which the memory cell 600a and the memory cell 600b are arranged in a 3×3 matrix, this embodiment is not limited thereto; the number and position of the memory cells, wirings, or the like included in the cell array are appropriately set. In the top view in FIG. 22, some components illustrated in FIG. 19 are not illustrated for clarification of the drawing.

Figure 21:
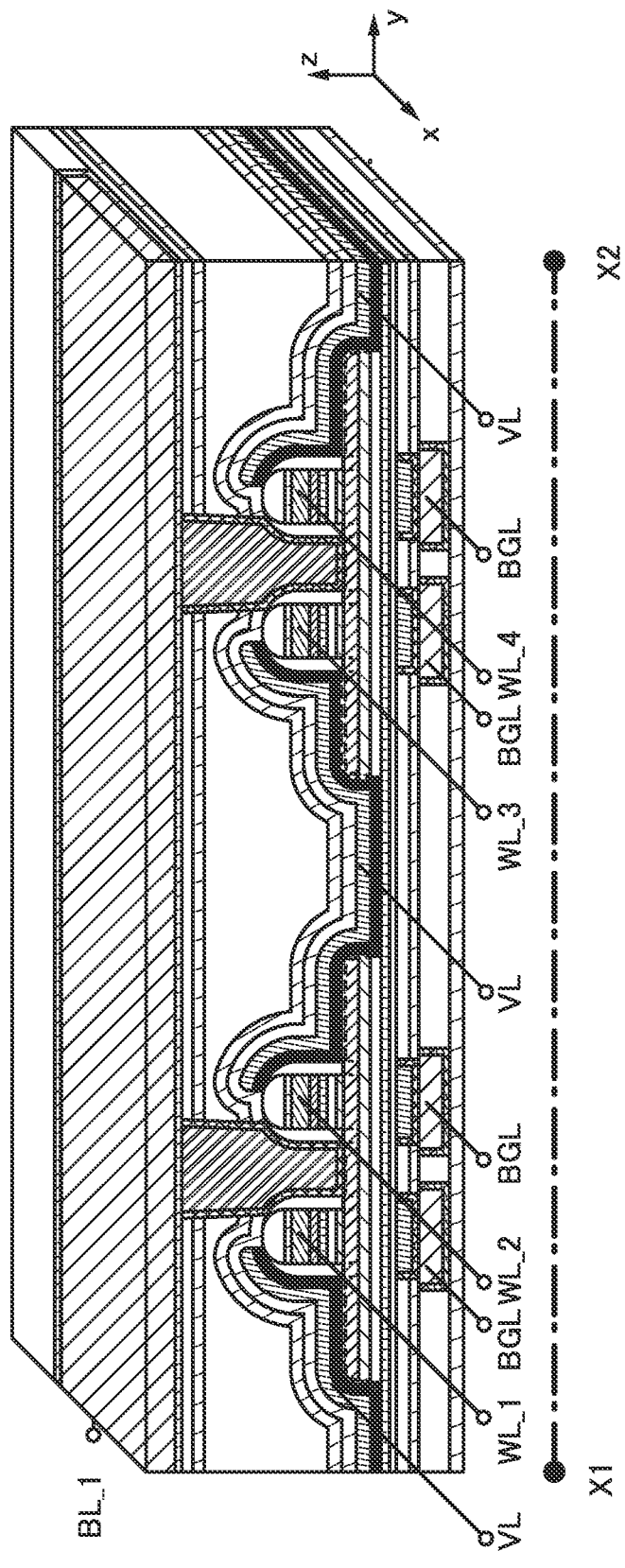
FIG. 21 A cross-sectional view illustrating a structure example of a semiconductor device.

FIG. 21 is a cross-sectional view of a portion indicated by a dashed-dotted line X1-X2 in FIG. 22. The wiring BL_1 is orthogonal to the wirings WL_1 to WL_4 and the wiring VL is provided to be shared by adjacent memory cells as illustrated in FIG. 21.

Figure 23:
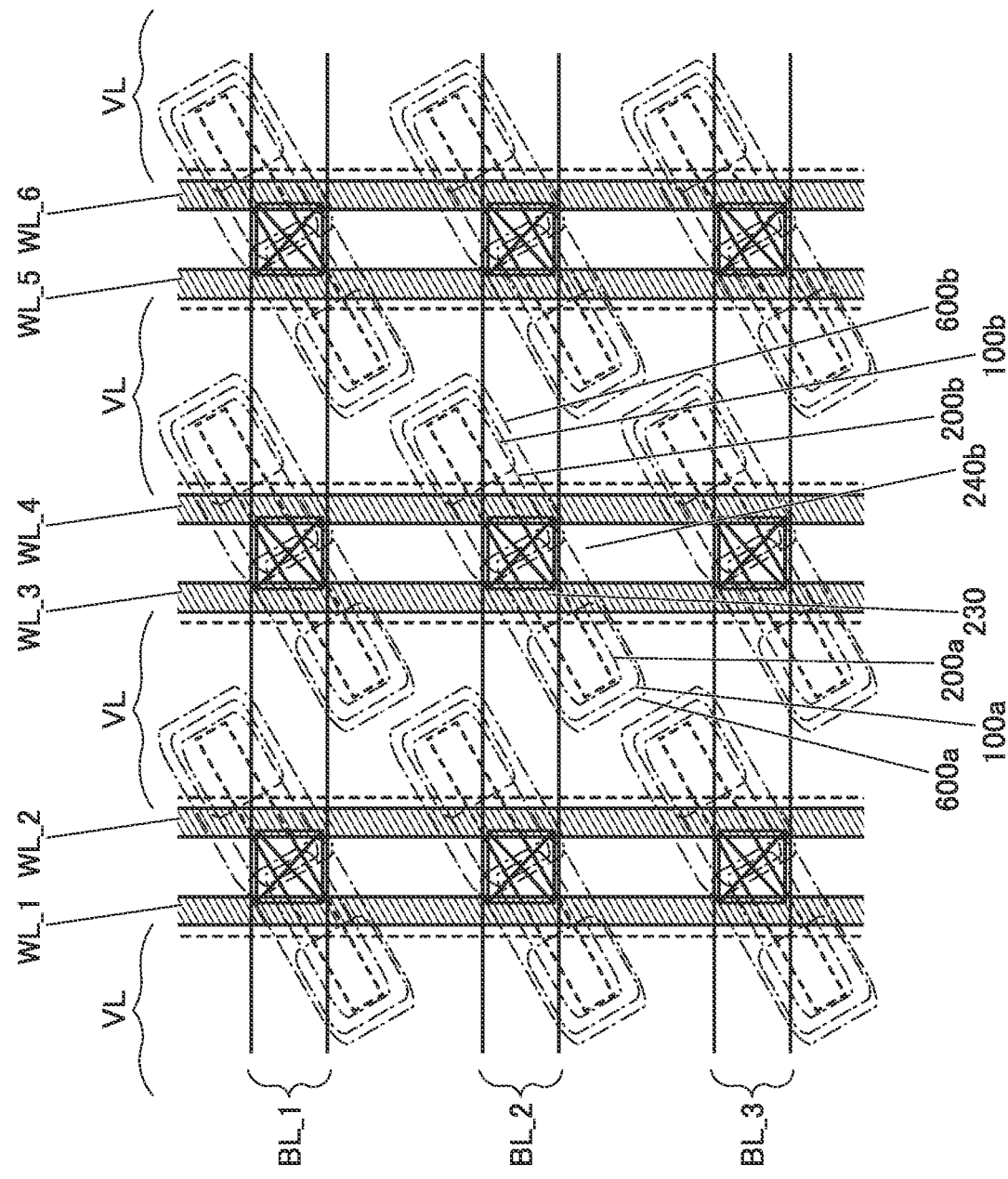
FIG. 23 A top view illustrating a structure example of a semiconductor device.

The oxides 230 and the wirings WL are provided such that, without being limited thereto, the long sides of the oxides 230 are substantially orthogonal to the extending direction of the wirings WL in FIG. 22. For example, a layout may be employed in which the long sides of the oxides 230 are not orthogonal to the extending direction of the wirings WL and the long sides of the oxides 230 are inclined with respect to the extending direction of the wirings WL as illustrated in FIG. 23. For example, the oxides 230 and the wirings WL are provided such that an angle formed between the long side of the oxide 230 and the extending direction of the wiring WL is greater than or equal to 20° and less than or equal to 70°, preferably greater than or equal to 30° and less than or equal to 60°.

When the oxide 230 is provided to be inclined to the extending direction of the wiring WL as described above, the memory cells can be densely arranged, in some cases. Thus, the area occupied by the memory cell array can be reduced and the semiconductor device can be highly integrated, in some cases.

As illustrated in FIG. 15(A), the capacitor 100a and the capacitor 100b are formed so as to partly overlap with the transistor 200a and the transistor 200b, respectively. Accordingly, the total projected area of the transistor 200a, the transistor 200b, the capacitor 100a, and the capacitor 100b can be reduced, and thus the area occupied by the memory cell 600a and the memory cell 600b can be reduced. Thus, the semiconductor device can be easily miniaturized and highly integrated. Furthermore, the transistor 200a, the transistor 200b, the capacitor 100a, and the capacitor 100b can be formed in the same process, and thus the process can be shortened, leading to an improvement in productivity.

One of the source and the drain of the transistor 200a and one of the source and the drain of the transistor 200b are electrically connected to the conductor 240b through the layer 242b. Accordingly, a contact portion to the wiring BL is shared by the transistor 200a and the transistor 200b and thus the numbers of plugs and contact holes for connecting the transistor 200a and the transistor 200b to the wiring BL can be reduced. Sharing a wiring which is electrically connected to one of the source and the drain as described above can further reduce the area occupied by the memory cell array.

Note that although the transistor 200a, the transistor 200b, the capacitor 100a, and the capacitor 100b in the memory cell 600a and the memory cell 600b are provided such that the channel length direction of the transistor 200a and the channel length direction of the transistor 200b are parallel to each other, the semiconductor device described in this embodiment is not limited thereto. Transistors with appropriate structures are positioned as appropriate depending on the circuit configuration and the driving method.

Next, the oxide 230 functioning as semiconductor layers of the transistor 200a and the transistor 200b is described in detail. The description of the oxide 230 is referred to for the oxide 730 of the transistor 700, unless otherwise specified below. In the transistor 200a and the transistor 200b, the oxide 230 (the oxide 230a, the oxide 230b, the oxide 230ca, and the oxide 230cb), which includes a region where a channel is formed (hereinafter also referred to as a channel formation region), is preferably formed using a metal oxide functioning as an oxide semiconductor (hereinafter also referred to as an oxide semiconductor).

The transistor 200 using an oxide semiconductor in its channel formation region has an extremely low leakage current in a non-conducting state; thus, a semiconductor device with low power consumption can be provided. An oxide semiconductor can be deposited by a sputtering method or the like, and thus can be used for the transistor 200 included in a highly integrated semiconductor device.

For example, as the oxide 230, a metal oxide such as an In-M-Zn oxide (the element M is one or more kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used. For the oxide 230, an In—Ga oxide or an In—Zn oxide may be used.

Here, besides the constituent element of the oxide semiconductor, a metal element such as aluminum, ruthenium, titanium, tantalum, chromium, or tungsten is added, whereby the oxide semiconductor forms a metal compound to have reduced resistance. Note that aluminum, titanium, tantalum, tungsten, or the like is preferably used.

To add the metal element to the oxide semiconductor, for example, a metal film containing the metal element, a nitride film containing the metal element, or an oxide film containing the metal element is provided over the oxide semiconductor. By providing the film, some oxygen at the interface of the film and the oxide semiconductor or in the oxide semiconductor in the vicinity of the interface may be absorbed into the film or the like and an oxygen vacancy may be formed, so that the resistance in the vicinity of the interface may be reduced.

After the metal film, the nitride film containing the metal element, or the oxide film containing the metal element is provided over the oxide semiconductor, heat treatment is preferably performed in an atmosphere containing nitrogen. By performing the heat treatment in an atmosphere containing nitrogen, the metal element in the metal film, the nitride film containing the metal element, or the oxide film containing the metal element diffuses into the oxide semiconductor, or the metal element in the oxide semiconductor diffuses into the film, whereby the oxide semiconductor forms a metal compound with the film to have reduced resistance. The metal element added to the oxide semiconductor is brought into a relatively stable state when the oxide semiconductor and the metal element form a metal compound; thus, a highly reliable semiconductor device can be provided.

At the interface between the oxide semiconductor and the metal film, the nitride film containing the metal element, or the oxide film containing the metal element, a compound layer (hereinafter also referred to as a heterogeneous layer) may be formed. Note that the compound layer (heterogeneous layer) includes a metal compound containing a component of the metal film, the nitride film containing the metal element, or the oxide film containing the metal element and a component of the oxide semiconductor. For example, as the compound layer, a layer where the metal element of the oxide semiconductor and the metal element added are alloyed may be formed. The alloyed layer is in a relatively stable state, so that a highly reliable semiconductor device can be provided.

In the case where hydrogen in the oxide semiconductor diffuses into a low-resistance region of the oxide semiconductor and enters an oxygen vacancy in the low-resistance region, the hydrogen becomes relatively stable. It is known that hydrogen in the oxygen vacancy in the oxide semiconductor is released from the oxygen vacancy by heat treatment at 250° C. or higher, diffuses into a low-resistance region of the oxide semiconductor, enters an oxygen vacancy in the low-resistance region, and becomes relatively stable. Thus, by the heat treatment, the resistance of the low-resistance region of the oxide semiconductor or a region where the metal compound is formed tends to be further reduced, and the oxide semiconductor whose resistance is not reduced tends to be highly purified (reduction of impurities such as water or hydrogen) to have increased resistance.

The oxide semiconductor has an increased carrier density when an impurity element such as hydrogen or nitrogen exists therein. Hydrogen in the oxide semiconductor reacts with oxygen, which is bonded to a metal atom, to be water, and thus forms an oxygen vacancy in some cases. Entry of hydrogen into the oxygen vacancy increases carrier density. Furthermore, in some cases, part of hydrogen is bonded to oxygen, which is bonded to a metal atom, whereby an electron serving as a carrier is generated. That is, the resistance of an oxide semiconductor containing nitrogen or hydrogen is reduced.

Thus, selective addition of a metal element and an impurity element such as hydrogen and nitrogen to the oxide semiconductor allows a high-resistance region and a low-resistance region to be provided in the oxide semiconductor. In other words, when the resistance of the oxide 230 is selectively reduced, a region functioning as a semiconductor having a low carrier density and a low-resistance region functioning as a source region or a drain region can be provided in the island-shaped oxide 230.

FIG. 18 illustrates an enlarged view of a region 239 including the oxide 230*b* whose resistance is selectively reduced, which is surrounded by a dashed line in FIG. 15(B).

As illustrated in FIG. 18, the oxide 230 includes a region 234*a*, a region 234*b*, a region 231*a*, a region 231*b*, a region 231*c*, a region 232*a*, a region 232*b*, a region 232*c*, and a region 232*d*. Here, the region 234*a* functions as the channel formation region of the transistor 200*a* and the region 234*b* functions as the channel formation region of the transistor 200*b*. The region 231*a* functions as one of a source region and a drain region of the transistor 200*a*, the region 231*b* functions as the other of the source region and the drain region of the transistor 200*a* and one of a source region and a drain region of the transistor 200*b*, and the region 231*c* functions as the other of the source region and the drain region of the transistor 200*b*. The region 232*a* is positioned between the region 234*a* and the region 231*a*, the region 232*b* is positioned between the region 234*a* and the region 231*b*, the region 232*c* is positioned between the region 234*b* and the region 231*b*, and the region 232*d* is positioned between the region 234*b* and the region 231*c*. Hereinafter, the region 234*a* and the region 234*b* are collectively referred to as a region 234, in some cases. Hereinafter, the region 231*a*, the region 231*b*, and the region 231*c* are collectively referred to as a region 231, in some cases. The region 232*a*, the region 232*b*, the region 232*c*, and the region 232*d* are collectively referred to as a region 232, in some cases.

Note that the insulator 130*a* and the conductor 120*a* are provided over the region 231*a*, and the region 231*a* functions as one electrode of the capacitor 100*a*. Furthermore, the insulator 130*b* and the conductor 120*c* are provided over the region 231*c*, and the region 231*c* functions as one electrode of the capacitor 100*b*. The region 231 of the oxide 230 has reduced resistance and is a conductive oxide. Thus, the region 231 can function as one electrode of the capacitor 100.

The region 231 functioning as the source region or the drain region is a region with a low oxygen concentration and reduced resistance. The region 234 functioning as the channel formation region is a high-resistance region having a higher oxygen concentration and a lower carrier density than the region 231 functioning as the source region or the drain region. The region 232 has a higher oxygen concentration and a lower carrier density than the region 231 functioning as the source region or the drain region and has a lower oxygen concentration and a higher carrier density than the region 234 functioning as the channel formation region.

The concentration of at least one of a metal element and an impurity element such as hydrogen and nitrogen in the region 231 is preferably higher than those in the region 232 and the region 234.

For example, in addition to the oxide 230, the region 231 preferably contains one or more of metal elements selected from aluminum, ruthenium, titanium, tantalum, tungsten, chromium, and the like.

A film containing a metal element may be provided in contact with the region 231 of the oxide 230, for example, so that the region 231 is formed. The film containing a metal element is removed by etching treatment or the like after the formation of the region 231. Note that as the film containing a metal element, a metal film, an oxide film containing a metal element, or a nitride film containing a metal element can be used. In that case, the layer 242 is preferably formed between the film containing a metal element and the oxide 230. For example, the layer 242 is formed on the top surface and the side surface of the oxide 230, in some cases. Note that the layer 242 is a layer including a metal compound containing the component of the film containing a metal element and the component of the oxide 230, and can also be referred to as a compound layer. For example, as the layer 242, a layer in which a metal element in the oxide 230 and an added metal element are alloyed may be formed.

Addition of a metal element to the oxide 230 can form a metal compound in the oxide 230 and the resistance of the region 231 can be reduced. Note that the metal compound is not necessarily formed in the oxide 230. For example, the layer 242 may be formed on a surface of the oxide 230 or the layer 242 may be formed between the oxide 230 and the insulator 130.

Thus, the region 231 includes a low-resistance region of the layer 242, in some cases. Accordingly, at least part of the layer 242 can function as the source region or the drain region of the transistor 200a or the transistor 200b. Here, the layers 242 are formed in the region 231a, the region 231b, and the region 231c, and are the layer 242a, the layer 242b, and the layer 242c, respectively.

The region 232 includes a region overlapping with the insulator 275. The concentration of at least one of metal elements such as aluminum, ruthenium, titanium, tantalum, tungsten, and chromium and impurity elements such as hydrogen and nitrogen in the region 232 is preferably higher than that in the region 234. For example, when the film containing a metal element is provided in contact with the region 231 of the oxide 230, the component of the film containing a metal element and the component of the oxide semiconductor may form a metal compound. The metal compound attracts hydrogen contained in the oxide 230 in some cases. Thus, the hydrogen concentration of the region 232 in the vicinity of the region 231 may be increased.

A structure may be employed in which one or both of the region 232a and the region 232b have a region overlapping with the conductor 260a. With such a structure, the conductor 260a can overlap with the region 232a and the region 232b. Similarly, a structure may be employed in which one or both of the region 232c and the region 232d have a region overlapping with the conductor 260b. With such a structure, the conductor 260b can overlap with the region 232c and the region 232d.

Although the region 234, the region 231, and the region 232 are formed in the oxide 230b in FIG. 18, there is no such limitation. For example, these regions may be formed in the layer 242, in the compound layer formed between the layer 242 and the oxide 230, in the oxide 230a, and in the oxide 230c. Although the boundaries between the regions are illustrated as being substantially perpendicular to the top surface of the oxide 230 in FIG. 18, this embodiment is not limited thereto. For example, the region 232 may project to the conductor 260 side in the vicinity of the surface of the oxide 230b, and the region 232 may recede to the conductor 240a side or the conductor 240b side in the vicinity of the bottom surface of the oxide 230b.

In the oxide 230, the boundaries between the regions are difficult to be clearly observed in some cases. The concentration of a metal element and impurity elements such as hydrogen and nitrogen, which is detected in each region, may be gradually changed (such a change is also referred to as gradation) not only between the regions but also in each region. That is, the region closer to the channel formation region preferably has a lower concentration of a metal element and an impurity element such as hydrogen and nitrogen.

At least one of metal elements that increase conductivity, such as aluminum, ruthenium, titanium, tantalum, tungsten, and chromium, and an impurity is added to a desired region so that the resistance of the oxide 230 is selectively reduced. As the impurity, an element that forms an oxygen vacancy, an element trapped by an oxygen vacancy, or the like is used. Examples of the element include hydrogen, boron, carbon, nitrogen, fluorine, phosphorus, sulfur, chlorine, and a rare gas. Typical examples of the rare gas element are helium, neon, argon, krypton, and xenon.

When the content of the metal element that increases conductivity, the element that forms an oxygen vacancy, or the element trapped by an oxygen vacancy is increased in the region 231, the carrier density is increased and the resistance can be reduced.

The film containing a metal element is preferably formed in contact with the region 231 of the oxide 230, for example, so that the resistance of the region 231 is reduced. As the film containing a metal element, a metal film, an oxide film containing a metal element, a nitride film containing a metal element, or the like can be used. The film containing a metal element is preferably provided over the oxide 230 with at least the insulator 250, the metal oxide 252, the conductor 260, the insulator 270, the insulator 271, and the insulator 275 therebetween.

When the oxide 230 and the film containing a metal element are in contact with each other, the component of the film containing a metal element and the component of the oxide 230 form a metal compound, whereby the region 231 is formed and the resistance is reduced. Oxygen in the oxide 230 positioned at the interface between the oxide 230 and the film containing a metal element or in the vicinity of the interface is partly absorbed in the layer 242; thus, an oxygen vacancy is formed in the oxide 230, the resistance is reduced, and the region 231 is formed, in some cases.

Furthermore, heat treatment is preferably performed in an atmosphere containing nitrogen in a state where the oxide 230 and the film containing a metal element are in contact with each other. By the heat treatment, the metal element, which is the component of the film containing a metal element, diffuses from the film containing a metal element into the oxide 230, or the metal element, which is the component of the oxide 230, diffuses into the film containing a metal element, whereby the oxide 230 and the film containing a metal element form a metal compound and the resistance is reduced. In this manner, the layer 242 is formed between the oxide 230 and the film containing a metal element. Here, the film containing a metal element is provided over the oxide 230 with the insulator 250, the metal oxide 252, the conductor 260, the insulator 270, the insulator 271, and the insulator 275 provided therebetween; thus, the layer 242 is formed in a region of the oxide 230 not overlapping with the conductor 260a, the conductor 260b, the insulator 275a, nor the insulator 275b. In that case, the metal element of the oxide 230 may be alloyed with the metal element of the film containing a metal element. Accordingly, the layer 242 may contain an alloy. The alloy is in a relatively stable state, and thus a highly reliable semiconductor device can be provided.

The heat treatment can be performed at higher than or equal to 250° C. and lower than or equal to 650° C., preferably higher than or equal to 300° C. and lower than or equal to 500° C., further preferably higher than or equal to 320° C. and lower than or equal to 450° C., for example. The heat treatment is performed in a nitrogen or inert gas atmosphere. The heat treatment may be performed under a reduced pressure. Heat treatment may be performed in an atmosphere containing an oxidizing gas after the heat treatment in a nitrogen or inert gas atmosphere is performed.

In the case where hydrogen in the oxide 230 diffuses into the region 231 and enters an oxygen vacancy in the region 231, the hydrogen becomes relatively stable. Hydrogen in an oxygen vacancy in the region 234 is released from the oxygen vacancy by heat treatment at 250° C. or higher, diffuses into the region 231, enters an oxygen vacancy in the region 231, and becomes relatively stable. Thus, by the heat treatment, the resistance of the region 231 is further reduced, and the region 234 is highly purified (reduction of impurities such as water or hydrogen) and the resistance is further increased.

By contrast, since regions (the region 234 and the region 232) of the oxide 230 overlapping with the conductor 260 and the insulator 275 are covered by the conductor 260 and the insulator 275, addition of a metal element to the regions is inhibited. Furthermore, oxygen atoms in the oxide 230 are inhibited from being absorbed into the film containing a metal element in the region 234 and the region 232 of the oxide 230.

An oxygen vacancy is sometimes formed in the region 231 of the oxide 230 and the region 232 adjacent to the region 231 when oxygen in the region 231 and the region 232 is absorbed into the film containing a metal element. Entry of hydrogen in the oxide 230 into the oxygen vacancy increases the carrier density of the region 231 and the region 232. Therefore, the resistance of the region 231 and the region 232 of the oxide 230 becomes low.

In the case where the film containing a metal element has a property of absorbing hydrogen, hydrogen in the oxide 230 is absorbed into the film. Thus, hydrogen, which is an impurity in the oxide 230, can be reduced. The film containing a metal element may be removed with hydrogen absorbed from the oxide 230 in a later step.

Note that the film containing a metal element is not necessarily removed. For example, in the case where the film containing a metal element is insulated and its resistance is increased, the film may remain. For example, the film containing a metal element is oxidized by oxygen absorbed from the oxide 230 to be an insulator, and the resistance is increased, in some cases. In that case, the film containing a metal element functions as an interlayer film, in some cases.

For example, in the case where a region having conductivity remains in the film containing a metal element, heat treatment is performed for oxidation, whereby an insulator is obtained and the resistance is increased. The heat treatment is preferably performed in an oxidation atmosphere, for example. In the case where there is a structure body containing oxygen in the vicinity of the film containing a metal element, heat treatment may cause a reaction of the film containing a metal element with oxygen contained in the structure body and oxidation.

When the film containing a metal element remains as an insulator, the film can function as an interlayer film and the dielectric of the capacitor 100. In the case of the above structure, the film containing a metal element is provided thick enough to become an insulator in a later process. For example, the film containing a metal element is preferably formed to have a thickness greater than or equal to 0.5 nm and less than or equal to 5 nm, preferably greater than or equal to 1 nm and less than or equal to 2 nm. Note that in the case where heat treatment is performed in the above oxidation atmosphere, it is suitably performed after heat treatment in an atmosphere containing nitrogen is performed in a state where the oxide 230 and the film containing a metal element are in contact with each other. When heat treatment is performed in an atmosphere containing nitrogen in advance, oxygen in the oxide 230 is easily diffused into the film containing a metal element.

In the case where the film containing a metal element has sufficient conductivity after the layer 242 is formed, the film containing a metal element may be partly removed and a conductor functioning as the source electrode or the drain electrode of the transistor 200 may be formed. The film containing a metal element is formed to be sufficiently thick, for example, approximately greater than or equal to 10 nm and less than or equal to 200 nm, so that the conductor functioning as the source electrode or the drain electrode can have sufficient conductivity. The conductor functioning as the source electrode or the drain electrode may be an oxide film containing a metal element or a nitride film containing a metal element.

A transistor using an oxide semiconductor is likely to have its electrical characteristics changed by impurities and oxygen vacancies in a channel formation region of the oxide semiconductor, which may affect the reliability. Moreover, when the channel formation region of the oxide semiconductor includes oxygen vacancies, the transistor tends to have normally-on characteristics. Thus, oxygen vacancies in the region 234 where a channel is formed are preferably reduced as much as possible.

Thus, as illustrated in FIG. 18, the insulator 275 containing more oxygen than oxygen in the stoichiometric composition (also referred to as excess oxygen) is preferably provided in contact with the insulator 250, the region 232 of the oxide 230b, and the oxide 230c. That is, excess oxygen contained in the insulator 275 is diffused into the region 234 of the oxide 230, whereby oxygen vacancies in the region 234 of the oxide 230 can be reduced.

An oxide is preferably deposited by a sputtering method for the insulator 273 in contact with the insulator 275, so that an excess oxygen region is provided in the insulator 275. The deposition of the oxide by a sputtering method can result in the deposition of an insulator containing few impurities such as water or hydrogen. In the case of using a sputtering method, the deposition is preferably performed with the use of a facing-target sputtering apparatus, for example. With the facing-target sputtering apparatus, deposition can be performed without exposing a deposition surface to a high electric field region between facing targets; thus, the deposition surface is less likely to be damaged by plasma during the deposition, and accordingly deposition damage to the oxide 230 during the deposition of the insulator to be the insulator 273 can be reduced, which is preferable. A deposition method using the facing-target sputtering apparatus can be referred to as VDSP (Vapor Deposition SP) (registered trademark).

During deposition by a sputtering method, ions and sputtered particles exist between a target and a substrate. For example, a potential $E_0$ is supplied to the target, to which a power supply is connected. A potential $E_1$ such as a ground potential is supplied to the substrate. Note that the substrate may be electrically floating. In addition, there is a region at a potential $E_2$ between the target and the substrate. The potential relationship is $E_2 > E_1 > E_0$.

The ions in plasma are accelerated by a potential difference $E_2$-$E_0$ and collide with the target, whereby the sputtered particles are ejected from the target. These sputtered particles are attached to a deposition surface and deposited thereon; as a result, a film is formed. Some ions recoil at the target and might pass through the formed film as recoil ions, and be taken into the insulator 275 in contact with the deposition surface. The ions in the plasma are accelerated by a potential difference $E_2$-$E_1$ and collide with the deposition surface. At this time, some ions reach the inside of the insulator 275. The ions are taken into the insulator 275 so that a region into which the ions are taken is formed in the insulator 275. That is, an excess oxygen region is formed in the insulator 275 in the case where the ions contain oxygen.

Introduction of excess oxygen into the insulator 275 can form an excess oxygen region in the insulator 275. The excess oxygen in the insulator 275 is supplied to the region 234 of the oxide 230 and can compensate for oxygen vacancies in the oxide 230.

For the insulator 275, silicon oxide, silicon oxynitride, silicon nitride oxide, or porous silicon oxide is preferably used. An excess oxygen region is likely to be formed in a material such as silicon oxynitride. By contrast, an excess oxygen region is less likely to be formed in the oxide 230 than in the aforementioned material such as silicon oxynitride even when an oxide film formed by a sputtering method is formed over the oxide 230. Therefore, providing the insulator 275 including an excess oxygen region in the periphery of the region 234 of the oxide 230 makes it possible to supply excess oxygen in the insulator 275 to the region 234 of the oxide 230 effectively.

For the insulator 273, aluminum oxide is preferably used. When heat treatment is performed in a state where aluminum oxide is adjacent to the oxide 230, the aluminum oxide may extract hydrogen in the oxide 230. Note that when the layer 242 is provided between the oxide 230 and the aluminum oxide, hydrogen in the layer 242 is absorbed into the aluminum oxide and the layer 242 with reduced hydrogen may absorb hydrogen in the oxide 230. In the structure illustrated in FIG. 18, the aluminum oxide can absorb hydrogen from the layer 242b before the conductor 240b is formed. Thus, the hydrogen concentration in the oxide 230 can be lowered. Furthermore, when heat treatment is performed in the state where the insulator 273 is adjacent to the oxide 230, oxygen can be supplied from the insulator 273 to the oxide 230, the insulator 224, or the insulator 222, in some cases.

When the above-described structures or the above-described steps are combined, the resistance of the oxide 230 can be selectively reduced.

In formation of a low-resistance region in the oxide 230, the resistance of the oxide 230 is lowered in a self-aligned manner with the use of the conductor 260 functioning as the gate electrode and the insulator 275 as a mask. Therefore, when the plurality of transistors 200 are formed simultaneously, variations in electrical characteristics of the transistors can be reduced. The channel length of the transistor 200 depends on the width of the conductor 260 or the thickness of the insulator 275; the transistor 200 can be miniaturized when the conductor 260 with the minimum feature width is used.

Thus, by appropriately selecting the areas of the regions, a transistor having electrical characteristics that meet the demand for the circuit design can be easily provided.

An oxide semiconductor can be deposited by a sputtering method or the like, and thus can be used for a transistor included in a highly integrated semiconductor device. A transistor using an oxide semiconductor in its channel formation region has an extremely low leakage current (off-state current) in a non-conducting state; thus, a semiconductor device with low power consumption can be provided. Since the off-state current of the transistor 200 is low, a semiconductor device using such a transistor can retain the stored content for a long time. In other words, refresh operation is not required or the frequency of refresh operation is extremely low; thus, the power consumption of the semiconductor device can be sufficiently reduced.

Accordingly, a semiconductor device including a transistor with a high on-state current can be provided. Alternatively, a semiconductor device including a transistor with a low off-state current can be provided. Alternatively, a semiconductor device that has small variation in electrical characteristics, stable electrical characteristics, and high reliability can be provided.

The structure of a layer structure in the semiconductor device described in this embodiment is described in detail below. Unless otherwise specified below, the description of the detailed structure of the transistor 200 is referred to for the detailed structure of the transistor 700.

The conductor 203 extends in the channel width direction as illustrated in FIG. 15(A) and FIG. 16(A) and functions as a wiring that applies a potential to the conductor 205. Note that the conductor 203 is preferably provided to embed in the insulator 212.

The conductor 205a is positioned to overlap with the oxide 230 and the conductor 260a, and the conductor 205b is positioned to overlap with the oxide 230 and the conductor 260b. Moreover, the conductor 205a and the conductor 205b are preferably provided over and in contact with the conductor 203a and the conductor 203b, respectively. Furthermore, the conductor 205 is preferably provided to embed in the insulator 214 and the insulator 216.

The conductor 260 functions as a first gate (also referred to as a front gate) electrode in some cases. The conductor 205 functions as a second gate (also referred to as a back gate) electrode in some cases. In that case, the threshold voltage of the transistor 200 can be controlled by changing a potential applied to the conductor 205 independently of a potential applied to the conductor 260. In particular, by applying a negative potential to the conductor 205, the threshold voltage of the transistor 200 can be higher than 0

V, and the off-state current can be reduced. Thus, a drain current when a potential applied to the conductor 260 is 0 V can be smaller in the case where a negative potential is applied to the conductor 205 than in the case where the negative potential is not applied.

When the conductor 205 is provided over the conductor 203, the distance between the conductor 203 and the conductor 260 having functions of the first gate electrode and the wiring can be designed as appropriate. That is, the insulator 214, the insulator 216, and the like are provided between the conductor 203 and the conductor 260, whereby a parasitic capacitance between the conductor 203 and the conductor 260 can be reduced, and the withstand voltage between the conductor 203 and the conductor 260 can be increased.

The reduction in the parasitic capacitance between the conductor 203 and the conductor 260 can improve the switching speed of the transistor 200, so that the transistor can have high frequency characteristics. The increase in the withstand voltage between the conductor 203 and the conductor 260 can improve the reliability of the transistor 200. Therefore, the insulator 214 and the insulator 216 are preferably thick. Note that the extending direction of the conductor 203 is not limited thereto; for example, the conductor 203 may extend in the channel length direction of the transistor 200.

The conductor 205 is positioned to overlap with the oxide 230 and the conductor 260 as illustrated in FIG. 15(A). The conductor 205 is preferably provided to be larger than the region 234 of the oxide 230 (see FIG. 18). It is particularly preferable that the conductor 205a extend also in a region on an outer side than an end portion of the region 234a in the oxide 230 that intersects with the channel width direction as illustrated in FIG. 16(A). In other words, the conductor 205a and the conductor 260a preferably overlap with each other with an insulator provided therebetween at a side surface of the oxide 230 in the channel width direction. Note that FIG. 16(A) illustrates the transistor 200a, and the same applies to the transistor 200b.

With the above structure, in the case where potentials are applied to the conductor 260 and the conductor 205, an electric field generated from the conductor 260 and an electric field generated from the conductor 205 are connected, so that the channel formation region formed in the oxide 230 can be covered.

That is, the channel formation region in the region 234 can be electrically surrounded by the electric field of the conductor 260 having a function of the first gate electrode and the electric field of the conductor 205 having a function of the second gate electrode. In this specification, a transistor structure in which a channel formation region is electrically surrounded by electric fields of a first gate electrode and a second gate electrode is referred to as a surrounded channel (S-channel) structure.

In the conductor 205, a first conductor is formed in contact with an inner wall of an opening of the insulator 214 and the insulator 216 and a second conductor is formed more inward than the first conductor. The top surfaces of the first conductor and the second conductor can be substantially level with the top surface of the insulator 216. Although the first conductor of the conductor 205 and the second conductor of the conductor 205 are stacked in the transistor 200, one embodiment of the present invention is not limited thereto. For example, a structure may be employed in which the conductor 205 of a single layer or a stacked-layer structure of three or more layers is provided.

The first conductor of the conductor 205 or the conductor 203 is preferably formed using a conductive material having a function of inhibiting diffusion of impurities (through which the impurities are unlikely to pass) such as a hydrogen atom, a hydrogen molecule, a water molecule, a nitrogen atom, a nitrogen molecule, a nitrogen oxide molecule (e.g., $N_2O$, NO, or $NO_2$), or a copper atom. Alternatively, a conductive material having a function of inhibiting diffusion of at least one of oxygen (e.g., oxygen atoms, oxygen molecules, and the like) (through which oxygen is unlikely to pass) is preferably used. Note that in this specification, a function of inhibiting diffusion of impurities or oxygen means a function of inhibiting diffusion of any one or all of the above impurities and the above oxygen.

When the first conductor of the conductor 205 or the conductor 203 has a function of inhibiting diffusion of oxygen, the conductivity of the second conductor of the conductor 205 or the conductor 203 can be inhibited from being lowered because of oxidation. As a conductive material having a function of inhibiting diffusion of oxygen, for example, tantalum, tantalum nitride, ruthenium, ruthenium oxide is preferably used. Thus, the first conductor of the conductor 205 or the conductor 203 may be a single layer or a stacked layer of the above conductive materials. Thus, impurities such as water or hydrogen can be inhibited from being diffused into the transistor 200 side through the conductor 203 and the conductor 205.

A conductive material containing tungsten, copper, or aluminum as its main component is preferably used for the second conductor of the conductor 205. Note that the second conductor of the conductor 205 is a single layer in the drawing but may have a stacked-layer structure, for example, a stacked layer of the above conductive material and titanium or titanium nitride.

The second conductor of the conductor 203 functions as a wiring and thus is preferably a conductor having higher conductivity than the second conductor of the conductor 205. For example, a conductive material containing copper or aluminum as its main component can be used. The second conductor of the conductor 203 may have a stacked-layer structure, for example, a stacked layer of the above conductive material and titanium or titanium nitride.

It is preferable to use copper for the conductor 203. Copper is preferably used for the wiring and the like because of its low resistance. However, copper is easily diffused; copper may reduce the electrical characteristics of the transistor 200 when diffused into the oxide 230. In view of the above, for example, the insulator 214 is formed using a material such as aluminum oxide or hafnium oxide through which copper is hardly allowed to pass, whereby diffusion of copper can be inhibited.

Figure 24A:
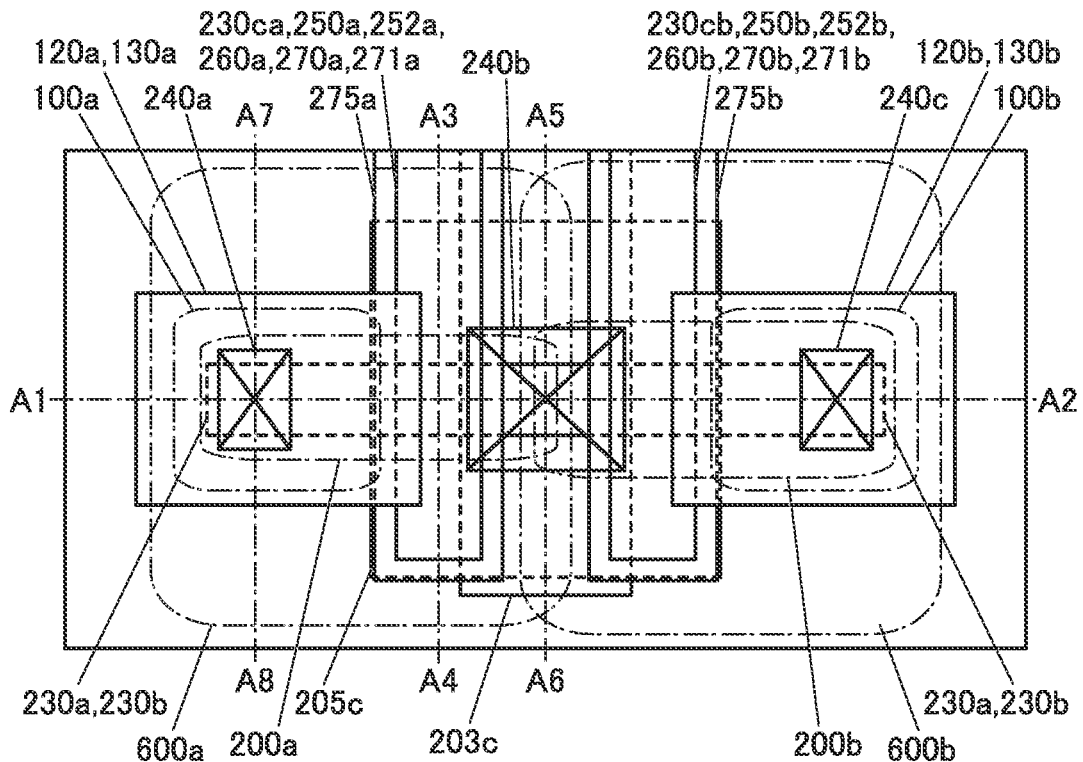
FIGS. 24A-24B A top view and a cross-sectional view illustrating a structure example of a semiconductor device.
Figure 24B:
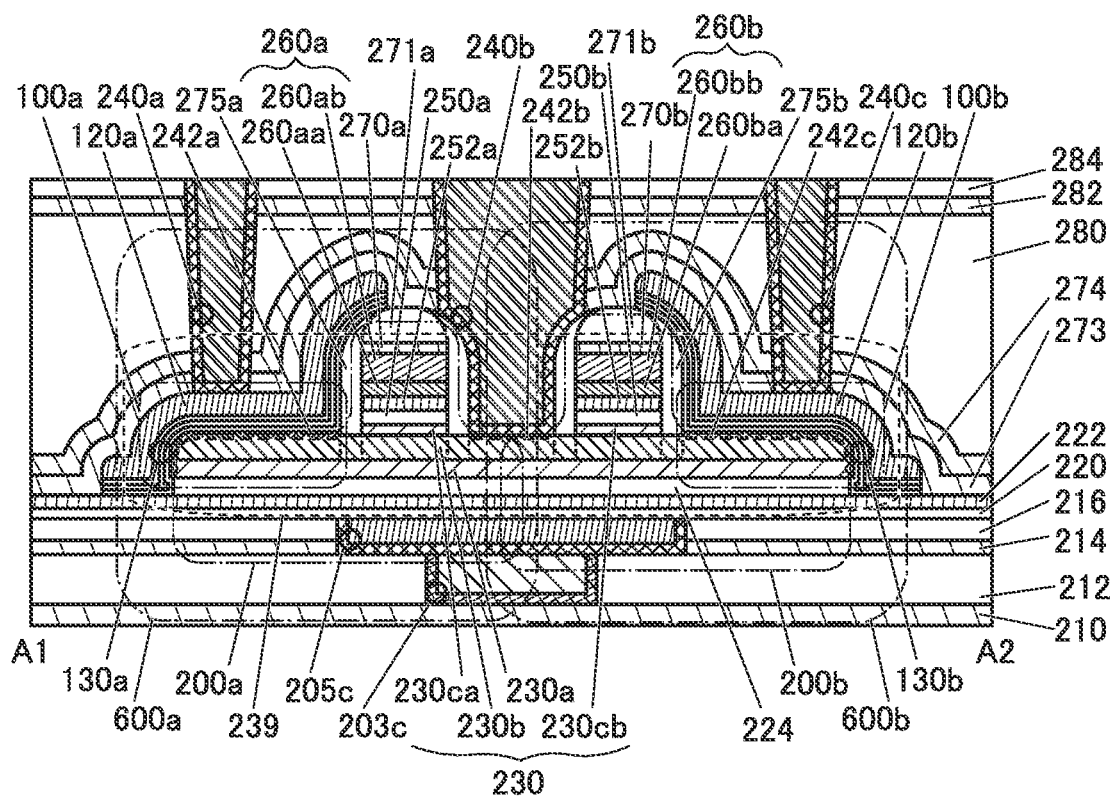

Although the transistor 200a and the transistor 200b are provided with the conductor 205a and the conductor 205b, respectively, which function as back gates in FIG. 15 and the like, the semiconductor device of this embodiment is not limited thereto. In the case where the back gates of the transistor 200a and the transistor 200b are not required to be controlled independently, one conductive layer can serve as both the back gate of the transistor 200a and the back gate of the transistor 200b. For example, a structure may be employed in which a conductor 205c is provided instead of the conductor 205a and the conductor 205b as illustrated in FIG. 24. The conductor 205c functions as the back gate of the transistor 200a and the back gate of a transistor 2005b. In the case of providing the back gates of the transistor 200a and the transistor 200b independently, it is necessary to provide a space between the back gates for patterning of the back gates; meanwhile, when one conductive layer is provided as the back gates of the transistor 200a and the transistor 200b, such a space do not need to be provided. Thus, the area occupied by the memory cell 600a and the memory cell 600b can be reduced, and the semiconductor device of this embodiment can be further highly integrated. In addition, a conductor 203c functioning as the wiring BGL may be provided below the conductor 205c. Note that the conductor 205c has a structure similar to that of the conductor 205 and the description of the conductor 205 can be referred to. Furthermore, the conductor 203c has a structure similar to that of the conductor 203 and the description of the conductor 203 can be referred to.

Figure 25A:
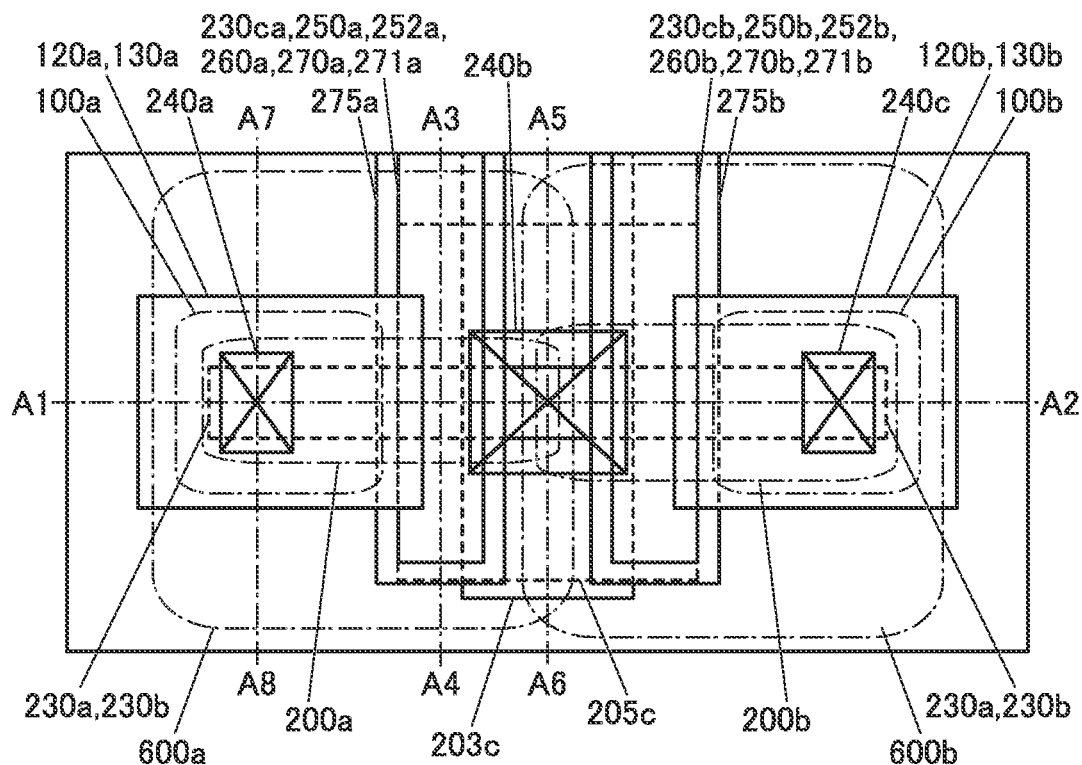
FIGS. 25A-25B A top view and a cross-sectional view illustrating a structure example of a semiconductor device.
Figure 25B:
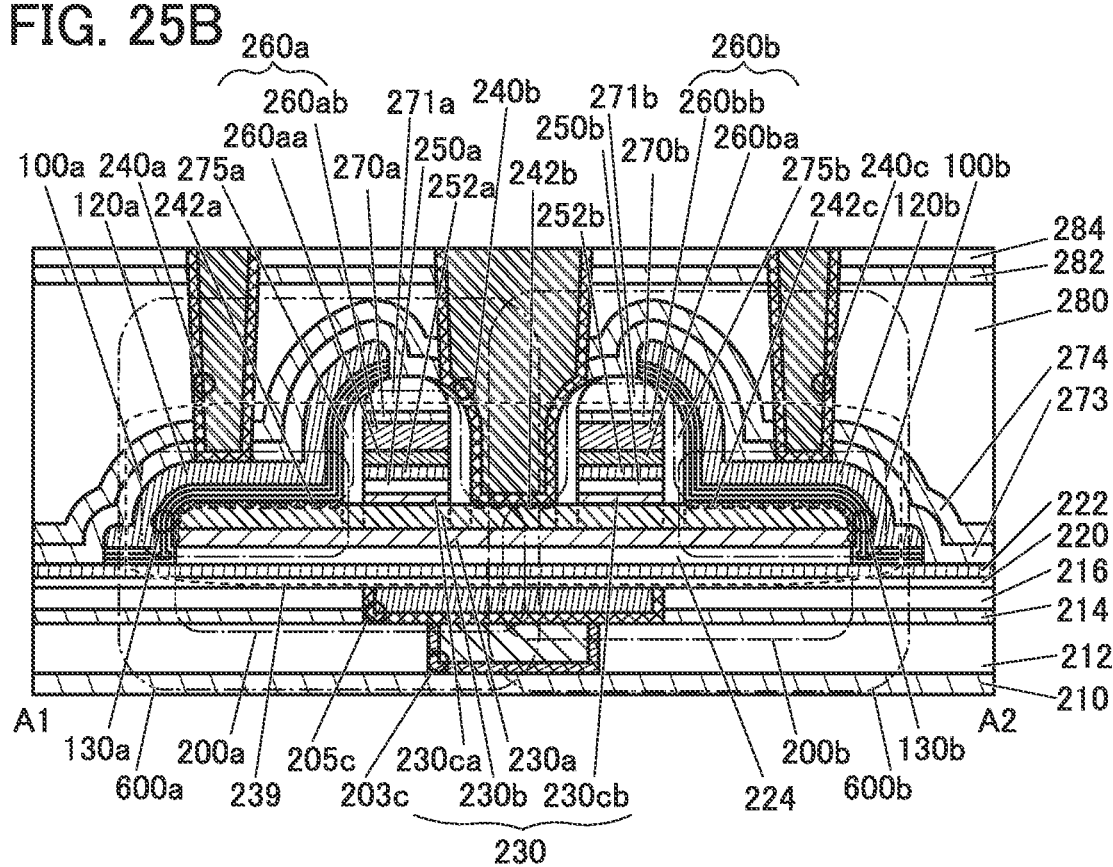

The semiconductor device illustrated in FIG. 24 has an arrangement in which one of the side surfaces of the conductor 205c substantially overlaps with one of the side surfaces of the insulator 275a and one of the side surfaces of the conductor 205c substantially overlaps with one of the side surfaces of the insulator 275b; the semiconductor device of this embodiment is not limited thereto. For example, an arrangement may be employed in which one of the side surfaces of the conductor 205c substantially overlaps with one of the side surfaces of the conductor 260a and one of the side surfaces of the conductor 205c substantially overlaps with one of the side surfaces of the conductor 260b, as illustrated in FIG. 25. In other words, the length of the conductor 205c in the channel length direction of the transistor 200 is shorter in FIG. 25 than that of the conductor 205c illustrated in FIG. 24. When the conductor 205c is provided as illustrated in FIG. 25, the distance between one of the side surfaces of the conductor 205c and the region 231a and the distance between one of the side surfaces of the conductor 205c and the region 231c can be larger than those in the transistor 200a and the transistor 200b illustrated in FIG. 24; thus, parasitic capacitance and leakage current that occur therebetween can be reduced (see FIG. 15(A) and FIG. 18 together).

The conductor 205, the insulator 214, and the insulator 216 are not necessarily provided. In this case, part of the conductor 203 can function as the second gate electrode.

The insulator 210, the insulator 214, and the insulator 282 preferably function as a barrier insulating film for inhibiting impurities such as water or hydrogen from entering the transistor 200 from the substrate side or the insulator 284 side. Thus, the insulator 210, the insulator 214, and the insulator 282 are preferably formed using an insulating material having a function of inhibiting diffusion of impurities (through which the impurities are unlikely to pass) such as a hydrogen atom, a hydrogen molecule, a water molecule, a nitrogen atom, a nitrogen molecule, a nitrogen oxide molecule (e.g., $N_2O$, $NO$, or $NO_2$), or a copper atom. Alternatively, an insulating material having a function of inhibiting diffusion of at least one of oxygen (e.g., oxygen atoms, oxygen molecules, and the like) (through which oxygen is unlikely to pass) is preferably used.

For example, it is preferable that aluminum oxide or the like be used for the insulator 210 and the insulator 282 and that silicon nitride or the like be used for the insulator 214. Accordingly, impurities such as water or hydrogen can be inhibited from being diffused to the transistor 200 side from the substrate side of the insulator 210 and the insulator 214. Alternatively, oxygen contained in the insulator 224 or the like can be inhibited from being diffused to the substrate side of the insulator 210 and the insulator 214. Alternatively, impurities such as hydrogen or water can be inhibited from being diffused to the transistor 200 side from the insulator 284 side of the insulator 282.

Furthermore, with the structure in which the conductor 205 is stacked over the conductor 203, the insulator 214 can be provided between the conductor 203 and the conductor 205. Here, even when a metal that is easily diffused, such as copper, is used as the second conductor of the conductor 203, silicon nitride or the like provided as the insulator 214 can inhibit diffusion of the metal to a layer above the insulator 214.

The dielectric constants of the insulator 212, the insulator 216, the insulator 280, and the insulator 284 functioning as interlayer films are preferably lower than that of the insulator 210 or the insulator 214. When a material with a low dielectric constant is used for an interlayer film, the parasitic capacitance generated between wirings can be reduced.

For example, for the insulator 212, the insulator 216, the insulator 280, and the insulator 284, a single layer or a stacked layer of an insulator such as silicon oxide, silicon oxynitride, silicon nitride oxide, aluminum oxide, hafnium oxide, tantalum oxide, zirconium oxide, lead zirconate titanate (PZT), strontium titanate ($SrTiO_3$), or (Ba, Sr)$TiO_3$ (BST) can be used. In addition, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. Silicon oxide, silicon oxynitride, or silicon nitride may be stacked over the insulators.

The insulator 220, the insulator 222, and the insulator 224 have a function of a gate insulator. Furthermore, the insulator 724 provided in the transistor 700 has a function of a gate insulator like the insulator 224. Although the insulator 224 and the insulator 724 are separated from each other in this embodiment, the insulator 224 and the insulator 724 may be connected.

For the insulator 224 in contact with the oxide 230, an insulator containing more oxygen than oxygen in the stoichiometric composition is preferably used. That is, an excess oxygen region is preferably formed in the insulator 224. When such an insulator containing excess oxygen is provided in contact with the oxide 230, oxygen vacancies in the oxide 230 can be reduced, whereby the reliability of the transistor 200 can be improved.

As the insulator including an excess oxygen region, specifically, an oxide material from which part of oxygen is released by heating is preferably used. An oxide that releases oxygen by heating is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or $3.0 \times 10^{20}$ atoms/cm$^3$ in TDS (Thermal Desorption Spectroscopy) analysis. Note that the temperature of the film surface in the TDS analysis is preferably in a range of higher than or equal to 100° C. and lower than or equal to 700° C., or higher than or equal to 100° C. and lower than or equal to 400° C.

In the case where the insulator 224 includes an excess oxygen region, it is preferable that the insulator 222 have a function of inhibiting diffusion of at least one of oxygen (oxygen atoms, oxygen molecules, and the like) (the oxygen is not likely to pass).

When the insulator 222 has a function of inhibiting diffusion of oxygen, oxygen in the excess oxygen region of the insulator 224 is not diffused into the insulator 220 side and thus can be supplied to the oxide 230 efficiently. Moreover, the conductor 205 can be inhibited from reacting with oxygen in the excess oxygen region of the insulator 224.

For the insulator 222, a single layer or a stacked layer of an insulator containing what is called a high-k material such as aluminum oxide, hafnium oxide, tantalum oxide, zirconium oxide, lead zirconate titanate (PZT), strontium titanate (SrTiO$_3$), or (Ba,Sr)TiO$_3$ (BST) is preferably used, for example. As miniaturization and high integration of a transistor proceed, a problem such as leakage current may arise because of a reduction in the thickness of the gate insulator. When a high-k material is used for an insulator functioning as the gate insulator, a gate potential at the time of operating the transistor can be reduced while the thickness is kept.

In particular, an insulator containing an oxide of one or both of aluminum and hafnium, which is an insulating material having a function of inhibiting diffusion of impurities, oxygen, and the like (the oxygen is less likely to pass) is preferably used. For the insulator containing an oxide of one or both of aluminum and hafnium, aluminum oxide, hafnium oxide, an oxide containing aluminum and hafnium (hafnium aluminate), or the like is preferably used. When the insulator 222 is formed using such a material, the insulator 222 functions as a layer that inhibits release of oxygen from the oxide 230 and entry of impurities such as hydrogen from the periphery of the transistor 200 into the oxide 230.

Alternatively, to these insulators, aluminum oxide, bismuth oxide, germanium oxide, niobium oxide, silicon oxide, titanium oxide, tungsten oxide, yttrium oxide, or zirconium oxide may be added, for example. Alternatively, these insulators may be subjected to nitriding treatment. Silicon oxide, silicon oxynitride, or silicon nitride may be stacked over the insulator.

It is preferable that the insulator 220 be thermally stable. For example, as silicon oxide and silicon oxynitride have thermal stability, combination of an insulator with a high-k material and the insulator 220 allows the stacked-layer structure to be thermally stable and have a high dielectric constant.

Note that the insulator 220, the insulator 222, and the insulator 224 may each have a stacked-layer structure of two or more layers. In that case, the stacked layers are not necessarily formed from the same material and may be formed from different materials.

The oxide 230 includes the oxide 230*a*, the oxide 230*b* over the oxide 230*a*, and the oxide 230*c* over the oxide 230*b*. When the oxide 230*a* is provided below the oxide 230*b*, impurities can be inhibited from being diffused into the oxide 230*b* from the structures formed below the oxide 230*a*. When the oxide 230*c* is provided over the oxide 230*b*, impurities can be inhibited from being diffused into the oxide 230*b* from the structures formed above the oxide 230*c*.

The oxide 230 preferably has a stacked-layer structure of oxides whose atomic ratio of metal elements is different. Specifically, the atomic ratio of the element M in constituent elements of the metal oxide used for the oxide 230*a* is preferably greater than the atomic ratio of the element M in constituent elements of the metal oxide used as the oxide 230*b*. Moreover, the atomic ratio of the element M to In in the metal oxide used as the oxide 230*a* is preferably greater than the atomic ratio of the element M to In in the metal oxide used as the oxide 230*b*. Moreover, the atomic ratio of In to the element M in the metal oxide used as the oxide 230*b* is preferably greater than the atomic ratio of In to the element M in the metal oxide used as the oxide 230*a*. The oxide 230*c* can be formed using a metal oxide which can be used as the oxide 230*a* or the oxide 230*b*.

The energy of the conduction band minimum of the oxide 230*a* and the oxide 230*c* is preferably higher than that of the oxide 230*b*. In other words, the electron affinity of the oxide 230*a* and the oxide 230*c* is preferably lower than that of the oxide 230*b*.

The conduction band minimum gradually changes at a junction portion of the oxide 230*a*, the oxide 230*b*, and the oxide 230*c*. In other words, the conduction band minimum at a junction portion of each of the oxide 230*a*, the oxide 230*b*, and the oxide 230*c* continuously changes or is continuously connected. To obtain this, the density of defect states in a mixed layer formed at an interface between the oxide 230*a* and the oxide 230*b*, and an interface between the oxide 230*b* and the oxide 230*c* is preferably made low.

Specifically, when the oxide 230*a* and the oxide 230*b* or the oxide 230*b* and the oxide 230*c* contain the same element (as a main component) in addition to oxygen, a mixed layer with a low density of defect states can be formed. For example, when the oxide 230*b* is an In—Ga—Zn oxide, it is preferable to use an In—Ga—Zn oxide, a Ga—Zn oxide, gallium oxide, or the like as the oxide 230*a* and the oxide 230*c*.

At this time, the oxide 230*b* serves as a main carrier path. When the oxide 230*a* and the oxide 230*c* have the above structure, the density of defect states at the interface between the oxide 230*a* and the oxide 230*b* and the interface between the oxide 230*b* and the oxide 230*c* can be made low. Thus, the influence of interface scattering on carrier conduction is small, and the transistor 200 can have a high on-state current.

The oxide 230 includes the region 231, the region 232, and the region 234. Note that there is a region where at least part of the region 231 is adjacent to the insulator 273. The region 232 has a region overlapping with at least the insulator 275.

When the transistor 200 is brought to be an on state, the region 231*a* or the region 231*b* functions as the source region or the drain region. On the other hand, at least part of the region 234 functions as a channel formation region. When the region 232 is provided between the region 231 and the region 234, the transistor 200 can have a high on-state current and a low leakage current (off-state current) in an off state.

When the region 232 is provided in the transistor 200, high-resistance regions are not formed between the region 231 functioning as the source region and the drain region and the region 234 where a channel is formed, so that the on-state current and the mobility of the transistor can be increased. When the first gate electrode (the conductor 260) does not overlap with the source region and the drain region in the channel length direction owing to the region 232, formation of unnecessary capacitance between them can be suppressed. Leakage current in an off state can be reduced owing to the region 232.

That is, by appropriately selecting the areas of the regions, a transistor having electrical characteristics that meet the demand for the circuit design can be easily provided. For example, the transistor 200 can have a structure with a small off-state current and the transistor 700 can have a structure with a large on-state current.

The oxide 230 is preferably formed using a metal oxide functioning as an oxide semiconductor (hereinafter also referred to as an oxide semiconductor). For example, as the metal oxide to be the region 234, a metal oxide having a band gap of 2 eV or more, preferably 2.5 eV or more, is preferably used. With the use of a metal oxide having such a wide band gap, the off-state current of the transistor can be reduced.

A transistor including an oxide semiconductor has an extremely low leakage current in an off state; thus, a semiconductor device with low power consumption can be provided. An oxide semiconductor can be formed by a sputtering method or the like, and thus can be used for a transistor constituting a highly integrated semiconductor device.

The insulator 250 functions as a gate insulator. The insulator 250a is preferably positioned in contact with the top surface of the oxide 230ca, and the insulator 250b is preferably positioned in contact with the top surface of the oxide 230cb. The insulator 250 is preferably formed using an insulator from which oxygen is released by heating. For example, an oxide film of which the amount of released oxygen converted into oxygen molecules is greater than or equal to $1.0 \times 10^{18}$ atoms/cm$^3$, preferably greater than or equal to $1.0 \times 10^{19}$ atoms/cm$^3$, further preferably $2.0 \times 10^{19}$ atoms/cm$^3$ or $3.0 \times 10^{20}$ atoms/cm$^3$ in thermal desorption spectroscopy analysis (TDS analysis), is used. Note that the temperature of the film surface in the TDS analysis is preferably in a range of higher than or equal to 100° C. and lower than or equal to 700° C.

Specifically, silicon oxide containing excess oxygen, silicon oxynitride, silicon nitride oxide, silicon nitride, silicon oxide to which fluorine is added, silicon oxide to which carbon is added, silicon oxide to which carbon and nitrogen are added, or porous silicon oxide can be used. In particular, silicon oxide and silicon oxynitride, which have thermal stability, are preferable.

When an insulator from which oxygen is released by heating is provided in contact with the top surface of the oxide 230c as the insulator 250, oxygen can be effectively supplied from the insulator 250 to the region 234 of the oxide 230b. As in the insulator 224, the concentration of impurities such as water or hydrogen in the insulator 250 is preferably lowered. The thickness of the insulator 250 is preferably greater than or equal to 1 nm and less than or equal to 20 nm.

Furthermore, in order that excess oxygen of the insulator 250 may be supplied to the oxide 230 efficiently, the metal oxide 252 may be provided. Therefore, the metal oxide 252 preferably inhibits diffusion of oxygen from the insulator 250. Provision of the metal oxide 252 that inhibits diffusion of oxygen inhibits diffusion of excess oxygen from the insulator 250 to the conductor 260. That is, reduction in the amount of excess oxygen that is supplied to the oxide 230 can be inhibited. Moreover, oxidation of the conductor 260 due to excess oxygen can be suppressed.

Note that the metal oxide 252 may function as part of the first gate. For example, an oxide semiconductor that can be used as the oxide 230 can be used as the metal oxide 252. In this case, when the conductor 260 is formed by a sputtering method, the metal oxide 252 can have a reduced electric resistance to be a conductor. Such a conductor can be referred to as an OC (Oxide Conductor) electrode.

Note that the metal oxide 252 has a function of a part of the gate insulator in some cases. Therefore, when silicon oxide, silicon oxynitride, or the like is used for the insulator 250, a metal oxide that is a high-k material with a high dielectric constant is preferably used as the metal oxide 252. Such a stacked-layer structure can be thermally stable and can have a high dielectric constant. Thus, a gate potential that is applied during operation of the transistor can be reduced while the thickness is kept. In addition, the equivalent oxide thickness (EOT) of an insulator functioning as the gate insulator can be reduced.

Although the metal oxide 252 in the transistor 200 is shown as a single layer, a stacked-layer structure of two or more layers may be employed. For example, a metal oxide functioning as part of a gate electrode and a metal oxide functioning as part of a gate insulator may be stacked.

With the metal oxide 252 functioning as a gate electrode, the on-state current of the transistor 200 can be increased without a reduction in the influence of the electric field generated from the conductor 260. With the metal oxide 252 functioning as a gate insulator, the distance between the conductor 260 and the oxide 230 is kept by the physical thicknesses of the insulator 250 and the metal oxide 252, so that leakage current between the conductor 260 and the oxide 230 can be reduced. Thus, with the stacked-layer structure of the insulator 250 and the metal oxide 252, the physical distance between the conductor 260 and the oxide 230 and the intensity of electric field applied from the conductor 260 to the oxide 230 can be easily adjusted as appropriate.

Specifically, for the metal oxide 252, the resistance of the oxide semiconductor that can be used for the oxide 230 is reduced so that the oxide semiconductor can be used for the metal oxide 252. Alternatively, a metal oxide containing one kind or two or more kinds selected from hafnium, aluminum, gallium, yttrium, zirconium, tungsten, titanium, tantalum, nickel, germanium, magnesium, and the like can be used.

It is particularly preferable to use an insulator containing an oxide of one or both of aluminum and hafnium, for example, aluminum oxide, hafnium oxide, or an oxide containing aluminum and hafnium (hafnium aluminate). In particular, hafnium aluminate has higher heat resistance than a hafnium oxide film. Thus, it is preferable as it is less likely to be crystallized by a thermal budget in a later step. Note that the metal oxide 252 is not an essential structure. Design is appropriately determined in consideration of required transistor characteristics.

The conductor 260a functioning as the first gate electrode includes the conductor 260aa and the conductor 260ab over the conductor 260aa. Furthermore, the conductor 260b functioning as the first gate electrode includes the conductor 260ba and the conductor 260bb over the conductor 260ba. Like the first conductor of the conductor 205, the conductor 260a is preferably formed using a conductive material having a function of inhibiting diffusion of impurities such as a hydrogen atom, a hydrogen molecule, a water molecule, a nitrogen atom, a nitrogen molecule, a nitrogen oxide molecule (e.g., $N_2O$, $NO$, or $NO_2$), or a copper atom. Alternatively, a conductive material having a function of inhibiting diffusion of at least one of oxygen (e.g., oxygen atoms, oxygen molecules, and the like) is preferably used.

When the conductor 260a has a function of inhibiting diffusion of oxygen, the conductivity of the conductor 260b can be inhibited from being lowered because of oxidation due to excess oxygen contained in the insulator 250 and the metal oxide 252. As a conductive material having a function of inhibiting diffusion of oxygen, for example, tantalum, tantalum nitride, ruthenium, ruthenium oxide, or the like is preferably used.

Furthermore, the conductor 260b is preferably formed using a conductive material including tungsten, copper, or aluminum as its main component. The conductor 260 functions as a wiring and thus is preferably a conductor having high conductivity. For example, a conductive material containing tungsten, copper, or aluminum as its main component can be used. The conductor 260b may have a stacked-layer structure, for example, a stacked layer of the above conductive material and titanium or titanium nitride.

In the case where the conductor 205 extends beyond the end portions of the oxide 230 that intersect with the channel width direction as illustrated in FIG. 16(A), the conductor 260 preferably overlaps with the conductor 205 with the insulator 250 positioned therebetween in the region. That is, a stacked-layer structure of the conductor 205, the insulator 250, and the conductor 260 is preferably formed outside the side surface of the oxide 230.

With the above structure, in the case where potentials are applied to the conductor 260 and the conductor 205, an electric field generated from the conductor 260 and an electric field generated from the conductor 205 are connected, so that the channel formation region in the oxide 230 can be covered.

That is, the channel formation region in the region 234 can be electrically surrounded by the electric field of the conductor 260 having a function of the first gate electrode and the electric field of the conductor 205 having a function of the second gate electrode.

Furthermore, the insulator 270a functioning as a barrier film may be positioned over the conductor 260ab and the insulator 270b functioning as a barrier film may be positioned over the conductor 260bb. The insulator 270 is preferably formed using an insulating material having a function of inhibiting the passage of oxygen and impurities such as water or hydrogen. For example, aluminum oxide or hafnium oxide is preferably used. Thus, oxidation of the conductor 260 due to oxygen from above the insulator 270 can be inhibited. Moreover, entry of impurities such as water or hydrogen from above the insulator 270 into the oxide 230 through the conductor 260 and the insulator 250 can be inhibited.

Furthermore, the insulator 271a functioning as a hard mask is preferably positioned over the insulator 270a and the insulator 271b functioning as a hard mask is preferably positioned over the insulator 270b. By provision of the insulator 271, in processing the conductor 260, the side surface of the conductor 260 can be substantially perpendicular; specifically, an angle formed by the side surface of the conductor 260 and a surface of the substrate can be greater than or equal to 75° and less than or equal to 100°, preferably greater than or equal to 80° and less than or equal to 95°. When the conductor 260 is processed into such a shape, the insulator 275 that is subsequently formed can be formed into a desired shape.

The insulator 271 may be formed using an insulating material having a function of inhibiting the passage of oxygen and impurities such as water or hydrogen so that the insulator 271 also functions as a barrier film. In that case, the insulator 270 is not necessarily provided.

The insulator 275a functioning as a buffer layer is provided in contact with the side surface of the oxide 230ca, the side surface of the insulator 250a, the side surface of the metal oxide 252a, the side surface of the conductor 260a, and the side surface of the insulator 270a. Furthermore, the insulator 275b functioning as a buffer layer is provided in contact with the side surface of the oxide 230cb, the side surface of the insulator 250b, the side surface of the metal oxide 252b, the side surface of the conductor 260b, and the side surface of the insulator 270b.

The insulator 275a can be formed by forming an insulating film that covers the oxide 230ca, the insulator 250a, the metal oxide 252a, the conductor 260a, the insulator 270a, and the insulator 271a and performing anisotropic etching (e.g., dry etching treatment or the like) on the insulating film. The insulator 275b can be formed at the same time as the insulator 275.

For example, the insulator 275 preferably includes silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, a resin, or the like. In particular, silicon oxide and silicon oxynitride, which have thermal stability, are preferable. In particular, silicon oxide and porous silicon oxide, in which an excess oxygen region can be formed easily in a later step, are preferable.

The insulator 275 preferably includes an excess oxygen region. When an insulator from which oxygen is released by heating is provided in contact with the oxide 230c and the insulator 250 as the insulator 275, oxygen can be effectively supplied from the insulator 250 to the region 234 of the oxide 230b. The concentration of impurities such as water or hydrogen in the film of the insulator 275 is preferably lowered.

An insulator with a high dielectric constant is preferably used for the insulator 130, and an insulator that can be used for the insulator 222 or the like is used. For example, an insulator containing an oxide of one or both of aluminum and hafnium can be used. Aluminum oxide, hafnium oxide, an oxide containing aluminum and hafnium (hafnium aluminate), or the like is preferably used for the insulator containing an oxide of one or both of aluminum and hafnium. The insulator 130 may have a stacked-layer structure; for example, two or more layers selected from silicon oxide, silicon oxynitride, silicon nitride oxide, silicon nitride, aluminum oxide, hafnium oxide, an oxide containing aluminum and hafnium (hafnium aluminate), and the like may be used for the stacked-layer structure. For example, it is preferable that hafnium oxide, aluminum oxide, and hafnium oxide be deposited in this order by an ALD method so that a stacked-layer structure is obtained. The hafnium oxide and the aluminum oxide each have a thickness greater than or equal to 0.5 nm and less than or equal to 5 nm. With such a stacked-layer structure, the capacitor 100 can have a large capacitance value and a low leakage current.

Although the side surface of the insulator 130 is aligned with the side surface of the conductor 120 when seen from the top as illustrated in FIG. 15(A), there is no such limitation. For example, a structure may be employed in which the insulator 130 is formed without patterning so that the insulator 130 covers the transistor 200a, the transistor 200b, and the transistor 700.

The conductor 120 is preferably formed using a conductive material containing tungsten, copper, or aluminum as its main component. Although not illustrated, the conductor 120 may have a stacked-layer structure and may be, for example, a stacked layer of the above conductive material and titanium or titanium nitride.

The insulator 130a and the conductor 120a are preferably provided to cover a side surface of the oxide 230 as illustrated in FIG. 17. With such a structure, the capacitor 100a can be formed also in the side surface direction of the oxide 230; thus, the electric capacity per unit area of the capacitor 100a can be increased. It is preferable that, although not illustrated, the insulator 130b and the conductor 120b in the capacitor 100b be provided similarly to the insulator 130a and the conductor 120a in the capacitor 100a.

Furthermore, the insulator 130 and the conductor 120 are preferably provided such that the insulator 130 and the conductor 120 partly overlap with the insulator 271 as illustrated in FIG. 15(B). Accordingly, the region 231a (the region 231c) to the end portion on the insulator 275 side can function as the electrode of the capacitor as illustrated in FIG. 18. Since the insulator 275 is formed, parasitic capacitance between the conductor 120 and the conductor 260 can be reduced.

The insulator 273 is preferably provided over the insulator 275a, the insulator 275b, the insulator 271a, the insulator 271b, the layer 742, the insulator 775, the insulator 771, the conductor 120a, and the conductor 120b. When the insulator 273 is formed by a sputtering method, excess oxygen regions can be provided in the insulator 275 and the insulator 775. Accordingly, oxygen can be supplied from the excess oxygen regions to the oxide 230 and the oxide 730. Furthermore, when the insulator 273 is provided over the layer 242c in the oxide 230 and the layer 742 in the oxide 730, the insulator 273 can extract hydrogen in the oxide 230 and the oxide 730.

For example, a metal oxide containing one kind or two or more kinds selected from hafnium, aluminum, gallium, yttrium, zirconium, tungsten, titanium, tantalum, nickel, germanium, magnesium, and the like can be used for the insulator 273.

In particular, aluminum oxide has a high barrier property, so that even a thin aluminum oxide film having a thickness greater than or equal to 0.5 nm and less than or equal to 3.0 nm can inhibit diffusion of hydrogen and nitrogen.

The insulator 274 is provided over the insulator 273. As the insulator 274, a film having a barrier property and a reduced hydrogen concentration is preferably used. For example, silicon nitride oxide, silicon nitride, silicon oxide to which fluorine is added, or the like is preferably used for the insulator 274. When the insulator 273 having a barrier property and the insulator 274 having a barrier property are provided, diffusion of impurities from other structure bodies such as an interlayer film into the transistor 200 can be inhibited.

The insulator 280 functioning as an interlayer film is preferably provided over the insulator 274. As in the insulator 224 or the like, the concentration of impurities such as water or hydrogen in the film of the insulator 280 is preferably reduced. Note that the insulator 282 similar to the insulator 210 may be provided over the insulator 280. When the insulator 282 is formed by a sputtering method, impurities in the insulator 280 can be reduced. In the case of providing the insulator 282, a structure may be employed in which one or both of the insulator 273 and the insulator 274 are not provided. Furthermore, the insulator 284 similar to the insulator 280 may be provided over the insulator 282.

The conductor 240a, the conductor 240b, the conductor 240c, the conductor 740a, and the conductor 740b are positioned in openings formed in the insulator 284, the insulator 282, the insulator 280, the insulator 274, and the insulator 273. The conductor 240a and the conductor 240b are provided to face each other with the conductor 260a positioned therebetween, and the conductor 240b and the conductor 240c are provided to face each other with the conductor 260b positioned therebetween. The conductor 740a and the conductor 740b are provided to face each other with the conductor 760 positioned therebetween. Note that the levels of the top surfaces of the conductor 240a, the conductor 240b, the conductor 240c, the conductor 740a, and the conductor 740b may be on the same plane as the top surface of the insulator 284.

Note that the conductor 240b is formed in contact with the inner wall of the opening in the insulator 284, the insulator 282, the insulator 280, the insulator 274, the insulator 273, and the insulator 275. The region 231b of the oxide 230 is positioned in at least part of a bottom portion of the opening, and thus the conductor 240b is in contact with the region 231b. The same applies to the conductor 740a and the conductor 740b. The conductor 240a is in contact with the conductor 120a and the conductor 240c is in contact with the conductor 120b.

The conductor 240b is positioned between the conductor 260a and the conductor 260b as illustrated in FIG. 15(B) and FIG. 18. Here, the conductor 240b preferably has a region in contact with one or both of side surfaces of the insulator 275a and the insulator 275b. In that case, the insulator 273 preferably has a region in contact with one or both of the side surfaces of the insulator 275a and the insulator 275b in the opening in which the conductor 240b is embedded.

In formation of the opening in which the conductor 240b is embedded, opening conditions are preferably set such that the etching rate of the insulator 275 is much lower than the etching rate of the insulator 273 at the time of forming the opening in the insulator 280, the insulator 274, and the insulator 273. When the etching rate of the insulator 275 is 1, the etching rate of the insulator 273 is preferably 5 or more, further preferably 10 or more. Here, it is preferable that an insulating material used for the insulator 275 be selected as appropriate depending on the etching conditions and an insulating material used for the insulator 273 such that the above etching rates are obtained. For example, an insulating material that can be used for the insulator 270 as well as the above insulating material may be used as the insulating material used for the insulator 275.

In the case of a structure in which the insulator 273 and the insulator 274 are not provided, opening conditions at the time of forming the opening are preferably set such that the etching rate of the insulator 275 is much lower than the etching rate of the insulator 280; when the etching rate of the insulator 275 is 1, the etching rate of the insulator 280 is preferably 5 or more, further preferably 10 or more.

Figure 26A:
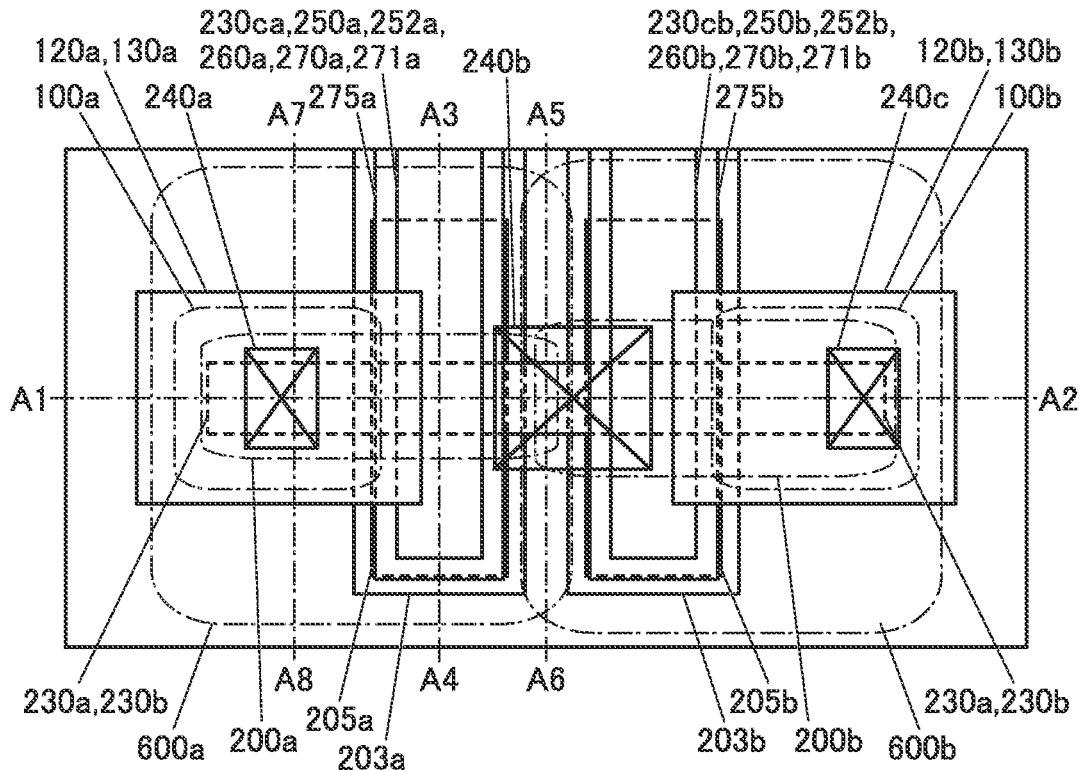
FIGS. 26A-26B A top view and a cross-sectional view illustrating a structure example of a semiconductor device.
Figure 26B:
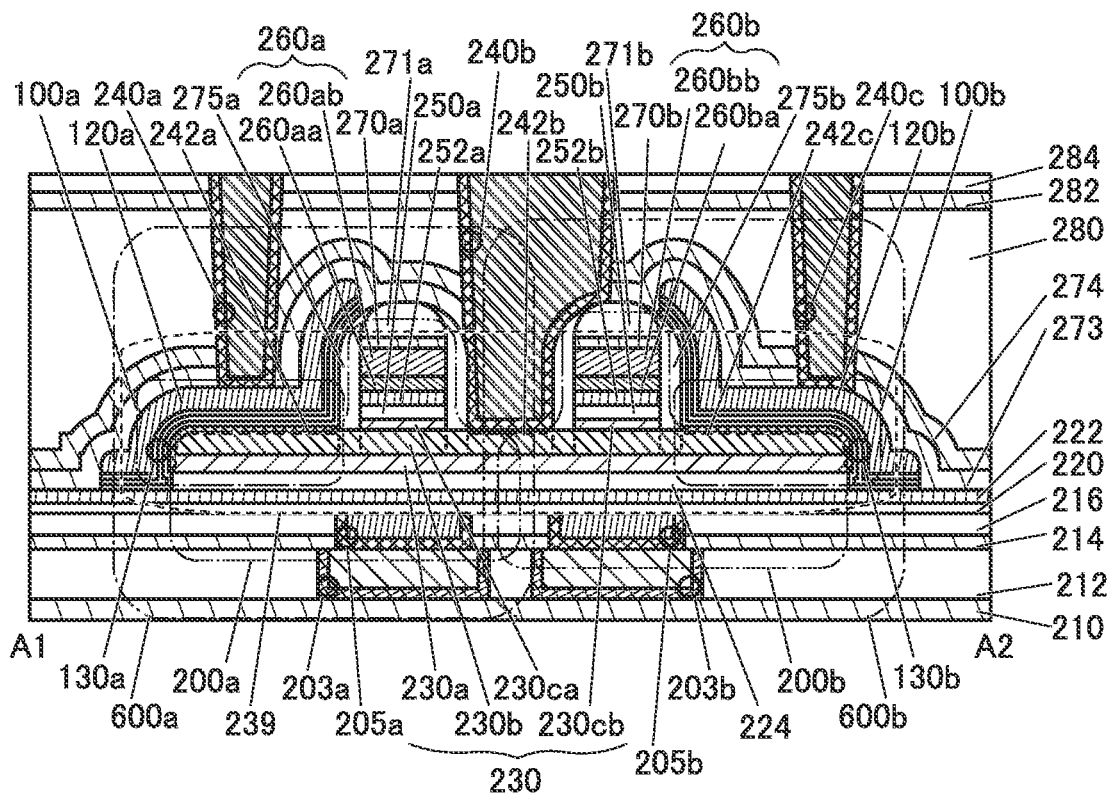

When the opening in which the conductor 240b is embedded is formed in such a manner, the insulator 275a and the insulator 275b function as etching stoppers at the time of forming the opening; thus, the opening can be prevented from reaching the conductor 260a and the conductor 260b. Accordingly, the conductor 240b and the opening in which the conductor 240b is embedded can be formed in a self-aligned manner. Even when the formed openings in which the conductor 240a, the conductor 240b, and the conductor 240c are formed to be displaced to the transistor 200b side as illustrated in FIG. 26, for example, the conductor 240b and the conductor 260b are not in contact with each other. When the width of the opening in which the conductor 240b is formed in the channel length direction of the transistor 200 is made larger than the distance between the insulator 275a and the insulator 275b, the conductor 240b can have sufficient contact with the layer 242b even if the position of the formed opening is displaced, as illustrated in FIG. 26. Here, the same insulating material as the insulator 275 may be used for the insulator 271a and the insulator 271b, so that the insulator 271a and the insulator 271b also function as etching stoppers.

Accordingly, alignment margins for contact portions of the transistor 200a and the transistor 200b and the gates of the transistor 200a and the transistor 200a can be made wide; thus, the space between these components can be designed to be small. In the above manner, the semiconductor device can be miniaturized and highly integrated.

As illustrated in FIG. 16(B), the conductor 240b preferably overlaps with a side surface of the oxide 230 with the layer 242b therebetween. It is particularly preferable that the conductor 240b overlap with one or both of the side surface on the A5 side and the side surface thereof on the A6 side, which intersect with the channel width direction of the oxide 230. With such a structure in which the conductor 240b overlaps with the side surface of the oxide 230 in the region 231b serving as the source region or the drain region, the contact area of the contact portion between the conductor 240b and the transistor 200 can be increased without increasing the projected area of the contact portion, so that the contact resistance between the conductor 240b and the transistor 200 can be reduced. Accordingly, miniaturization of the source electrode and the drain electrode of the transistor can be achieved and the on-state current can be increased. Note that although the length of the conductor 240b in the channel width direction is larger than the length of the oxide 230 in the channel width direction in FIG. 16(B), the semiconductor device described in this embodiment is not limited thereto; for example, a structure may be employed in which the length of the conductor 240b in the channel width direction is substantially the same as the length of the oxide 230 in the channel width direction.

The conductor 740a and the conductor 740b illustrated in FIG. 12(A) and FIG. 13 can each have a structure similar to that of the conductor 240b.

The conductor 240 and the conductor 740 are each preferably formed using a conductive material containing tungsten, copper, or aluminum as its main component. The conductor 240 and the conductor 740 may each have a stacked-layer structure.

When an opening is formed in the insulator 284, the insulator 282, the insulator 280, the insulator 274, and the insulator 273, for example, the low-resistance region in the region 231 of the oxide 230 is removed and the oxide 230 whose resistance is not lowered is exposed in some cases. In that case, a conductor used for a conductor of the conductor 240 in contact with the oxide 230 (hereinafter also referred to as a first conductor of the conductor 240) may be formed using a metal film, a nitride film containing a metal element, or an oxide film containing a metal element. When the oxide 230 with the resistance not lowered is in contact with the first conductor of the conductor 240, an oxygen vacancy is formed in the metal compound or the oxide 230, whereby the resistance of the region 231 of the oxide 230 is reduced. The reduction in the resistance of the oxide 230 that is in contact with the first conductor of the conductor 240 can reduce contact resistance between the oxide 230 and the conductor 240. Therefore, the first conductor of the conductor 240 preferably contains a metal element such as aluminum, ruthenium, titanium, tantalum, or tungsten. The conductor 740 may have a similar structure.

In the case where the conductor 240 and the conductor 740 each have a stacked-layer structure, a conductive material having a function of inhibiting the passage of impurities such as water or hydrogen is preferably used for a conductor in contact with the insulator 284, the insulator 282, the insulator 280, the insulator 274, and the insulator 273, like the first conductor of the conductor 205, for example. For example, tantalum, tantalum nitride, titanium, titanium nitride, ruthenium, ruthenium oxide, or the like is preferably used. The conductive material having a function of inhibiting the passage of impurities such as water or hydrogen may be a single layer or a stacked layer. With the use of the conductive material, impurities such as water or hydrogen can be inhibited from entering the oxide 230 and the oxide 730 through the conductor 240 and the conductor 740 from a layer above the insulator 284.

Although not illustrated, a conductor functioning as a wiring may be positioned in contact with the top surfaces of the conductor 240 and the conductor 740. The conductor functioning as a wiring is preferably formed using a conductive material containing tungsten, copper, or aluminum as its main component. The conductor may have a stacked-layer structure and may be, for example, a stacked layer of the above conductive material and titanium or titanium nitride. Note that like the conductor 203 or the like, the conductor may be formed to embed in an opening provided in an insulator.

As illustrated in FIG. 12(A), the insulator 150 may be provided over the insulator 284. The insulator 150 can be provided using a material similar to that for the insulator 280. Furthermore, the insulator 150 may function as a planarization film that covers an uneven shape thereunder.

Furthermore, the conductor 112 is preferably provided in an opening formed in the insulator 150. The conductor 112 functions as a wiring for the transistor 200, the transistor 700, the capacitor 100, or the like.

For the conductor 112, a metal film containing an element selected from molybdenum, titanium, tantalum, tungsten, aluminum, copper, chromium, neodymium, and scandium; a metal nitride film containing the above element as its component (a tantalum nitride film, a titanium nitride film, a molybdenum nitride film, or a tungsten nitride film); or the like can be used. Alternatively, a conductive material such as an indium tin oxide, an indium oxide containing tungsten oxide, an indium zinc oxide containing tungsten oxide, an indium oxide containing titanium oxide, an indium tin oxide containing titanium oxide, an indium zinc oxide, or an indium tin oxide to which silicon oxide is added can be used.

Although the conductor 112 has a single-layer structure in FIG. 12(A), the structure is not limited thereto; a stacked-layer structure of two or more layers may be employed. For example, between a conductor having a barrier property and a conductor having high conductivity, a conductor which is highly adhesive to the conductor having a barrier property and the conductor having high conductivity may be formed.

When the semiconductor device described in the above embodiment is formed to have the above structure, the semiconductor device can be miniaturized and highly integrated while following the process rule of the 14-nm generation or later.

<Constituent Materials for Semiconductor Device>

Constituent materials that can be used for a semiconductor device are described below.

In the following description, unless otherwise specified, constituent materials that can be used for the transistor 200 can be used for the transistor 700.

A constituent material described below can be deposited by a sputtering method, a chemical vapor deposition (CVD) method, a molecular beam epitaxy (MBE) method, a pulsed laser deposition (PLD) method, an atomic layer deposition (ALD) method, or the like.

Note that CVD methods can be classified into a plasma CVD (PECVD: Plasma Enhanced CVD) method using plasma, a thermal CVD (TCVD) method using heat, a photo CVD method using light, and the like. Moreover, the CVD methods can be classified into a metal CVD (MCVD) method and a metal organic CVD (MOCVD) method depending on a source gas to be used.

By a plasma CVD method, a high-quality film can be obtained at a relatively low temperature. Furthermore, a thermal CVD method is a deposition method that does not use plasma and thus can inhibit plasma damage to an object. For example, a wiring, an electrode, an element (e.g., transistor or capacitor), or the like included in a semiconductor device might be charged up by receiving charges from plasma. In that case, accumulated charges might break the wiring, electrode, element, or the like included in the semiconductor device. By contrast, such plasma damage is not caused in the case of a thermal CVD method that does not use plasma, and thus the yield of a semiconductor device can be increased. In addition, a thermal CVD method does not cause plasma damage during deposition, so that a film with few defects can be obtained.

An ALD method is also a deposition method which can inhibit plasma damage to an object. Thus, a film with few defects can be obtained. Note that a precursor used in an ALD method sometimes contains impurities such as carbon. Thus, a film provided by an ALD method contains impurities such as carbon in a larger amount than a film provided by another deposition method, in some cases. Note that impurities can be quantified by X-ray photoelectron spectroscopy (XPS).

Unlike a deposition method in which particles ejected from a target or the like are deposited, a CVD method and an ALD method are deposition methods in which a film is formed by reaction at a surface of an object. Thus, a CVD method and an ALD method are deposition methods that are less likely to be influenced by the shape of an object and thus have favorable step coverage. In particular, an ALD method has excellent step coverage and excellent thickness uniformity, and thus is suitable for the case of covering a surface of an opening with a high aspect ratio, for example. On the other hand, an ALD method has a relatively low deposition rate, and thus is preferably used in combination with another deposition method with a high deposition rate, such as a CVD method, in some cases.

A CVD method and an ALD method enable control of the composition of a film to be obtained with a flow rate ratio of the source gases. For example, by a CVD method and an ALD method, a film with a desired composition can be deposited depending on the flow rate ratio of the source gases. Moreover, for example, by a CVD method or an ALD method, by changing the flow rate ratio of the source gases during the deposition, a film whose composition is continuously changed can be deposited. In the case of depositing while changing the flow rate ratio of the source gases, as compared with the case of depositing with the use of a plurality of deposition chambers, time taken for the deposition can be shortened because time taken for transfer and pressure adjustment is omitted. Thus, productivity of semiconductor devices can be improved in some cases.

For the processing of the constituent material, a lithography method can be employed. For the processing, a dry etching method or a wet etching method can be employed. The processing by a dry etching method is suitable for microfabrication.

In the lithography method, first, a resist is exposed to light through a mask. Next, a region exposed to light is removed or left using a developing solution, so that a resist mask is formed. Then, etching treatment through the resist mask is performed, so that the conductor, the semiconductor, the insulator, or the like can be processed into a desired shape. The resist mask is formed by, for example, exposure of the resist to light using KrF excimer laser light, ArF excimer laser light, EUV (Extreme Ultraviolet) light, or the like. Alternatively, a liquid immersion technique may be employed in which a portion between a substrate and a projection lens is filled with liquid (e.g., water) to perform light exposure. Furthermore, an electron beam or an ion beam may be used instead of the above-described light. Note that the above-described mask for the exposure of the resist to light is unnecessary in the case of using an electron beam or an ion beam because direct drawing is performed on the resist. Note that for removal of the resist mask, dry etching treatment such as ashing can be performed, wet etching treatment can be performed, wet etching treatment can be performed after dry etching treatment, or dry etching treatment can be performed after wet etching treatment, for example.

A hard mask formed of an insulator or a conductor may be used instead of the resist mask. In the case where a hard mask is used, a hard mask with a desired shape can be formed in the following manner: an insulating film or a conductive film that is the hard mask material is formed over the constituent material, a resist mask is formed thereover, and then the hard mask material is etched. The etching of the constituent material may be performed after removal of the resist mask or while the resist mask remains. In the latter case, the resist mask disappears during the etching in some cases. The hard mask may be removed by etching after the etching of the constituent material. The hard mask does not need to be removed in the case where the hard mask material does not affect the following process or can be utilized in the following process.

As a dry etching apparatus, a capacitively coupled plasma (CCP) etching apparatus including parallel plate type electrodes can be used. The capacitively coupled plasma etching apparatus including the parallel plate type electrodes may have a structure in which high-frequency power is applied to one of the parallel plate type electrodes. Alternatively, a structure may be employed in which different high-frequency powers are applied to one of the parallel plate type electrodes. Alternatively, a structure may be employed in which high-frequency powers with the same frequency are applied to the parallel plate type electrodes. Alternatively, a structure may be employed in which high-frequency powers with different frequencies are applied to the parallel plate type electrodes. Alternatively, a dry etching apparatus including a high-density plasma source can be used. As the dry etching apparatus including a high-density plasma source, an inductively coupled plasma (ICP) etching apparatus can be used, for example.

<<Substrate>>

As a substrate over which the transistor 200 and the transistor 700 are formed, an insulator substrate, a semiconductor substrate, or a conductor substrate is used, for example. As the insulator substrate, a glass substrate, a quartz substrate, a sapphire substrate, a stabilized zirconia substrate (e.g., an yttria-stabilized zirconia substrate), or a resin substrate is given, for example. As the semiconductor substrate, a semiconductor substrate of silicon, germanium, or the like or a compound semiconductor substrate containing silicon carbide, silicon germanium, gallium arsenide, indium phosphide, zinc oxide, or gallium oxide is given, for example. In addition, a semiconductor substrate in which an insulator region is included in the above semiconductor substrate, for example, an SOI (Silicon On Insulator) substrate or the like is given. As the conductor substrate, a graphite substrate, a metal substrate, an alloy substrate, a conductive resin substrate, or the like is given. A substrate including a metal nitride, a substrate including a metal oxide, or the like is given. Furthermore, an insulator substrate provided with a conductor or a semiconductor, a semiconductor substrate provided with a conductor or an insulator, a conductor substrate provided with a semiconductor or an insulator, or the like is given. Alternatively, any of these substrates provided with an element may be used.

As the element provided over the substrate, a capacitor, a resistor, a switching element, a light-emitting element, a memory element, or the like is given.

A flexible substrate may be used as the substrate. Note that as a method for providing a transistor over a flexible substrate, there is a method in which a transistor is formed over a non-flexible substrate and then is separated from the non-flexible substrate and transferred to the substrate that is a flexible substrate. In that case, a separation layer is preferably provided between the non-flexible substrate and the transistor. The substrate may have elasticity. The substrate may have a property of returning to its original shape when bending or pulling is stopped. Alternatively, the substrate may have a property of not returning to its original shape. The substrate has a region with a thickness of, for example, greater than or equal to 5 μm and less than or equal to 700 μm, preferably greater than or equal to 10 μm and less than or equal to 500 μm, further preferably greater than or equal to 15 μm and less than or equal to 300 μm. When the substrate has a small thickness, the weight of the semiconductor device including the transistor can be reduced. Moreover, when the substrate has a small thickness, even in the case of using glass or the like, the substrate may have elasticity or a property of returning to its original shape when bending or pulling is stopped. Thus, an impact applied to a semiconductor device over the substrate due to dropping or the like can be reduced. That is, a durable semiconductor device can be provided.

For the substrate that is a flexible substrate, for example, a metal, an alloy, a resin, glass, or fiber thereof can be used. Note that as the substrate, a sheet, a film, a foil, or the like that contains a fiber may be used. The substrate that is a flexible substrate preferably has a lower coefficient of linear expansion because deformation due to an environment is inhibited. For the substrate that is a flexible substrate, for example, a material whose coefficient of linear expansion is lower than or equal to $1\times10^{-3}$/K, lower than or equal to $5\times10^{-5}$/K, or lower than or equal to $1\times10^{-5}$/K is used. Examples of the resin include polyester, polyolefin, polyamide (nylon, aramid, or the like), polyimide, polycarbonate, and acrylic. In particular, aramid is suitable for the substrate that is a flexible substrate because of its low coefficient of linear expansion.

<<Insulator>>

Examples of an insulator include an oxide, a nitride, an oxynitride, a nitride oxide, a metal oxide, a metal oxynitride, and a metal nitride oxide, each of which has an insulating property.

With miniaturization and high integration of a transistor, for example, a problem of leakage current or the like may arise because of a reduction in the thickness of a gate insulator. When a high-k material is used for an insulator functioning as the gate insulator, the voltage of the transistor in operation can be reduced while the thickness of the gate insulator is kept. By contrast, when a material having a low dielectric constant is used for the insulator functioning as an interlayer film, the parasitic capacitance generated between wirings can be reduced. Thus, a material is preferably selected depending on the function of an insulator.

Examples of the insulator having a high dielectric constant include gallium oxide, hafnium oxide, zirconium oxide, an oxide containing aluminum and hafnium, an oxynitride containing aluminum and hafnium, an oxide containing silicon and hafnium, an oxynitride containing silicon and hafnium, and a nitride containing silicon and hafnium.

Examples of the insulator having low dielectric constant include silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, and a resin.

In particular, silicon oxide and silicon oxynitride are thermally stable. Accordingly, a stacked-layer structure which is thermally stable and has a low dielectric constant can be obtained by combination with a resin, for example. Examples of the resin include polyester, polyolefin, polyamide (e.g., nylon or aramid), polyimide, polycarbonate, and acrylic. Silicon oxide and silicon oxynitride each enable a stacked-layer structure to have thermal stability and a high dielectric constant when combined with an insulator having high dielectric constant, for example.

In addition, when a transistor using an oxide semiconductor is surrounded by an insulator having a function of inhibiting the passage of oxygen and impurities such as hydrogen, the electrical characteristics of the transistor can be stable.

As the insulator having a function of inhibiting the passage of oxygen and impurities such as hydrogen, a single layer or a stacked layer of an insulator containing, for example, boron, carbon, nitrogen, oxygen, fluorine, magnesium, aluminum, silicon, phosphorus, chlorine, argon, gallium, germanium, yttrium, zirconium, lanthanum, neodymium, hafnium, or tantalum is used. Specifically, as the insulator having a function of inhibiting the passage of oxygen and impurities such as hydrogen, a metal oxide such as aluminum oxide, magnesium oxide, gallium oxide, germanium oxide, yttrium oxide, zirconium oxide, lanthanum oxide, neodymium oxide, hafnium oxide, or tantalum oxide; silicon nitride oxide; silicon nitride; or the like can be used.

For example, a metal oxide containing one kind or two or more kinds selected from hafnium, aluminum, gallium, yttrium, zirconium, tungsten, titanium, tantalum, nickel, germanium, magnesium, and the like can be used as the insulator 273.

In particular, aluminum oxide has a high barrier property, so that even a thin aluminum oxide film having a thickness greater than or equal to 0.5 nm and less than or equal to 3.0 nm can inhibit diffusion of hydrogen and nitrogen. Although hafnium oxide has a lower barrier property than aluminum oxide, hafnium oxide can have an increased barrier property when its film thickness is increased. Therefore, the appropriate addition amount of hydrogen and nitrogen can be adjusted by adjustment of the film thickness of hafnium oxide.

For example, the insulator 224 and the insulator 250 functioning as part of the gate insulator are each preferably an insulator including an excess-oxygen region. When a structure in which silicon oxide or silicon oxynitride including an excess oxygen region is in contact with the oxide 230 is employed, oxygen vacancies included in the oxide 230 can be compensated for.

An insulator containing one kind or a plurality of kinds of oxides of aluminum, hafnium, and gallium can be used for the insulator 222 functioning as part of the gate insulator, for example. In particular, it is preferable to use aluminum oxide, hafnium oxide, an oxide containing aluminum and hafnium (hafnium aluminate), or the like as an insulator containing an oxide of one or both of aluminum and hafnium.

For the insulator 220, silicon oxide or silicon oxynitride, which is thermally stable, is preferably used, for example. When the gate insulator has a stacked-layer structure of a thermally stable film and a film with a high dielectric constant, the equivalent oxide thickness (EOT) of the gate insulator can be reduced while the thickness thereof is kept.

With the above stacked-layer structure, on-state current can be increased without a reduction in the influence of the electric field from the gate electrode. Since the distance between the gate electrode and the region where a channel is formed is kept by the physical thickness of the gate insulator, leakage current between the gate electrode and the channel formation region can be inhibited.

The insulator 212, the insulator 216, the insulator 271, the insulator 275, the insulator 280, and the insulator 284 preferably include an insulator with a low dielectric constant. For example, the insulators preferably include silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, a resin, or the like. Alternatively, the insulators preferably have a stacked-layer structure of a resin and silicon oxide, silicon oxynitride, silicon nitride oxide, silicon nitride, silicon oxide to which fluorine is added, silicon oxide to which carbon is added, silicon oxide to which carbon and nitrogen are added, or porous silicon oxide. When silicon oxide or silicon oxynitride, which is thermally stable, is combined with a resin, the stacked-layer structure can have thermal stability and low dielectric constant. Examples of the resin include polyester, polyolefin, polyamide (e.g., nylon or aramid), polyimide, polycarbonate, and acrylic.

As the insulator 210, the insulator 214, the insulator 270, the insulator 273, and the insulator 282, an insulator having a function of inhibiting the passage of oxygen and impurities such as hydrogen is used. For the insulator 270 and the insulator 273, a metal oxide such as aluminum oxide, hafnium oxide, magnesium oxide, gallium oxide, germanium oxide, yttrium oxide, zirconium oxide, lanthanum oxide, neodymium oxide, or tantalum oxide; silicon nitride oxide; silicon nitride; or the like is used, for example.

<<Conductor>>

For the conductors, a material containing one or more kinds of metal elements selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, and the like can be used. Furthermore, a semiconductor having high electrical conductivity, typified by polycrystalline silicon containing an impurity element such as phosphorus, or silicide such as nickel silicide may be used.

Furthermore, a stack including a plurality of conductive layers formed with the above materials may be used. For example, a stacked-layer structure combining a material containing the above metal element and a conductive material containing oxygen may be employed. Furthermore, a stacked-layer structure combining a material containing the above metal element and a conductive material containing nitrogen may be employed. Furthermore, a stacked-layer structure combining a material containing the above metal element, a conductive material containing oxygen, and a conductive material containing nitrogen may be employed.

Note that when an oxide is used for the channel formation region of the transistor, a stacked-layer structure obtained by combining a material containing the above-described metal element and a conductive material containing oxygen is preferably used for the conductor functioning as the gate electrode. In that case, the conductive material containing oxygen is preferably provided on the channel formation region side. When the conductive material containing oxygen is provided on the channel formation region side, oxygen released from the conductive material is easily supplied to the channel formation region.

It is particularly preferable to use, for the conductor functioning as the gate electrode, a conductive material containing oxygen and a metal element contained in a metal oxide where a channel is formed. Furthermore, a conductive material containing the above metal element and nitrogen may be used. For example, a conductive material containing nitrogen, such as titanium nitride or tantalum nitride, may be used. Furthermore, indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon is added may be used. Furthermore, indium gallium zinc oxide containing nitrogen may be used. With the use of such a material, hydrogen contained in the metal oxide where a channel is formed can be trapped in some cases. Alternatively, hydrogen entering from an external insulator or the like can be trapped in some cases.

For the conductor 260, the conductor 203, the conductor 205, and the conductor 240, a material containing one or more kinds of metal elements selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, and the like can be used. Furthermore, a semiconductor having high electrical conductivity, typified by polycrystalline silicon including an impurity element such as phosphorus, or silicide such as nickel silicide may be used.

<<Metal Oxide>>

As the oxide 230, a metal oxide functioning as an oxide semiconductor (hereinafter also referred to as an oxide semiconductor) is preferably used. A metal oxide that can be used for the oxide 230 of one embodiment of the present invention will be described below.

The metal oxide preferably contains at least indium or zinc. In particular, indium and zinc are preferably contained. Aluminum, gallium, yttrium, tin, or the like is preferably contained in addition to them. One kind or a plurality of kinds selected from boron, titanium, iron, nickel, germanium, zirconium, molybdenum, lanthanum, cerium, neodymium, hafnium, tantalum, tungsten, magnesium, and the like may be contained.

Here, the case where the metal oxide is an In-M-Zn oxide containing indium, an element M, and zinc, is considered. Note that the element M is aluminum, gallium, yttrium, tin, or the like. Other elements that can be used as the element M include boron, titanium, iron, nickel, germanium, zirconium, molybdenum, lanthanum, cerium, neodymium, hafnium, tantalum, tungsten, magnesium, and the like. Note that a plurality of the above-described elements may be combined as the element M.

Note that in this specification and the like, a metal oxide containing nitrogen is also referred to as a metal oxide in some cases. A metal oxide containing nitrogen may be referred to as a metal oxynitride.

[Composition of Metal Oxide]

The composition of a CAC (Cloud-Aligned Composite)-OS that can be used for a transistor disclosed in one embodiment of the present invention will be described below.

In this specification and the like, CAAC (c-axis aligned crystal) and CAC (Cloud-Aligned Composite) are sometimes stated. Note that CAAC refers to an example of a crystal structure, and CAC refers to an example of a function or a material composition.

A CAC-OS or a CAC-metal oxide has a conducting function in a part of the material and an insulating function in another part of the material, and has a function of a semiconductor as the whole material. Note that in the case where the CAC-OS or the CAC-metal oxide is used in an active layer of a transistor, the conducting function is a function that allows electrons (or holes) serving as carriers to flow, and the insulating function is a function that does not allow electrons serving as carriers to flow. By the complementary action of the conducting function and the insulating function, a switching function (On/Off function) can be given to the CAC-OS or the CAC-metal oxide. In the CAC-OS or the CAC-metal oxide, separation of the functions can maximize each function.

In addition, the CAC-OS or the CAC-metal oxide includes conductive regions and insulating regions. The conductive regions have the above-described conducting function, and the insulating regions have the above-described insulating function. In some cases, the conductive regions and the insulating regions in the material are separated at the nanoparticle level. In some cases, the conductive regions and the insulating regions are unevenly distributed in the material. Moreover, the conductive regions are sometimes observed to be coupled in a cloud-like manner with their boundaries blurred.

Furthermore, in the CAC-OS or the CAC-metal oxide, the conductive regions and the insulating regions each having a size greater than or equal to 0.5 nm and less than or equal to 10 nm, preferably greater than or equal to 0.5 nm and less than or equal to 3 nm are dispersed in the material in some cases.

The CAC-OS or the CAC-metal oxide is composed of components having different band gaps. For example, the CAC-OS or the CAC-metal oxide is composed of a component having a wide gap due to the insulating region and a component having a narrow gap due to the conductive region. In the case of the structure, when carriers flow, the carriers mainly flow in the component having a narrow gap. Moreover, the component having a narrow gap complements the component having a wide gap, and carriers also flow in the component having a wide gap in conjunction with the component having a narrow gap. Therefore, in the case where the above-described CAC-OS or CAC-metal oxide is used in a channel formation region of a transistor, the transistor in the on state can achieve high current driving capability, that is, high on-state current and high field-effect mobility.

In other words, the CAC-OS or the CAC-metal oxide can also be referred to as a matrix composite or a metal matrix composite.

[Structure of Metal Oxide]

Oxide semiconductors (metal oxides) are classified into single-crystal oxide semiconductors and non-single-crystal oxide semiconductors. Examples of the non-single-crystal oxide semiconductors include a CAAC-OS (c-axis aligned crystalline oxide semiconductor), a polycrystalline oxide semiconductor, an nc-OS (nanocrystalline oxide semiconductor), an amorphous-like oxide semiconductor (a-like OS), and an amorphous oxide semiconductor.

The CAAC-OS has c-axis alignment, a plurality of nanocrystals are connected in the a-b plane direction, and the crystal structure has distortion. Note that the distortion refers to a portion where the direction of a lattice arrangement changes between a region with a regular lattice arrangement and another region with a regular lattice arrangement in a region where the plurality of nanocrystals are connected.

The nanocrystal is basically a hexagon but is not always a regular hexagon and is a non-regular hexagon in some cases. Furthermore, a pentagonal or heptagonal lattice arrangement, for example, is included in the distortion in some cases. Note that a clear crystal grain boundary (also referred to as grain boundary) is difficult to observe even in the vicinity of distortion in the CAAC-OS. That is, formation of a grain boundary is inhibited because of the distortion of lattice arrangement. This is because the CAAC-OS can tolerate distortion owing to non-dense arrangement of oxygen atoms in the a-b plane direction, an interatomic bond length changed by substitution of a metal element, and the like.

Furthermore, the CAAC-OS tends to have a layered crystal structure (also referred to as a layered structure) in which a layer containing indium and oxygen (hereinafter, In layer) and a layer containing the element M, zinc, and oxygen (hereinafter, (M,Zn) layer) are stacked. Note that indium and the element M can be replaced with each other, and when the element M in the (M,Zn) layer is replaced by indium, the layer can also be referred to as an (In,M,Zn) layer. Furthermore, when indium of the In layer is replaced by the element M, the layer can also be referred to as an (In,M) layer.

The CAAC-OS is a metal oxide with high crystallinity. On the other hand, a clear crystal grain boundary is difficult to observe in the CAAC-OS; thus, it can be said that a reduction in electron mobility due to the crystal grain boundary is less likely to occur. Furthermore, entry of impurities, formation of defects, or the like might decrease the crystallinity of a metal oxide, which means that the CAAC-OS is a metal oxide having small amounts of impurities and defects (e.g., oxygen vacancies (Vo)). Thus, a metal oxide including a CAAC-OS is physically stable. Therefore, the metal oxide including a CAAC-OS is resistant to heat and has high reliability.

In the nc-OS, a microscopic region (for example, a region with a size greater than or equal to 1 nm and less than or equal to 10 nm, in particular, a region with a size greater than or equal to 1 nm and less than or equal to 3 nm) has a periodic atomic arrangement. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor depending on the analysis method.

The a-like OS is a metal oxide having a structure between those of the nc-OS and the amorphous oxide semiconductor. The a-like OS contains a void or a low-density region. That is, the a-like OS has low crystallinity as compared with the nc-OS and the CAAC-OS.

An oxide semiconductor (metal oxide) has various structures with different properties. Two or more kinds from the amorphous oxide semiconductor, the polycrystalline oxide semiconductor, the a-like OS, the nc-OS, and the CAAC-OS may be included in an oxide semiconductor of one embodiment of the present invention.

[Transistor Including Metal Oxide]

Next, the case where the above metal oxide is used for a channel formation region of a transistor will be described.

Note that when the above metal oxide is used for a channel formation region of a transistor, the transistor having high field-effect mobility can be achieved. In addition, the transistor having high reliability can be achieved.

Here, an example of the hypothesis about electric conduction of a metal oxide is described.

Electric conduction in a solid is inhibited by a scattering source called a scattering center. For example, it is known that in the case of single crystal silicon, lattice scattering and ionized impurity scattering are main scattering centers. In other words, in the elemental state with few lattice defects and impurities, the carrier mobility is high because there is no factor that inhibits the electric conduction in the solid.

The above presumably applies to a metal oxide. For example, it is probable that a metal oxide containing less oxygen than oxygen in the stoichiometric composition has many oxygen vacancies $V_o$. Atoms around the oxygen vacancies are positioned in places shifted from those in the elemental state. This distortion due to the oxygen vacancies might become a scattering center.

Furthermore, a metal compound containing more oxygen than oxygen in the stoichiometric composition contains excess oxygen, for example. Excess oxygen existing in a liberated state in the metal compound becomes $O^-$ or $O^{2-}$ by receiving an electron. Excess oxygen that has become $O^-$ or $O^{2-}$ might be a scattering center.

According to the above, it is probable that in the case where the metal oxide has an elemental state containing oxygen in the stoichiometric composition, the carrier mobility is high.

Since crystal growth tends to hardly occur particularly in the air in an indium-gallium-zinc oxide (hereinafter IGZO), which is one kind of metal oxide containing indium, gallium, and zinc, small crystals (e.g., the above-described nanocrystals) have more stable structures than large crystals (here, several-millimeter crystals or several-centimeter crystal) in some cases. This is probably because connection of small crystals, rather than formation of large crystals, leads to a reduction in distortion energy.

Note that in a region where small crystals are connected to each other, defects are formed in some cases to reduce the distortion energy of the region. Thus, when the distortion energy is reduced without formation of a defect in the region, the carrier mobility can be increased.

Furthermore, a metal oxide with a low carrier density is preferably used for the transistor. In the case where the carrier density of a metal oxide film is reduced, the impurity concentration in the metal oxide film is reduced to reduce the density of defect states. In this specification and the like, a state with a low impurity concentration and a low density of defect states is referred to as a highly purified intrinsic or substantially highly purified intrinsic state. For example, a metal oxide has a carrier density lower than $8\times10^{11}/cm^3$, preferably lower than $1\times10^{11}/cm^3$, and further preferably lower than $1\times10^{10}/cm^3$, and higher than or equal to $1\times10^{-9}/cm^3$.

Moreover, a highly purified intrinsic or substantially highly purified intrinsic metal oxide film has a low density of defect states and accordingly may have a low density of trap states.

Charge trapped by the trap states in the metal oxide takes a long time to be released and behaves like fixed charge in some cases. Thus, a transistor having a metal oxide with high density of trap states in a channel formation region has unstable electrical characteristics in some cases.

Thus, it is effective to reduce the concentration of impurities in the metal oxide to make the electrical characteristics of the transistor stable. In addition, in order that the concentration of impurities in the metal oxide may be reduced, the concentration of impurities in an adjacent film is also preferably reduced. As an impurity, hydrogen, nitrogen, an alkali metal, an alkaline earth metal, iron, nickel, and silicon can be given.

[Impurities]

Here, the influence of each impurity in the metal oxide will be described.

When silicon or carbon that is one of the Group 14 elements is contained in the metal oxide, defect states are formed in the metal oxide. Thus, the concentration of silicon or carbon in the metal oxide and the concentration of silicon or carbon around an interface with the metal oxide (the concentration measured by secondary ion mass spectrometry (SIMS)) is set to lower than or equal to $2\times10^{18}$ atoms/cm$^3$, preferably lower than or equal to $2\times10^{17}$ atoms/cm$^3$.

When the metal oxide contains an alkali metal or an alkaline earth metal, defect states are formed and carriers are generated, in some cases. Thus, a transistor using, in a channel formation region, a metal oxide containing an alkali metal or alkaline earth metal is likely to have normally-on characteristics. Therefore, it is preferable to reduce the concentration of an alkali metal or an alkaline earth metal in the metal oxide. Specifically, the concentration of an alkali metal or an alkaline earth metal in the metal oxide measured by SIMS is set to lower than or equal to $1\times10^{18}$ atoms/cm$^3$, preferably lower than or equal to $2\times10^{16}$ atoms/cm$^3$.

Furthermore, when the metal oxide contains nitrogen, the metal oxide easily becomes n-type because of generation of electrons serving as carriers and an increase in carrier density. As a result, a transistor in which a metal oxide containing nitrogen is used in a channel formation region is likely to have normally-on characteristics. Thus, nitrogen in the channel formation region in the metal oxide is preferably reduced as much as possible. For example, the concentration of nitrogen in the metal oxide, which is measured by SIMS, is set to lower than $5\times10^{19}$ atoms/cm$^3$, preferably lower than or equal to $5\times10^{18}$ atoms/cm$^3$, further preferably lower than or equal to $1\times10^{18}$ atom/cm$^3$, still further preferably lower than or equal to $5\times10^{17}$ atoms/cm$^3$.

Furthermore, hydrogen contained in a metal oxide reacts with oxygen bonded to a metal atom to be water, and thus forms an oxygen vacancy, in some cases. Entry of hydrogen into the oxygen vacancy generates an electron serving as a carrier in some cases. Furthermore, in some cases, bonding of part of hydrogen to oxygen bonded to a metal atom causes generation of an electron serving as a carrier. Thus, a transistor using a metal oxide that includes hydrogen is likely to have normally-on characteristics. Therefore, hydrogen in the metal oxide is preferably reduced as much as possible. Specifically, the hydrogen concentration of the metal oxide, which is measured by SIMS, is set to lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

When a metal oxide whose impurities are sufficiently reduced is used for a channel formation region in a transistor, stable electrical characteristics can be provided.

Note that this embodiment can be combined with the other embodiments in this specification as appropriate.

Embodiment 3

In this embodiment, one embodiment of a semiconductor device will be described with reference to FIG. 27 to FIG. 29.

<Semiconductor Wafer and Chip>

Figure 27A:
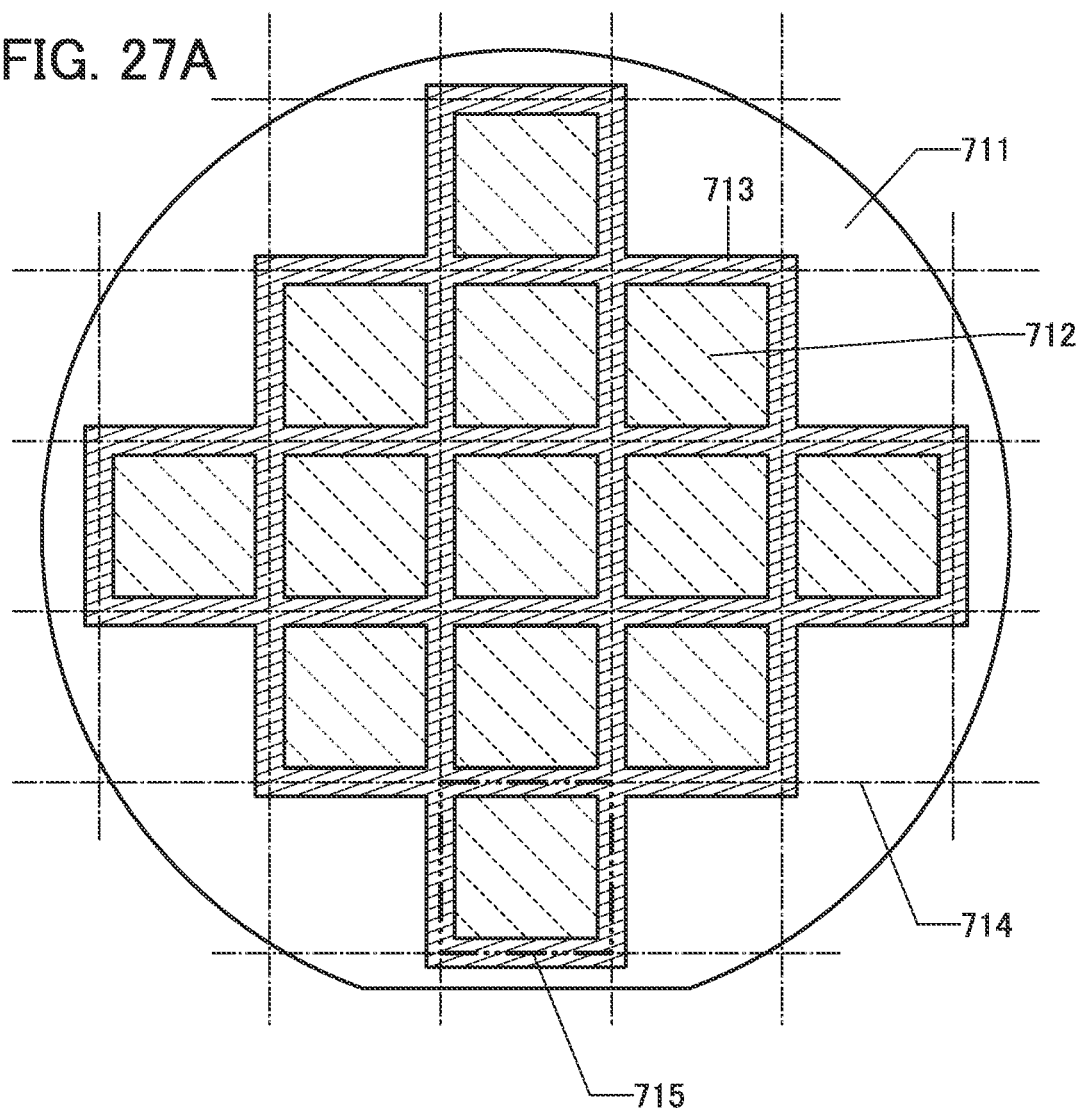
FIGS. 27A-27B Top views of a semiconductor wafer of one embodiment of the present invention.

FIG. 27(A) is a top view of a substrate 711 before dicing treatment is performed. As the substrate 711, a semiconductor substrate (also referred to as a "semiconductor wafer") can be used, for example. A plurality of circuit regions 712 are provided over the substrate 711. A semiconductor device and the like of one embodiment of the present invention can be provided in the circuit region 712.

Figure 27B:
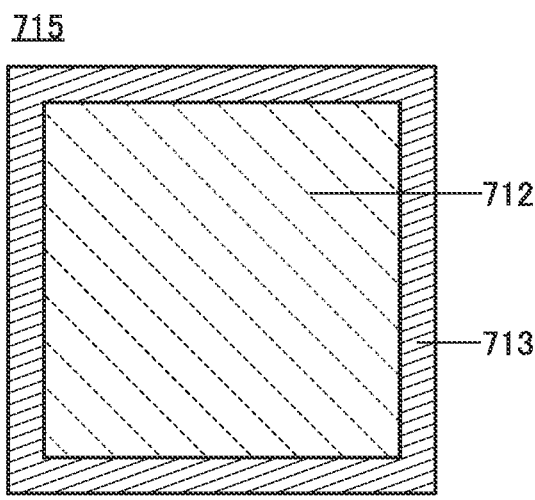

The plurality of circuit regions 712 are each surrounded by a separation region 713. Separation lines (also referred to as "dicing lines") 714 are set at a position overlapping with the separation regions 713. The substrate 711 is cut along the separation lines 714, whereby chips 715 including the circuit regions 712 can be cut out from the substrate 711. FIG. 27(B) illustrates an enlarged view of the chip 715.

In addition, a conductive layer, a semiconductor layer, or the like may be provided in the separation regions 713. Providing a conductive layer, a semiconductor layer, or the like in the separation regions 713 relieves ESD that might be caused in a dicing step, preventing a decrease in the yield due to the dicing step. Furthermore, a dicing step is generally performed while pure water whose specific resistance is decreased by dissolution of a carbonic acid gas or the like is supplied to a cut portion, in order that a substrate may be cooled down, swarf may be removed, and electrification may be prevented, for example. Providing a conductive layer, a semiconductor layer, or the like in the separation regions 713 allows a reduction in the usage of the pure water. Therefore, the manufacturing cost of semiconductor devices can be reduced. Moreover, the productivity of semiconductor devices can be improved.

<Electronic Component>

An example of an electronic component using the chip 715 is described with reference to FIG. 28(A), FIG. 28(B), and FIGS. 29(A) to 29(E). Note that the electronic component is also referred to as a semiconductor package or an IC package. The electronic component has a plurality of standards, names, and the like depending on a terminal extraction direction, a terminal shape, and the like.

The electronic component is completed when the semiconductor device described in the above embodiment is combined with components other than the semiconductor device in an assembly process (post-process).

Figure 28A:
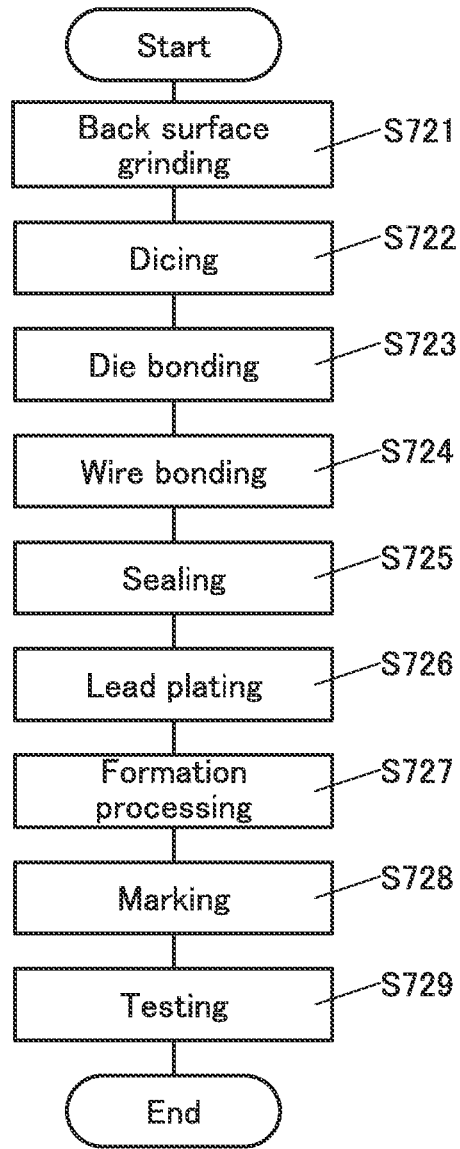
FIGS. 28A-28B A flow chart showing an example of a manufacturing process of an electronic component and a schematic perspective view.

The post-process is described with reference to a flow chart shown in FIG. 28(A). After the semiconductor device and the like of one embodiment of the present invention are formed over the substrate 711 in a pre-process, a "back surface grinding step" for grinding a back surface (a surface where the semiconductor device and the like are not formed) of the substrate 711 is performed (Step S721). When the substrate 711 is thinned by grinding, the size of the electronic component can be reduced.

Next, a "dicing step" for dividing the substrate 711 into a plurality of chips 715 is performed (Step S722). Then, a "die bonding step" for individually bonding the divided chips 715 to a lead frame is performed (Step S723). To bond the chip 715 and a lead frame in the die bonding step, a method such as resin bonding or tape-automated bonding is selected as appropriate depending on products. Note that the chip 715 may be bonded to an interposer substrate instead of the lead frame.

Next, a "wire bonding step" for electrically connecting a lead of the lead frame and an electrode on the chip 715 through a metal wire is performed (Step S724). As the metal wire, a silver wire, a gold wire, or the like can be used. In addition, ball bonding or wedge bonding can be used as the wire bonding, for example.

The wire-bonded chip 715 is subjected to a "sealing step (molding step)" for sealing the chip with an epoxy resin or the like (Step S725). Through the sealing step, the inside of the electronic component is filled with a resin, so that a wire for connecting the chip 715 to the lead can be protected from external mechanical force, and deterioration of characteristics (decrease in reliability) due to moisture, dust, or the like can be reduced.

Subsequently, a "lead plating step" for plating the lead of the lead frame is performed (Step S726). The plating treatment can prevent corrosion of the lead and enables more reliable soldering at the time of mounting the electronic component on a printed circuit board in a later step. Then, a "formation step" for cutting and processing the lead is performed (Step S727).

Next, a "marking step" for printing (marking) a surface of the package is performed (Step S728). Then, after a "testing step" (Step S729) for checking whether an external shape is good and whether there is malfunction, for example, the electronic component is completed.

Figure 28B:
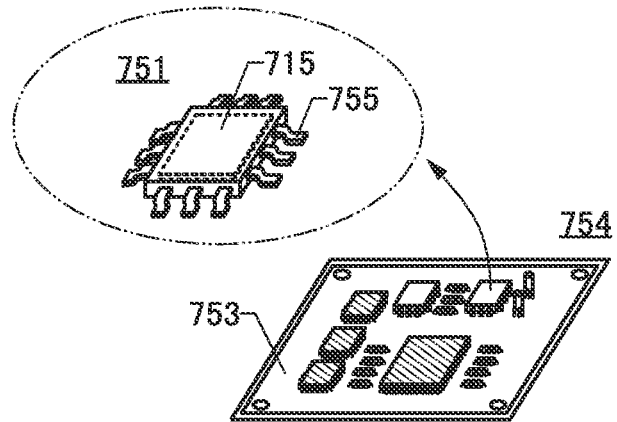

FIG. 28(B) illustrates a schematic perspective view of the completed electronic component. FIG. 28(B) illustrates a schematic perspective view of a QFP (Quad Flat Package) as an example of the electronic component. An electronic component 751 illustrated in FIG. 28(B) includes a lead 755 and the chip 715. The electronic component 751 may include a plurality of chips 715.

The electronic component 751 illustrated in FIG. 28(B) is mounted on a printed circuit board 753, for example. A plurality of such electronic components 751 are combined and electrically connected to each other on the printed circuit board 753; thus, a board on which the electronic components are mounted (a circuit board 754) is completed. The completed circuit board 754 is used for an electronic device or the like.

Application examples of the electronic component 751 illustrated in FIG. 28(B) are described. The electronic component 751 can be applied to a removable storage device. Some structure examples of the removable storage devices are described with reference to FIGS. 29(A) to 29(B).

Figure 29A:
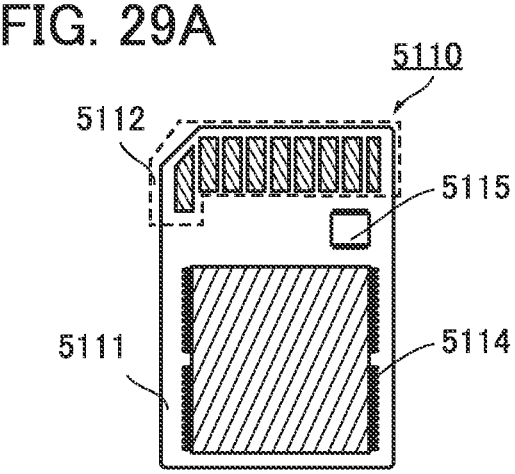
FIGS. 29A-29B Diagrams each illustrating an electronic component of one embodiment of the present invention.

FIG. 29(A) is a schematic external diagram of a removable storage device. A removable storage device 5110 includes a substrate 5111, a connector 5112, and a memory chip 5114. The connector 5112 functions as an interface for connection to an external device. The substrate 5111 is provided with a memory chip, which is an electronic component, and the like. For example, the substrate 5111 is provided with the memory chip 5114 and a controller chip 5115. The semiconductor device 10 or the like described in the above embodiment is incorporated in the memory chip 5114.

Figure 29B:
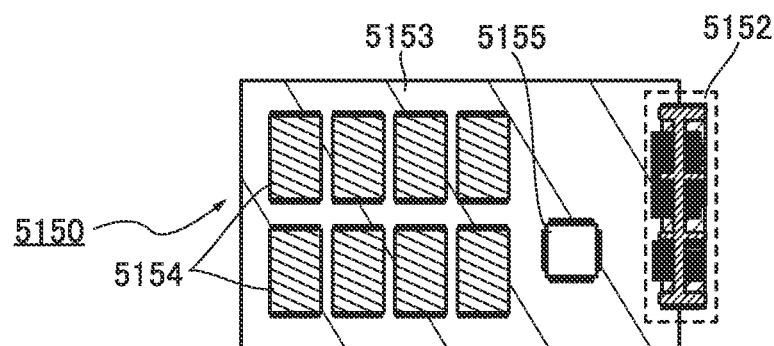

FIG. 29(B) is a schematic external diagram of a removable storage device having a structure different from that in FIG. 29(A). A removable storage device 5150 includes a substrate 5153, a connector 5152, and a memory chip 5154. The connector 5152 functions as an interface for connection to an external device. The substrate 5153 is provided with a memory chip, which is an electronic component, and the like. For example, the substrate 5111 is provided with a plurality of the memory chips 5154 and a controller chip 5155. The semiconductor device 10 or the like described in the above embodiment is incorporated in the memory chip 5154.

Note that this embodiment can be combined with the other embodiments in this specification as appropriate.

Embodiment 4

<Electronic Device>

An electronic component including the semiconductor device of one embodiment of the present invention can be used for a variety of electronic devices. FIG. 30 illustrates specific examples of electronic devices including the electronic component of one embodiment of the present invention.

Figure 30A:
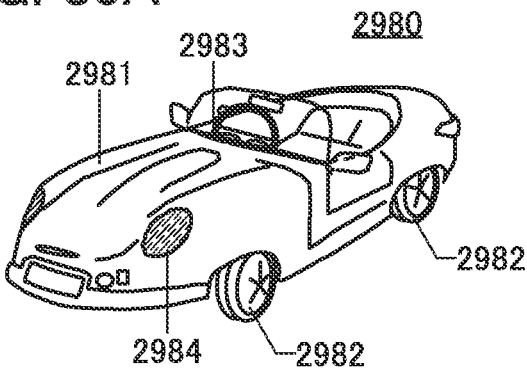
FIGS. 30A-30C Diagrams each illustrating an electronic device of one embodiment of the present invention.

FIG. 30(A) is an external view illustrating an example of a car. A car 2980 includes a car body 2981, wheels 2982, a dashboard 2983, lights 2984, and the like. The car 2980 also includes an antenna, a battery, and the like.

Figure 30B:
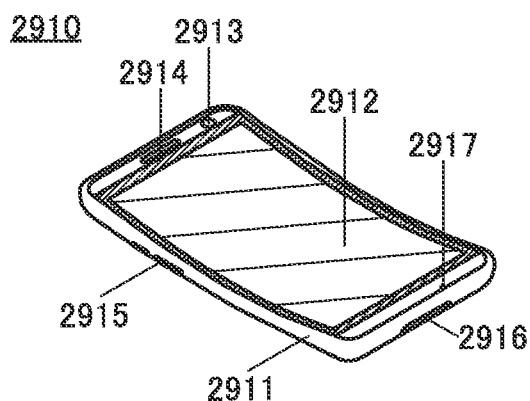

An information terminal 2910 illustrated in FIG. 30(B) includes a housing 2911, a display portion 2912, a microphone 2917, a speaker portion 2914, a camera 2913, an external connection portion 2916, operation switches 2915, and the like. A display panel and a touch screen that uses a flexible substrate are provided in the display portion 2912. The information terminal 2910 also includes an antenna, a battery, and the like inside the housing 2911. The information terminal 2910 can be used as, for example, a smartphone, a mobile phone, a tablet information terminal, a tablet personal computer, or an e-book reader.

Figure 30C:
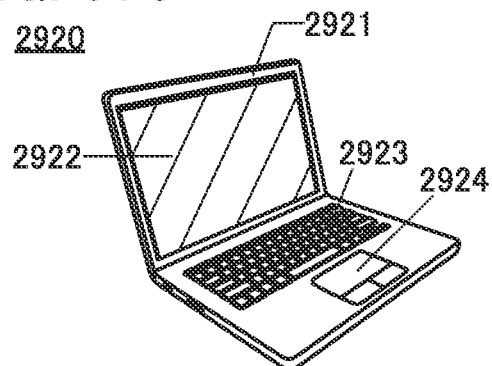

A notebook personal computer 2920 illustrated in FIG. 30(C) includes a housing 2921, a display portion 2922, a keyboard 2923, a pointing device 2924, and the like. In addition, the notebook personal computer 2920 includes an antenna, a battery, and the like inside the housing 2921.

For example, an electronic component including the semiconductor device of one embodiment of the present invention is highly convenient. With the use of the semiconductor device of one embodiment of the present invention, a highly convenient electronic device can be achieved.

This embodiment can be implemented in an appropriate combination with any of the structures described in the other embodiments.

(Supplementary Notes on the Description in this Specification and the Like)

The description of the above embodiments and the structures in the embodiments are noted below.

One embodiment of the present invention can be constituted by combining, as appropriate, the structure described in an embodiment with any of the structures described in the other embodiments. In addition, in the case where a plurality of structure examples are described in one embodiment, some of the structure examples can be combined as appropriate.

Note that a content (or part of the content) described in an embodiment can be applied to, combined with, or replaced with another content (or part of the content) described in the embodiment and/or a content (or part of the content) described in another embodiment or other embodiments.

Note that in each embodiment, a content described in the embodiment is a content described with reference to a variety of diagrams or a content described with text in the specification.

Note that by combining a diagram (or part thereof) described in one embodiment with another part of the diagram, a different diagram (or part thereof) described in the embodiment, and/or a diagram (or part thereof) described in another embodiment or other embodiments, much more diagrams can be formed.

In this specification and the like, components are classified on the basis of the functions, and shown as blocks independent of one another in block diagrams. However, in an actual circuit or the like, it may be difficult to separate components on the basis of the functions, so that one circuit may be associated with a plurality of functions and several circuits may be associated with one function. Therefore, blocks in the block diagrams are not limited by any of the components described in the specification, and the description can be changed appropriately depending on the circumstance.

In the drawings, the size, the layer thickness, or the region is shown with given magnitude for description convenience. Therefore, they are not necessarily limited to the illustrated scale. Note that the drawings are schematically shown for clarity, and embodiments of the present invention are not limited to shapes, values or the like shown in the drawings. For example, the following can be included: variation in signal, voltage, or current due to noise or variation in signal, voltage, or current due to difference in timing.

In this specification and the like, one of a source and a drain is denoted as "one of a source and a drain" (or a first electrode or a first terminal) and the other of the source and the drain is denoted as "the other of the source and the drain" (or a second electrode or a second terminal) in the description of the connection relation of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like appropriately depending on the circumstance.

Furthermore, in this specification and the like, the term "electrode" or "wiring" does not functionally limit the component. For example, an "electrode" is used as part of a "wiring" in some cases, and vice versa. Moreover, the term "electrode" or "wiring" also includes the case where a plurality of "electrodes" or "wirings" are formed in an integrated manner, for example.

Furthermore, in this specification and the like, voltage and potential can be interchanged with each other as appropriate. The voltage refers to a potential difference from a reference potential. When the reference potential is a ground voltage, for example, the voltage can be rephrased into the potential. The ground potential does not necessarily mean 0 V. Potentials are relative values, and the potential applied to a wiring or the like is changed depending on the reference potential, in some cases.

Note that in this specification and the like, the terms "film" and "layer" can be interchanged with each other depending on the case or circumstances. For example, the term "conductive layer" can be changed into the term "conductive film" in some cases. Furthermore, for example, the term "insulating film" can be changed into the term "insulating layer" in some cases.

In this specification and the like, a switch conducting (on state) or not conducting (off state) to determine whether current flows therethrough or not. Alternatively, a switch has a function of selecting and changing a current path.

Examples of a switch include an electrical switch and a mechanical switch. That is, any element can be used as a switch as long as it can control current, without limitation to a certain element.

Examples of the electrical switch include a transistor (e.g., a bipolar transistor or a MOS transistor), a diode (e.g., a PN diode, a PIN diode, a Schottky diode, a MIM (Metal Insulator Metal) diode, a MIS (Metal Insulator Semiconductor) diode, or a diode-connected transistor), and a logic circuit in which such elements are combined.

Note that in the case of using a transistor as a switch, an "on state" of the transistor refers to a state in which a source and a drain of the transistor can be regarded as being electrically short-circuited. Furthermore, an "off state" of the transistor refers to a state in which the source and the drain of the transistor can be regarded as being electrically cut off. Note that in the case where a transistor operates just as a switch, the polarity (conductivity type) of the transistor is not particularly limited to a certain type.

An example of a mechanical switch is a switch using a MEMS (micro electro mechanical systems) technology, such as a digital micromirror device (DMD). Such a switch includes an electrode that can be moved mechanically, and operates by controlling conduction and non-conduction in accordance with movement of the electrode.

In this specification and the like, the channel length refers to, for example, the distance between a source and a drain in a region where a semiconductor (or a portion where current flows in a semiconductor when a transistor is on) and a gate overlap with each other or a region where a channel is formed in a top view of the transistor.

In this specification and the like, the channel width refers to, for example, the length of a portion where a source and a drain face each other in a region where a semiconductor (or a portion where current flows in a semiconductor when a transistor is on) and a gate electrode overlap with each other or a region where a channel is formed.

In this specification and the like, when A and B are connected, it means the case where A and B are electrically connected to each other as well as the case where A and B are directly connected to each other. Here, when A and B are electrically connected, it means the case where electric signals can be sent and received between A and B when an object having any electric action exists between A and B.

REFERENCE NUMERALS

BL_1: wiring, BL_3: wiring, Ca1: capacitor, Ca2: capacitor, Cb1: capacitor, Cb2: capacitor, $E_0$: potential, $E_1$: potential, $E_2$: potential, $E_2-E_0$: potential difference, $E_2-E_1$: potential difference, MC1: memory cell, MC1a: memory cell, MC1b: memory cell, MC2: memory cell, MC2a: memory cell, MC2b: memory cell, MCA1: memory cell array, MCA2: memory cell array, Ta1: transistor, Ta2: transistor, Tb1: transistor, Tb2: transistor, WL_1: wiring, WL_4: wiring, WL_6: wiring, 10: semiconductor device, 11: processor, 12: memory circuit, 13: PMU, 14: register, 15: comparator, 16: power supply, 17: counter, 20: layer, 20A: layer, 20B: layer, 30: layer, 100: capacitor, 100a: capacitor, 100b: capacitor, 112: conductor, 120: conductor, 120a: conductor, 120b: conductor, 120c: conductor, 130: insulator, 130a: insulator, 130b: insulator, 150: insulator, 200: transistor, 200a: transistor, 200b: transistor, 203: conductor, 203a: conductor, 203b: conductor, 203c: conductor, 205: conductor, 205a: conductor, 205b: conductor, 205c: conductor, 206a: conductor, 210: insulator, 212: insulator, 214: insulator, 216: insulator, 220: insulator, 222: insulator, 224: insulator, 230: oxide, 230a: oxide, 230b: oxide, 230c: oxide, 230ca: oxide, 230cb: oxide, 231: region, 231a: region, 231b: region, 231c: region, 232: region, 232a: region, 232b: region, 232c: region, 232d: region, 234: region, 234a: region, 234b: region, 239: region, 240: conductor, 240a: conductor, 240b: conductor, 240c: conductor, 242: layer, 242a: layer, 242b: layer, 242c: layer, 250: insulator, 250a: insulator, 250b: insulator, 252: metal oxide, 252a: metal oxide, 252b: metal oxide, 260: conductor, 260a: conductor, 260aa: conductor, 260ab: conductor, 260b: conductor, 260ba: conductor, 260bb: conductor, 270: insulator, 270a: insulator, 270b: insulator, 271: insulator, 271a: insulator, 271b: insulator, 273: insulator, 274: insulator, 275: insulator, 275a: insulator, 275b: insulator, 280: insulator, 282: insulator, 284: insulator, 600: memory cell, 600a: memory cell, 600b: memory cell, 700: transistor, 703: conductor, 705: conductor, 711: substrate, 712: circuit region, 713: separation region, 714: separation line, 715: chip, 724: insulator, 730: oxide, 730a: oxide, 730b: oxide, 730c: oxide, 740: conductor, 740a: conductor, 740b: conductor, 742: layer, 750: insulator, 751: electronic component, 753: printed circuit board, 752: metal oxide, 754: circuit board, 755: lead, 760: conductor, 760a: conductor, 760b: conductor, 770: insulator, 771: insulator, 775: insulator, 2005b: transistor, 2910: information terminal, 2911: housing, 2912: display portion, 2913: camera, 2914: speaker portion, 2915: operation switch, 2916: external connection portion, 2917: microphone, 2920: notebook personal computer, 2921: housing, 2922: display portion, 2923: keyboard, 2924: pointing device, 2980: automobile, 2981: car body, 2982: wheel, 2983: dashboard, 2984: light, 5110: removable storage device, 5111: substrate, 5112: connector, 5114: memory chip, 5115: controller chip, 5152: connector, 5153: substrate, 5154: memory chip, 5155: controller chip.

The invention claimed is:

1. A semiconductor device comprising:
   a processor; and
   a memory circuit comprising a first memory region and a second memory region,
   wherein a first memory cell in the first memory region comprises a first transistor and a first capacitor,
   wherein a second memory cell in the second memory region comprises a second transistor and a second capacitor,
   wherein the first transistor and the second transistor each comprise an oxide semiconductor in a channel formation region,
   wherein the first memory region is configured to store data for executing a start-up routine of the processor when the processor is booted, and
   wherein the memory circuit is configured to be used as at least one of a cache memory and part of a main memory of the processor after the processor is booted.

2. The semiconductor device according to claim 1, wherein the first memory region is configured to become an accessible region when the processor is booted and become an inaccessible region when the processor is in normal operation.

3. The semiconductor device according to claim 1, wherein the second memory region is configured to become an inaccessible region when the processor is booted and become an accessible region when the processor is in normal operation.

4. The semiconductor device according to claim 1, wherein the first capacitor has a larger storage capacitance than the second capacitor.

5. An electronic component comprising:
   the semiconductor device according to claim 1; and
   a lead electrically connected to the semiconductor device.

6. An electronic device comprising:
   the electronic component according to claim 5;
   a printed circuit board provided with the electronic component; and
   a housing storing the printed circuit board.

7. A semiconductor device comprising:
   a processor; and
   a memory circuit comprising a first memory region and a second memory region,
   wherein a first memory cell in the first memory region comprises a first transistor and a first capacitor, wherein a second memory cell in the second memory region comprises a second transistor and a second capacitor, wherein the first transistor and the second transistor each comprise an oxide semiconductor in a channel formation region, wherein the first memory region is configured to store data for executing a start-up routine of the processor when the processor is booted, and wherein the second memory region is configured to be used as at least one of a cache memory and part of a main memory of the processor after the processor is booted.

8. The semiconductor device according to claim 7, wherein the first memory region is configured to become an accessible region when the processor is booted and become an inaccessible region when the processor is in normal operation.

9. The semiconductor device according to claim 7, wherein the second memory region is configured to become an inaccessible region when the processor is booted and become an accessible region when the processor is in normal operation.

10. The semiconductor device according to claim 7, wherein the first capacitor has a larger storage capacitance than the second capacitor.

11. An electronic component comprising:
the semiconductor device according to claim 7; and
a lead electrically connected to the semiconductor device.

12. An electronic device comprising:
the electronic component according to claim 11;
a printed circuit board provided with the electronic component; and
a housing storing the printed circuit board.

13. A semiconductor device comprising:
a processor; and
a memory circuit comprising a first memory region and a second memory region, wherein a first memory cell in the first memory region comprises a first transistor and a first capacitor, wherein a second memory cell in the second memory region comprises a second transistor and a second capacitor, wherein the first transistor and the second transistor each comprise an oxide semiconductor in a channel formation region, wherein the first memory region is configured to store data for executing a start-up routine of the processor when the processor is booted, and wherein the first memory region is configured to be used as a cache memory of the processor after the processor is booted.

14. The semiconductor device according to claim 13, wherein the second memory region is configured to become an inaccessible region when the processor is booted and become an accessible region when the processor is in normal operation.

15. The semiconductor device according to claim 13, wherein the first capacitor has a larger storage capacitance than the second capacitor.

16. An electronic component comprising:
the semiconductor device according to claim 13; and
a lead electrically connected to the semiconductor device.

17. An electronic device comprising:
the electronic component according to claim 16;
a printed circuit board provided with the electronic component; and
a housing storing the printed circuit board.

* * * * *